(12) United States Patent
Shaffer et al.

(10) Patent No.: US 11,743,255 B2
(45) Date of Patent: Aug. 29, 2023

(54) PROVIDING ACCESS CONTROL AND IDENTITY VERIFICATION FOR COMMUNICATIONS WHEN INITIATING A COMMUNICATION FROM AN ENTITY TO BE VERIFIED

(71) Applicant: Journey.ai, Denver, CO (US)

(72) Inventors: Shmuel Shaffer, Palo Alto, CA (US); Yolanda Schwartz, San Francisco, CA (US); Alexander John Shockley, Denver, CO (US)

(73) Assignee: Journey.ai, Denver, CO (US)

( * ) Notice: Subject to any disclaimer, the term of this patent is extended or adjusted under 35 U.S.C. 154(b) by 132 days.

(21) Appl. No.: 16/861,638

(22) Filed: Apr. 29, 2020

(65) Prior Publication Data

US 2020/0259827 A1     Aug. 13, 2020

Related U.S. Application Data

(63) Continuation-in-part of application No. 16/703,846, filed on Dec. 4, 2019, now Pat. No. 11,363,005.

(Continued)

(51) Int. Cl.
*H04L 9/40* (2022.01)
*G06F 8/61* (2018.01)

(52) U.S. Cl.
CPC ............ *H04L 63/0876* (2013.01); *G06F 8/61* (2013.01); *H04L 63/0853* (2013.01)

(58) Field of Classification Search
CPC ..... H04L 9/321; H04L 9/3213; H04L 9/3215; H04L 9/3218; H04L 9/3221; H04L 63/08;

(Continued)

(56) References Cited

U.S. PATENT DOCUMENTS 9,894,199 B1 *  2/2018  Wiechman ........ H04M 3/42068
10,117,098 B1 * 10/2018  Naguthanawala ...... H04L 63/18

(Continued)

FOREIGN PATENT DOCUMENTS

KR      20110071201 A  *  6/2011

OTHER PUBLICATIONS

International Search Report dated Apr. 19, 2020 in connection with PCT Application No. PCT/US2019/64562.

*Primary Examiner* — Matthew Smithers
(74) *Attorney, Agent, or Firm* — Behmke Innovation Group LLC; James M. Behmke; Jonathon P. Western

(57) ABSTRACT

The techniques herein are directed generally to providing access control and identity verification for communications when initiating a communication from an entity to be verified. In one embodiment an initiating device initiates a communication to a receiving device on a communication channel, wherein the receiving device is configured to determine whether an identity associated with the initiating device is verified by a verification service. The initiating device verifies the identity through a verification service client application on the initiating device, and conveys, to the verification service over a verification channel, that the identity associated with the initiating device is verified, wherein the verification service conveys, to the receiving device over the verification channel, that the identity is verified. The communication then continues with the receiving device on the communication channel, wherein the receiving device manages the communication from the initiating device according to the identity being verified.

28 Claims, 45 Drawing Sheets

BASIC ARCHITECTURE - USER ONBOARDING

Related U.S. Application Data

(60) Provisional application No. 62/852,850, filed on May 24, 2019, provisional application No. 62/775,302, filed on Dec. 4, 2018.

(58) Field of Classification Search
CPC ............. H04L 63/0807; H04L 63/0876; H04L 63/0853; H04L 2463/082; H04L 63/18; H04L 63/123; G06F 8/61; G06F 21/34
See application file for complete search history.

(56) References Cited

U.S. PATENT DOCUMENTS

| | | | | |
|---|---|---|---|---|
| 10,325,259 B1* | 6/2019 | Shahidzadeh | ........... | H04L 63/20 |
| 10,389,874 B1* | 8/2019 | Farnsworth | ............. | G06F 21/42 |
| 10,855,842 B1* | 12/2020 | Pace, Jr. | ................. | H04M 3/48 |
| 11,089,028 B1* | 8/2021 | Alpaugh | ................. | H04L 63/20 |
| 2012/0144198 A1* | 6/2012 | Har | ........................ | H04L 9/14 |
| | | | | 713/170 |
| 2013/0111205 A1 | 5/2013 | Biswas | | |
| 2013/0339726 A1 | 12/2013 | Yoshida et al. | | |
| 2014/0223573 A1 | 8/2014 | Reedy et al. | | |
| 2014/0310782 A1* | 10/2014 | Vanderveen | .......... | H04L 9/3247 |
| | | | | 726/4 |
| 2015/0082212 A1* | 3/2015 | Sharda | .................... | H04L 67/26 |
| | | | | 715/764 |
| 2016/0127902 A1* | 5/2016 | Ciarniello | ............... | H04L 63/18 |
| | | | | 380/247 |
| 2016/0366119 A1* | 12/2016 | Rykowski | ........... | H04L 63/0815 |
| 2017/0250816 A1 | 8/2017 | Popa et al. | | |
| 2018/0013562 A1 | 1/2018 | Haider et al. | | |
| 2018/0139206 A1* | 5/2018 | Ezell | .................... | H04L 63/083 |
| 2018/0375860 A1* | 12/2018 | Gandhi | ............... | H04L 63/0838 |
| 2019/0149539 A1* | 5/2019 | Scruby | .................... | G06F 21/57 |
| | | | | 713/168 |
| 2019/0325129 A1* | 10/2019 | Wang | .................... | H04L 63/102 |
| 2019/0349372 A1* | 11/2019 | Smith | ................... | H04L 9/3265 |
| 2020/0396331 A1* | 12/2020 | Gupta | ..................... | H04L 63/18 |

\* cited by examiner

PROVIDING ACCESS CONTROL AND IDENTITY VERIFICATION FOR COMMUNICATIONS WHEN INITIATING A COMMUNICATION FROM AN ENTITY TO BE VERIFIED

RELATED APPLICATIONS

This application claims priority to, and is a continuation-in-part of, U.S. patent application Ser. No. 16/703,846, filed on Dec. 4, 2019, entitled STORING INFORMATION WITHIN A ZERO-KNOWLEDGE DATA MANAGEMENT NETWORK, by Shockley, et al., the contents of which being incorporated herein by reference in its entirety. Also, U.S. patent application Ser. No. 16/703,846 itself claims priority to U.S. Provisional Patent Application No. 62/775,302, filed on Dec. 4, 2018, entitled ZERO-KNOWLEDGE DATA MANAGEMENT NETWORK, by Shockley, et al., as well as to U.S. Provisional Patent Application No. 62/852,850, filed on May 24, 2019, entitled PROVIDING ACCESS CONTROL AND IDENTITY VERIFICATION FOR A CONTACT CENTER, by Shaffer, et al., the contents of each of which being incorporated herein by reference in their entirety.

TECHNICAL FIELD

The present disclosure relates generally to communication systems, and, more particularly, to providing access control and identity verification for communications.

BACKGROUND

A contact center is an entity (centralized or distributed, despite the term "center") used for receiving or transmitting a large volume of enquiries by telephone, video, online audio, text (or "txt"), or other real-time contact methodology or live support software. Contact centers may either be outbound, inbound, or both, where outbound contact centers are typically operated for outgoing contact (e.g., telemarketing, solicitations, debt collection, market research, fraud alerts, and so on), and inbound contact centers are typically operated for incoming requests for services (e.g., product or service support, information enquiries from consumers, instructions to perform services such as financial transactions, etc.). Banks, for example, may have both inbound and outbound operations, both accepting incoming user requests (e.g., balance information or transfers), and conversely for reaching out to customers with outgoing offerings or requests (e.g., fraud alert confirmation, etc.).

Contact center agents may either work in centralized call center or/and in a distributed facilities such as at remote (e.g., home) locations with workstations that include a computer and display for each agent and a telephone set/headset connected to a telecom switch or to an inbound/outbound call management system, where the voice, txt, and data pathways into the center are linked through a set of new technologies called "computer telephony integration", or multimedia contact centers. These centers can be operated by either an in-house department (of the company) or a third-party agency (outside of the company) known as a "contact center outsourcer".

Through these contact centers, valuable information can be exchanged between a company and its customers (or other employees of the same company), and customer interactions can be managed generally. One major problem faced today, however, is verification of the user at the other end of the communication. This problem occurs in both directions; namely, a company wants to confirm that they are communicating with the intended customer, and a customer wants to confirm that they are communicating with the intended company. Additionally, customers also want to know that their information is secure, whether from hackers breaking into contact center databases, or from unscrupulous contact center agents who may simply be keeping notes on personal authentication information, including usernames, passwords, security question answers, and so on.

Moreover, as more and more users operate on mobile devices, the increasing sophistication of the users results not only in demands for frictionless user experiences with stringent security to prevent improper use or abuse of their data, but also in a decrease in tolerance for those operations that do not offer such experiences. Multi-factor authentication (MFA), though growing in popularity, is an authentication method in which a device or user is granted access to an application only after successfully presenting two or more pieces of evidence (or factors) to an authentication mechanism: knowledge (something the user and only the user knows), possession (something the user and only the user has), and inherence (something the user and only the user is). However, MFA can often be a frustrating experience, or can be undermined with weak authentication correlation (e.g., sending a text message to a stolen phone to "confirm" that the user is who he or she says they are).

Furthermore, caller ID is simple to fake. Using various known techniques, a hacker can call a bank pretending to be a valid user and can attempt to transfer funds to another account, or alternatively, a hacker can call a client of a bank pretending to be their bank, and can attempt to obtain and compromise personal information from the unsuspecting called party.

SUMMARY

The techniques herein are directed generally to providing access control and user verification (i.e., both called party and calling party verification) for communications, such as for a contact center. In particular, according to one or more embodiments described herein, a method is shown for automatically sorting incoming contacts into "verified" and "non-verified" contacts, as well as for detecting spoofing caller ID "attack" and identifying an "attack level" or a "required security level". In further embodiments, methods are shown for adapting the required authentication level based on the level of risk as determined by an attack level. Still further, methods are shown for tailoring user-interface pop-ups based on the specific information the user wants to share and the manner in which they desire to interface with the platform.

Specifically, the current application is directed to providing access control and identity verification for communications when initiating a communication from an entity to be verified. In one particular embodiment, an illustrative method according to one or more embodiments of the present disclosure may comprise: initiating, from an initiating device a communication to a receiving device on a communication channel, wherein the receiving device is configured to determine whether an identity associated with the initiating device is verified by a verification service; verifying, by the initiating device, the identity associated with the initiating device through a verification service client application on the initiating device; conveying, from the initiating device to the verification service over a verification channel, and in response to the identity associated with the initiating device being verified by the verification service client application, that the identity associated with the initiating device is verified, wherein the verification service is caused to convey, to the receiving device over the verification channel, that the identity associated with the initiating device is verified; and continuing, by the initiating device with the receiving device, the communication on the communication channel, wherein the receiving device is caused, in response to the identity associated with the initiating device being verified, to manage the communication from the device according to the identity being verified.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

A computer network is a distributed collection of nodes (e.g., transmitters, receivers, transceivers, etc.) interconnected by communication links and segments for transporting signals or data between the nodes, such as personal computers, workstations, mobile devices, servers, routers, or other devices. Many types of computer networks are available, including, but not limited to, local area networks (LANs), wide area networks (WANs), cellular networks, broadband networks, infrastructure or backhaul networks, public switched telephone networks (PSTNs), and many others.

Figure 1:
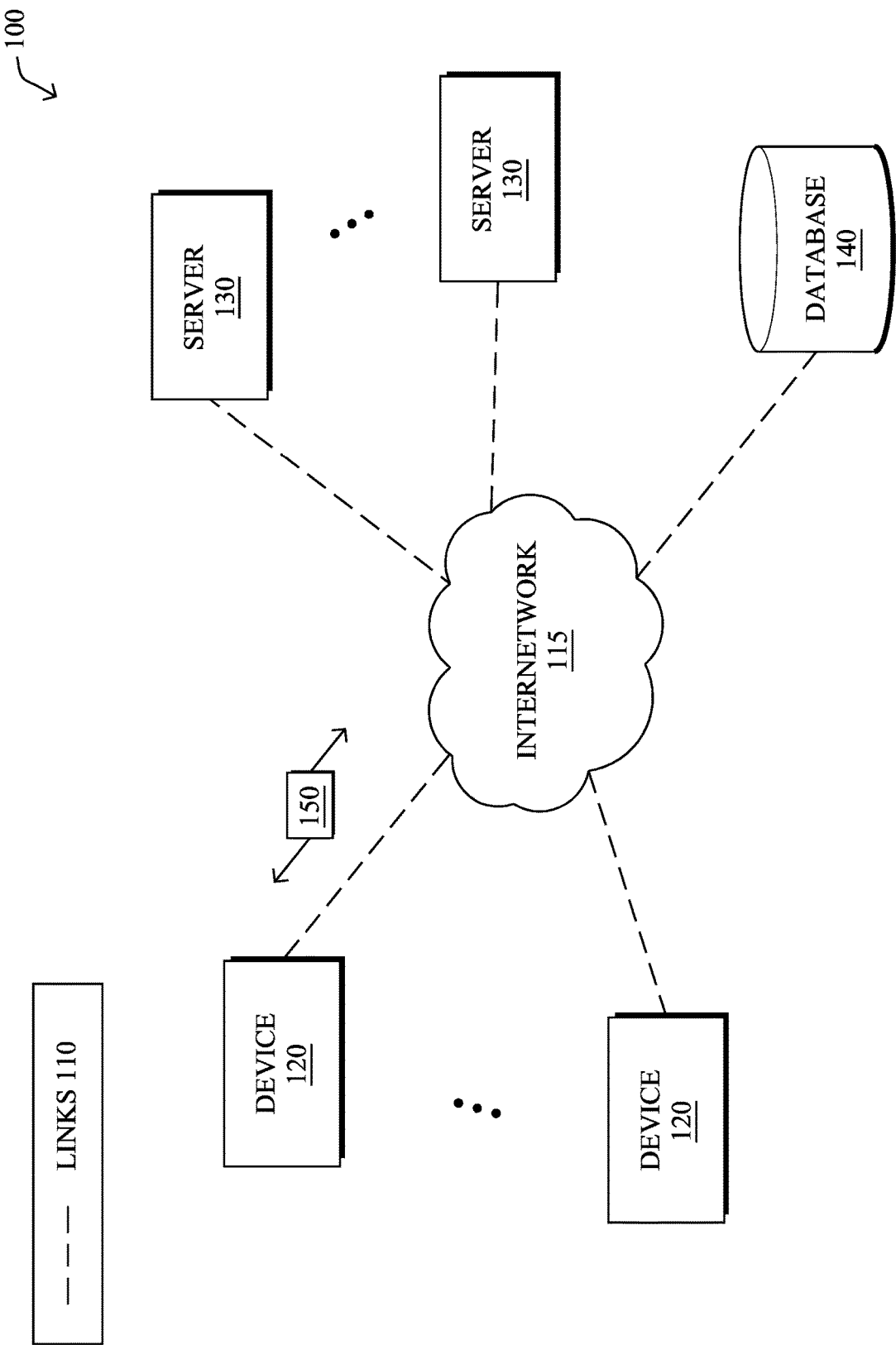
FIG. 1 illustrates an example simplified computer network.

FIG. 1 illustrates an example, and simplified, computer network 100. As shown, computer network 100 may contain various devices communicating over links 110 and an internetwork 115, such as end devices 120, servers 130, databases 140 (which may be part of servers 130 or in communication with and under the control of servers 130), and other devices as will be appreciated by those skilled in the art. Data transmissions 150 (e.g., packets, frames, messages, transmission signals, etc.) may be exchanged among the nodes/devices of the computer network 100 using predefined communication protocols where appropriate over links 110. In this context, a protocol consists of a set of rules defining how the nodes interact and exchange information with each other.

Notably, the computer network 100 may comprise various individual networks intercommunicating with each other, such as LANs, WANs, cellular/LTE networks, PSTN, and so on, and may include any number of wired or wireless links between the devices, accordingly. Note also that while links 110 are shown generically interconnecting with the internetwork 115, any number of intermediate devices (e.g., routers, switches, firewalls, etc.) may actually make up the composition of the network 100 and internetwork 115, and the view shown herein is merely a simplified illustration.

End devices 120 may comprise different types of devices, such as, e.g., personal computers, desktop computers, laptop computers, mobile devices, tablets, smartphones, wearable electronic devices (e.g., smart watches), smart televisions, set-top devices for televisions, workstations, smart vehicles, terminals, kiosks, automated teller machines (ATMs), applications running on such devices, and so on, often interfacing with human users, though not necessarily. For instance, end devices 120 may also comprise drones, automated vehicles, artificial intelligence "beings" or robots, internet of things (IoT) devices, and so on.

Servers 130 and/or databases 140 may comprise singular servers and/or databases, server and/or database farms, cloud-based server and/or database services, network attached storage (SAN), and any other type or configuration of computing devices that provides computing and/or storage services as will be appreciated by those skilled in the art. Servers 130 and/or databases 140 may be centralized (i.e., processing and/or storage occurring on a single device or within a single location of devices) or distributed/decentralized (i.e., processing and/or storage occurring across multiple devices or across a plurality of locations). Notably, for example, servers 130 and/or databases 140 may be deployed on the premises of an enterprise or may be cloud-based.

Figure 2:
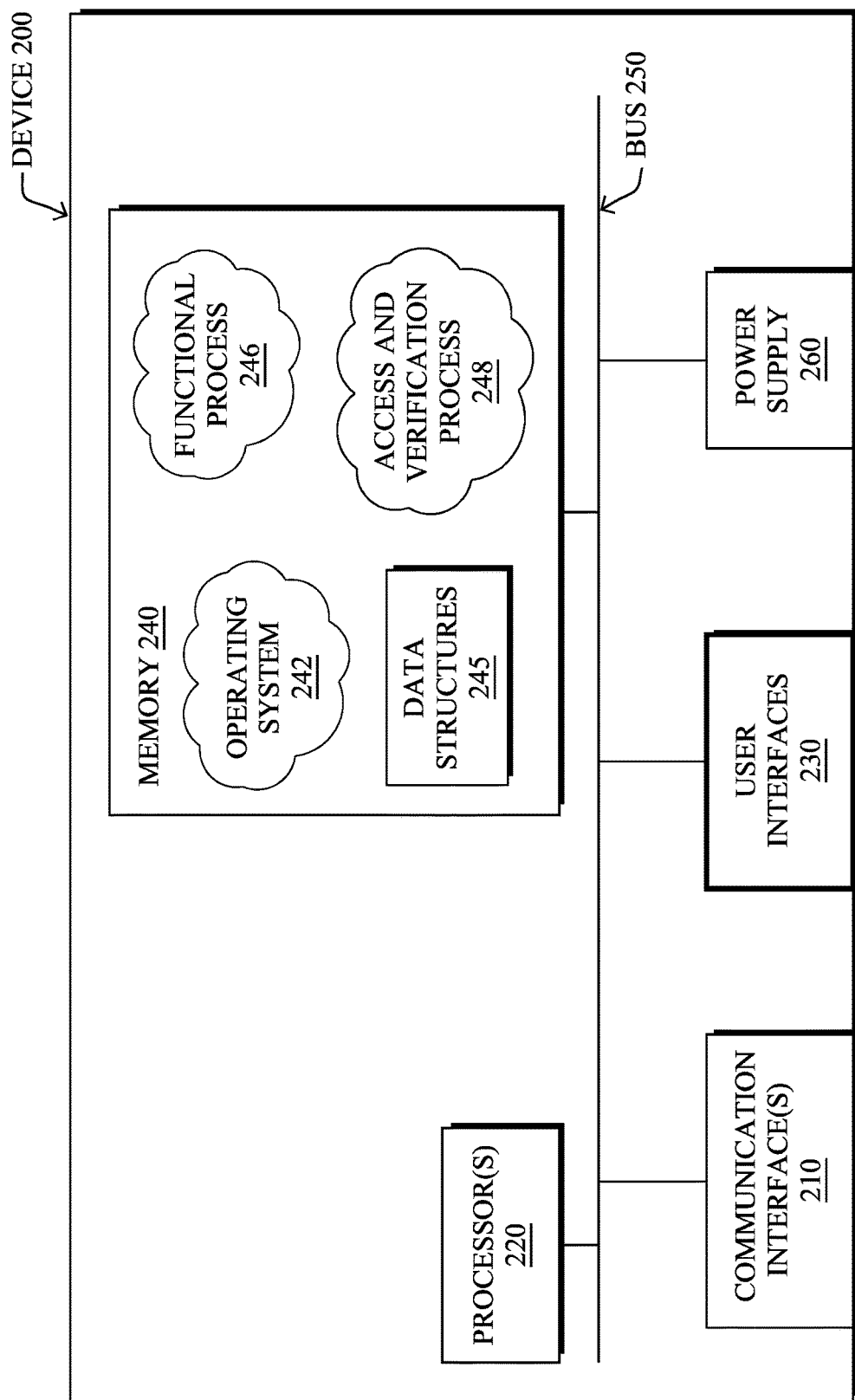
FIG. 2 illustrates an example of a computing device.

FIG. 2 is a simplified schematic block diagram of an example computing device 200 that may be used with one or more embodiments described herein (e.g., end device 120, sever 130, database 140, etc.). Illustratively, device 200 may generally include one or more communication interfaces 210, one or more processors 220, and a memory 240 interconnected by a system bus 250 or other dedicated circuitry, and is powered by a power supply system 260. Additionally, the device 200, where required, may comprise one or more user interfaces 230 configured to solicit and receive user input (input/output or "I/O" components, such as displays, keyboards, touchscreens, biometrics, and so on).

The communication interfaces 210 include the mechanical, electrical, and signaling circuitry for communicating data over wired and/or wireless links of a communication network.

The memory 240 includes a plurality of storage locations that are addressable by the processor(s) 220 for storing software programs and data structures associated with the embodiments described herein. The processor(s) 220 may comprise necessary elements or logic adapted to execute the software programs and manipulate the data structures 245. An operating system 242, portions of which are typically resident in memory 240 and executed by the processor(s) 220, functionally organizes the device by, among other things, invoking operations in support of software processors and/or services executing on the device. Illustratively, these software processes and/or services may include one or more functional processes 246 (e.g., specific to functionality of the device), and an example "access and verification" process 248 that is configured to perform the operations described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

——Access Control and Identity Verification——

As noted above, one major problem faced today is verification of users at the other end of a communication, in both directions. That is, a company often wants to confirm that they are communicating with an intended customer, while a customer often wants to confirm that they are communicating with the intended company. The same could be true for any two users or end-points at either end of a communication.

For example, imagine that a bank initiates an outbound call to a user in order to verify suspicious activity on the user's account. When the person answers the phone, the bank may wish to verify that the person answering is actually the user/owner of the account. Since simply asking the question if they are the owner of the account is clearly insufficient to verify identity, the bank can either ask security questions or may send a multi-factor authentication (MFA) request for the user's account. In the former case, people close to the account owner, such as family or friends who may have answered the phone, may know many of the answers, such as first car, mother's maiden name, street the user grew up on, etc. Also, if the MFA verification uses the phone, such as a text message, email, etc., then all MFA accomplishes is confirming that the answerer has the user's phone, and not necessarily that they are, in fact, the user.

As another example, assume that the user is actually answering the call from the bank. How, now, can the user confirm that it is actually the bank (or government, or doctor, or school, and so on) that is calling? Today, most users rely on the company first providing some information that at least indicates that they know something about the user, but many users still fall victim to phishing attempts where the caller has somehow obtained portions of identifying information (e.g., user's name, phone number, address, last four digits of a social security number, etc.), or the users may simply answer verification questions (passwords, pins, security questions, account numbers, etc.) without even questioning whether they are answering the actual company or someone else looking for fooled users to supply the information.

For example, one potential attack on obtaining source data from one or even a plethora of source devices is a phishing or spear-phishing attempt. Generally, phishing is the fraudulent practice of purporting to be from a reputable company in order to induce individuals to reveal personal information, such as passwords and credit card numbers, while spear-phishing is the research-based practice of pretending to be a known or trusted sender in order to induce specifically targeted individuals to reveal confidential information or transfer funds. Through such a practice, it is possible that a source device (or the user at the source device) could be fooled into authorizing the sharing of sensitive source data with an otherwise unauthorized recipient device.

Through the increased proliferation of digital identities, not only are more than 1-in-10 new account creations fraudulent, but the other 9-in-10 are subject to 100% growth year-over-year in attacks to access sensitive information in a user's account, whether through account takeover or through breaking into and accessing a less-than-secure database.

Information privacy and security are thus particularly important to consumers and computer technology. With the proliferation of hacking incidents against user information, attack vulnerability has been addressed in many ways to prevent or at least detect unsanctioned access to data and user information. Still, to this day, such efforts have been unable to keep up with the dedication of ill-willed individuals to overcome the many layers of security, the authorized access management, and the overall ever-changing data security landscape set forth by the administrators tasked with protecting the stored and communicated data. As mentioned further above, customers want to know that their information is secure, whether from hackers breaking into contact center databases, or from unscrupulous contact center agents, whether at a legitimate contact center or pretending to be part of a legitimate company, who may be stealing personal authentication information, including usernames, passwords, security question answers, and so on.

Further breakdowns of trust and verification can be problematic as well for communications generally, such as where a person may pretend to be calling from a bank or other enterprise when calling a user. For example, by convincing the called party that the caller is the bank, the called party may be tricked into disclosing private information to an unverified caller who is merely claiming to be (and is not) the actual bank/enterprise. Even more so, there is sadly a risk that an unscrupulous contact center agent may use (or sell to another immoral person on a black market, e.g., the "dark net") the personal information of a client, such as by merely copying or remember the private information (e.g., passwords, pins, mother's maiden name, etc.). These crooks could then use the stolen information in a fraudulent call to the bank/enterprise and convincingly pretend to be the lawful entity.

Accordingly, to address the needs of today's sophisticated users and companies, and to prevent infiltration by today's sophisticated hackers, the techniques herein are directed to frictionless user experience and stringent security to prevent improper use or abuse of private information, and also provide intelligent end-user verification without sacrificing the security of the private information. That is, the techniques herein provide access control, assurance that a user is called by a valid enterprise rather by a hacker spoofing the ID of the enterprise, as well as user verification for communications, such as for contact centers. In general, the techniques herein address the verification of the identity of any entity at either end of a communication (i.e., an identity associated with either the initiating device or a receiving device), where the entity may be a person (i.e., user of a device), the device itself, or an enterprise (e.g., a company, bank, government facility, etc.) and any of its authorized agents.

Figure 3:
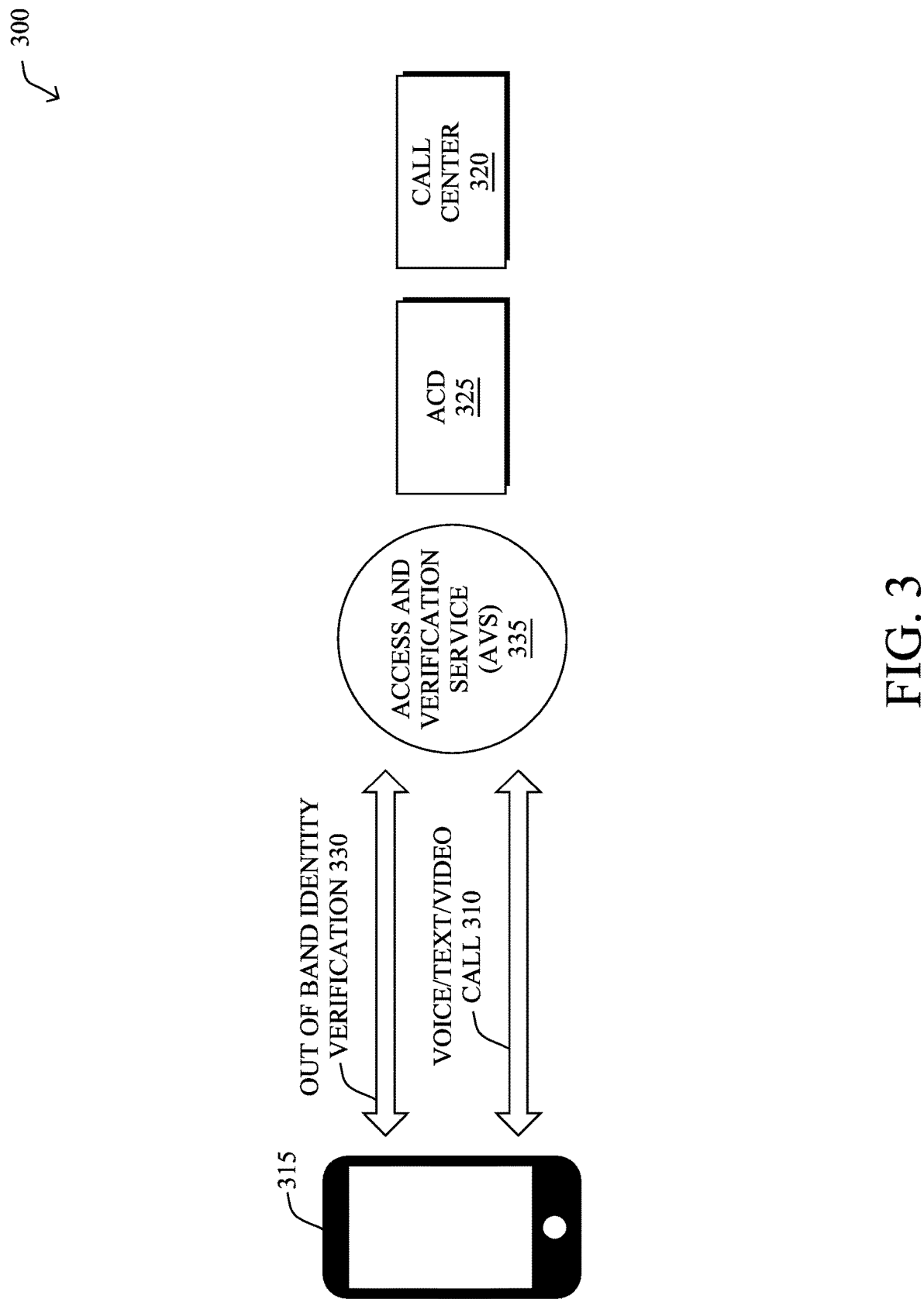
FIG. 3 illustrates an example of verified communication between two endpoints according to one or more embodiments herein.

With reference to FIG. 3, verified communication 300 begins with communications 310 (voice calls, text, video calls, etc.) between two endpoints (over a "communication channel"), illustratively mobile devices 315 and an enterprise, e.g., a contact center 320 (e.g., through an automatic or automated call distributor, "ACD" 325). Through services offered by the techniques herein, referred to generally as "access and verification services" (AVS) (as well as the corresponding AVS application/clients/servers that are configured to participate in such services, as described herein, such as AVS server 335 as shown in FIG. 3), a digital identity verification service may utilize "out of band" data network signaling 330 (over a "verification channel") to ensure the communicating parties (caller and receiver) are who they say they are. Note that as used herein, the "out of band" verification channel implies that the verification occurs outside of the communication channel. In other words, where the "communication channel" is whichever transmission medium is providing the communication between the two end devices (e.g., over PSTN, the Internet, etc.), the "verification channel" is a separate data communication channel (e.g., still possibly over the Internet or other secure transmission network) that provides the verification of identities as described herein (e.g., communications between the end devices and the corresponding AVS application/clients/servers that are configured to facilitate identity verification). Note that in certain example embodiments, the verification channel and communication channel may traverse through the same paths (e.g., both over the internet, but still separate in that the verification does not occur vocally over the voice call or other communication medium, such that the verifier need not hear/see any authentication factors of the entity to be verified).

The strong authentication process offered by the verified digital identity techniques herein:
- is frictionless (e.g., knowledge-based authentication (KBA) is eliminated);
- has proof of mobile device ownership;
- has proof of ownership of credential:
  - (e.g., biometric multi-factor, such as fingerprint, 4-Finger, palm, eye, face, etc.);
  - (e.g., behavioral and continuous verification (e.g., location, motion, app usage, etc.);
- has authentications that include and in some example embodiments enforce a "risk factor rating";
- verifies the identity of both an end-user and the calling institute (e.g., a bank);
- does not require participation by contact center agents in the authentication process, and as such they a) do not see or hear any credentials of the caller (e.g., only knowing that the caller has been verified and authenticated by the application), and b) do not spend time being involved in authentication, thus enhancing the overall productivity of the contact center; and
- does not require a contact center agent to disclose any information to a called party (an outbound call), but rather the called party may only receive a verification notification that the caller (e.g., the bank/enterprise) is who the calling party claims to be.

Additionally, according to the techniques described herein, for each secure contact center call setup, the system:
  provides company-verified or AVS-verified identity;
  eliminates dependence on Caller ID and voice analysis;
  eliminates interactive voice response (IVR) pin reset attacks;
  eliminates call setup impersonation;
  eliminates insider attacks—(personally identifying information (PII) data minimized);
  reduces customer friction with highly personalized call treatment and without requiring re-verification; and
  increases efficiency of a call center by automating the process of end user verification and eliminating the need of contact center agents to participate in the authentication process.

With regard to PII, identity information, such as the Know Your Customer (KYC) data, is also critical for systems that operate, in at least some capacity, based on the provable identity of a user. In particular, source devices can be spoofed (i.e., the source device identifies itself as legitimate, when it is in fact only pretending to be the identified source device), or users themselves can provide false identification (e.g., for money laundering, spear-phishing, or other criminal or generally malicious intent). For example, while online gaming is one area where proving a gamer's real-life identity is likely not critical to the operation of the game, banking, on the other hand, is governmentally regulated to require customer identification to be associated with bank accounts. That is, though banks themselves may not need to know more than an account number in order to perform a transaction, name matching against lists of known parties (such as a "politically exposed person" or PEP), determination of the customer's risk in terms of propensity to commit money laundering, terrorist finance, or identity theft, and a plethora of other reasons have created the requirement by many governments that financial institutions need to verify the identity of individuals wishing to conduct financial transactions with them (e.g., Bank Secrecy Act/Anti-money laundering compliance programs). Specifically, strict background checks may be necessary and information must be shared from many different financial institutions in order to help combat money laundering due to often complex ownership and company structures. In addition to banks, too, customers of various businesses, such as retail merchants, are often required to present an identification to complete a transaction or to sign up for a service. For instance, a merchant may require customer identification for various types of purchases (e.g., alcohol, lottery, or tobacco purchases) or when certain types of payments (e.g., checks, credit cards) are presented to pay for transactions. Other reasons for identity verification include "sockpuppetry", underage signups, spamming, and illegal activities like harassment, scams, and money laundering through social media sites.

Figure 4:
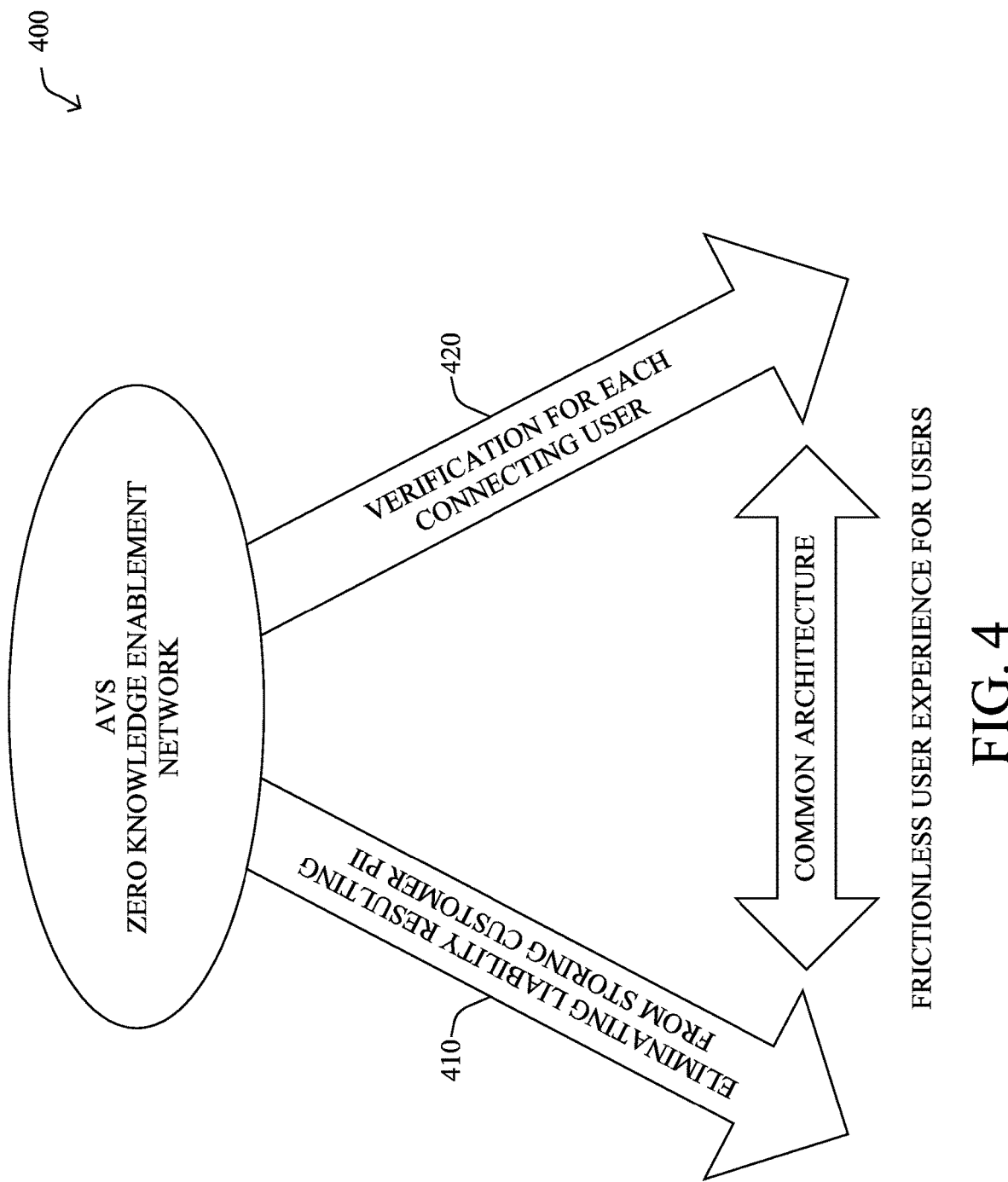
FIG. 4 illustrates an example of a "zero-knowledge enablement network" framework according to one or more embodiments herein.

FIG. 4 illustrates an example of a "zero-knowledge enablement network" framework 400 that may be used for the Identity Network Services system described herein (e.g., AVS). Notably, the left "leg" 410 of the framework is technology that eliminates liability resulting from storing customer PII. Such a "zero-knowledge" data management network, for example one as described in above-incorporated U.S. patent application Ser. No. 16/703,846, filed on Dec. 4, 2019, entitled STORING INFORMATION WITHIN A ZERO-KNOWLEDGE DATA MANAGEMENT NETWORK, by Shockley, et al., allows users to share verifiable proof of data and/or a limitless list of details about themselves (identify information), and businesses are able to request, consume, and act on the data, providing a hyper-personalized experience—all without a data storage server or those businesses ever seeing or having access to the raw sensitive information. That is, the embodiments herein may utilize a decentralized network for trust, identity, privacy, and personalization that reinvents secure data storage and digital identities, where server-stored data is viewable only by intended recipients (which may even be selected after storage of the data). Perhaps more importantly, the techniques herein allow for devices without access to the data to trust the contents of the data (e.g., without even being able to decrypt and access/read the data), guaranteeing that a user's identity is what he/she claims it to be. That is, the zero-knowledge data management system herein can strategically employ the use of an attestation service (e.g., an identity verification service) or other identity verification service (e.g., biometrics such as facial recognition, iris recognition, fingerprinting, voice recognition, etc.), with controlled and limited access to the data (i.e., if desired, no access to the data itself, but instead only access to the fact that the data (to which one does not have access) is verified to be correct).

The "right leg" 420 of the framework in FIG. 4 addresses verification for each user at either end of a communication, such as users connecting to an enterprise e.g., via a contact center or other user-based application. For instance, using an attestation service or other identify verification service through a common architecture (or through a secure interface), the techniques herein may establish a frictionless user experience for users that is above and beyond typical multi-factor authentication, in terms of security (ensuring identity), privacy (protecting identity), and frictionless user experience (ease of functionality).

According to the techniques herein, users are able to share verifiable proof of data, and a limitless list of details about themselves. Enterprises, on the other hand, are able to request, consume, and act on the data, and can provide a personalized experience without compromising privacy or security. Also, enterprises are able to prove that they are the enterprise they claim to be, without disclosing any confidential information to the called (or calling) party. Notably, according to the techniques herein, this is all accomplished without:
  a data storage server having access to the raw sensitive information;
  those businesses ever seeing or having access to the raw sensitive information;
  sacrificing how the businesses interact, and transact with the customers; and
  sacrificing compliance with all business legal obligations.

The techniques herein thus enable enterprises to verify users of mobile and VoIP devices to their contact centers without storing sensitive information on a central server or exposing sensitive information to contact center agents. In this manner, the techniques herein:
  reduce fraud and defend against account take over;
  reduce average call handling time;
  reduce authentication expense;
  improve customer experience;
  protect users from fraud resulting from identity theft such as account take over;
  protect users from agent and contact center access to sensitive user information; and assure that the calling party is what it claims to be (by caller ID and/or timing), without the need for the calling or called party to divulge sensitive information of the called user or the caller (notably increasing the rate of successful call completion for outbound calls, since one of the issues enterprises, e.g., banks, face is that when they call clients, the clients assume that it is a fraud and they do not answer, resulting in a low rate of successful calls).

The techniques herein are specifically tailored to avoid sacrificing how companies market, interact, and transact with their customers, or how they generate reports for third-parties (e.g., government regulatory agencies). For instance, as described below, each user connecting the enterprise or the contact center may be categorized as "validated" or "not validated" (or "verified" versus "unverified"). For those that are not validated, each company, based on their fraud tolerance thresholds, will have their own policy/practice for how to handle those unvalidated users. In other words, as described below, the techniques herein reduce fraud by providing identity assurance, and reduce authentication expense by automatically sorting calls from verified/non-verified connecting users without burdening the validated connecting users. This can translate into a significant savings for the authentication process.

Figure 5:
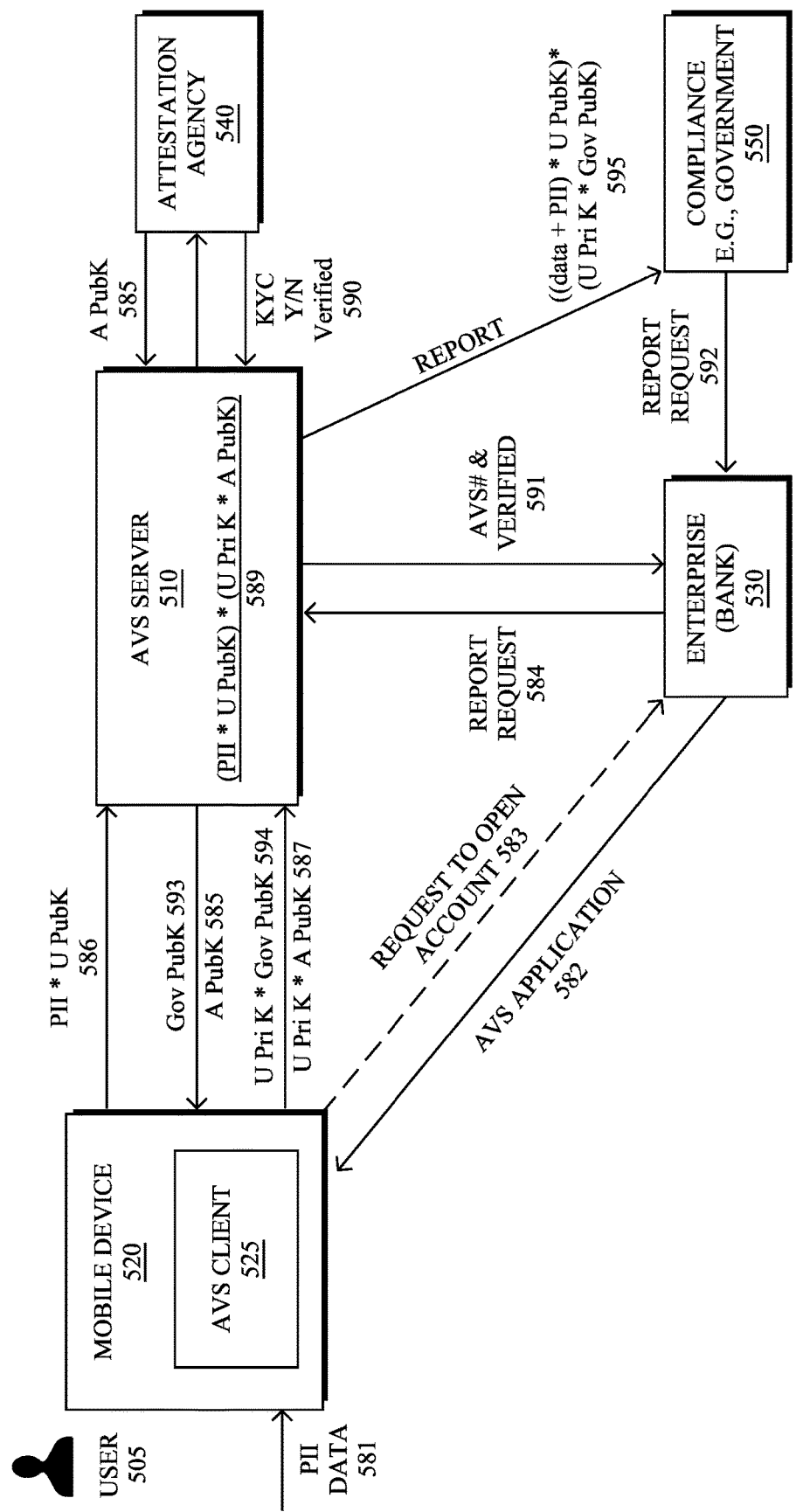
FIG. 5 illustrates an example basic architecture and example flow for user onboarding according to one or more embodiments herein.

FIG. 5 illustrates an example basic architecture 500 and example flow for user onboarding. For instance, the illustrative primary components of the architecture are the "AVS server" 510 (implementing or at least coordinating/facilitating the techniques herein), a mobile device 520 operating an "AVS client" or application/app 525, and an enterprise 530 (e.g., bank), which may be embodied as a local, remote, or distributed contact center. Additionally, an attestation agency 540 may be used to attest to (verify) the identity of the user 505. In certain embodiments, a compliance service 550 (e.g., the government) may also be connected to the AVS server and the enterprise in order to request and receive reports about the users, as will be understood by those skilled in the art. Note that for certain embodiments herein, the communications between the devices in FIG. 5 may be securely managed (transmitted and stored) in accordance with a zero-knowledge data management network as mentioned above. That is, the architecture 500 of FIG. 5 may be used in conjunction with the zero-knowledge data management technique described in FIG. 4 above, serving as a foundation for a infrastructure of both the zero-knowledge data management system and the access control and identity verification system described herein.

According to one specific embodiment of user onboarding and authentication, a third-party (e.g., the AVS server) can obtain attestation from an attestation service by: storing PII information on a third-party server, wherein the third-party server and an attestation service cannot read the stored information; storing, on the third-party server, a re-encryption key that converts the stored information to a format readable to only the attestation service; requesting, by the third-party server from the attestation service, attestation of whether the stored information is correct, wherein requesting comprises applying the re-encryption key to the stored information and sending the stored information, in the format readable to only the attestation service, to the attestation service; receiving, by the third-party server from the attestation service, an indication as to whether the stored information, which cannot be read by the third-party server, is attested as correct by the attestation service; and providing, from the third-party server, the indication as to whether the stored information is attested as correct by the attestation service to an interested device (e.g., the enterprise/bank), without the third-party server knowing the information.

Specifically, this type of "zero-knowledge attestation" according to one or more specific embodiments herein, begins with attestation agency/server being configured as a verification service that comprises one or both of automated attestation or manually assisted attestation techniques, as generally understood by those skilled in the art. For example, a typical identity verification service, in particular, ensures that users or customers provide information that is associated with the identity of a real person, such as by verifying the authenticity of physical identity documents such as a driver's license or passport ("documentary verification"), and/or by verify identity information against authoritative sources such as a credit bureau or government data ("non-documentary verification"). Manually-assisted techniques, which may be performed also through artificial intelligence, may include identity verification through webcams (e.g., holding up a driver's license next to a user's face to confirm the visual comparison and the data on the license). Identity "scoring" (e.g., likelihood that a user is who they say they are) may also be used and shared as a result, e.g., rather than (or in addition to) a simple yes/no or verified/not result. To attest to data integrity, on the other hand, various methods of trusted computing and remote attestation may be used, allowing a program at the source device to authenticate itself (e.g., the software/version running at the source device) or the data (e.g., computed hashes, configuration data, revision tracking, and other data/metadata-based information). Completeness of the records/data may also be attested to, such as confirmations that all requested data fields have been filled in with legitimate answers, even if the accuracy of the answers themselves are not specifically attested to in certain configurations. Note that many different techniques may be used for identity and data integrity attestation, and that the specific techniques shown herein are merely examples for a better understanding of the role and responsibilities of attestation server/agency.

With reference still to FIG. 5, a communication exchange between the devices of the attestation service environment is based on an attestation request from the AVS server. Generally, any device within the system in FIG. 5 can initiate the attestation request, such as the AVS/storage server, the mobile device, or the enterprise/bank as a verifying recipient device which may receive a signed certificate, a confirmation message, etc., without ever seeing the actual information/PII used for attestation.

As an example, a user 505 may enter his/her identity information (e.g., KYC information) as "source data" (PII data) 581 at the source device 520 (e.g., through the AVS app/client 525, which may be downloaded/obtained (582, as shown) from the enterprise 530 (e.g., branded), or from the AVS Server 510 (e.g., general)). The source device may then open an account (e.g., a bank account) through request 583, and since the source data is intended to be kept in secret, the source device or the controller device (enterprise 530) may inform the storage server 510 that a new user is trying to open an account (report 584), and that an attestation to the identity of the user is needed (i.e., the source/PII data), thus "report 584" is also an "attestation request 584". Notably, collection of the source data may be generalized (e.g., the source device collects the data to share generally with other devices as requested), or else the collection may be specifically directed by other devices, such as the attestation server, the controller device, or any other verifying recipient device. That is, the source device may receive instructions from any of these devices to collect the source data, either generally or in response specifically to an attestation request.

The attestation server 540 shares its public key (A PubK) 585, either to the source device 520 directly or else to the storage server 510 who can then share it with the source device. Alternatively, the attestation server public key may be shared with the source device by any other method, including by being publicly known. Note that the source device may already have the attestation server's public key prior to the attestation request, or else may receive it in response to the attestation request (e.g., the storage server connects with the attestation server and obtains the attestation server's public encryption key, to then share it with the source device).

At this point, in this specific embodiment, the storage server 510 may either already have the source-encrypted source data (PII encrypted by the user's public key, U PubK) 586, or else the source device may encrypt the source data and provide the storage server with the source-encrypted source data 586. Here, the source device 520, in response to the attestation request (and in certain embodiments, thus receiving the attestation public key) establishes an attestation-server-based rekeying key 587 through an encrypting combination of the source decryption key (e.g., a private key, U PriK) of the source device and the attestation server public key (A PubK). Accordingly, by sending the attestation-server-based rekeying key 587 to the storage server 510, and in response to the attestation request 584 received at the storage server (i.e., a request to share the source/PII data with the attestation server), the AVS/storage server re-encrypts (e.g., is caused to re-encrypt) the source-encrypted source data 586 with the attestation-server-based rekeying key 587, where the re-encrypting results in the source/PII data being encrypted with the attestation server public key (attestation-server-based encrypted source data 589). Note still that the AVS/storage server is unable to decrypt the source data encrypted with the attestation server public key (i.e., attestation-server-based encrypted source data 589).

The AVS/storage server 510 may then send the attestation-server-based encrypted source data 589 to the attestation server 540 in response to the attestation request. Notably, the specific attestation request for source data may be associated with a trackable identifier (ID) in order to coordinate the attestation to the source data (e.g., a hash function of the data). That is, the ID pairs the request (and also a signed certificate, described below) with the source data (and thus source-encrypted source data).

Once the attestation server 540 receives the source data encrypted with the attestation server public key (attestation-server-based encrypted source data 589) from the storage server 510, then the attestation server applies its own private key to obtain and process the user's identity information from the previously encrypted source data (i.e., decrypting the attestation-server-based encrypted source data using an attestation server private key of the attestation server).

The attestation server may now view, verify, and attest to the decrypted source data (e.g., to the personally identifying information (PII), or else to the data integrity in other examples mentioned herein), using various attestation techniques. For example, PII may be attested to based solely on the source data (e.g., documentary verification) or else on greater information (e.g., non-documentary verification). For example, a communication may be established between the source device and the attestation server, where the attestation server is configured to attest to the PII based on the source data and user interaction via the established communication (e.g., webcam verification, real-time question answering, etc.). Any suitable attestation technique may be used herein, and those mentioned above are merely example embodiments for illustration.

Assuming the data is verified by the attestation server 540 (e.g., manually, autonomously, and/or autonomously with manual assistance), then the attestation server creates a signed certificate (KYC Y/N Verified) 590 signifying (acknowledging) the attestation to the source data (or non-attestation). The attestation contents of the certificate may be anything from a simple "verified" indication, an attestation score, a report of what is being attested to (e.g., "this certifies that user ID #12345 has acceptably provided their identity on this date"), and so on. In particular, according to the techniques herein, the attestation server creates a signed certificate (based on attesting to the source data) that would allow a verifying recipient device to confirm that the source data has been attested to by the attestation server based only on the signed certificate (i.e., without accessing/decrypting the source-encrypted source data). In one embodiment, the verification may be associated with a particular identification number tying it to the original request (e.g., an "AVS # & Verified" message 591), either by the attestation server 590 or appended by the AVS server 510.

In one embodiment, similar to digital signature techniques, the attestation server 540 signs its verification message (signing the signed certificate) 590 by encrypting the verification message (attestation contents) by its own private key (attestation server private key). This message can then be decrypted by any verifying recipient device (e.g., the enterprise 530) with knowledge of public key of the attestation server (which is known to everyone as it is public). Said differently, the verifying recipient device is caused to confirm that the source data has been attested to by the attestation server based on applying the attestation server public key to the signed certificate. Since the public key of the attestation server decrypts the message, it is proof that only the attestation server (the only entity that knows the attestation server's private key) could have written and signed this verification message.

Notably, as shown in FIG. 5, similar zero-knowledge storage and reporting of the PII information may also be performed by the AVS server for sharing reports with the compliance device 550, e.g., sharing KYC PII information with the government for flagged financial transactions. For instance, the compliance device 550 may send a report request 592 to an enterprise 530 (e.g., a compliance report) in response to any number of triggers. Since the mobile device 520 also has obtained the compliance device's public key (Gov PubK) 593, it can then also create a compliance-device-based rekeying key 594 through an encrypting combination of the source decryption key (e.g., private key, U PriK) of the source device and the compliance device public key (Gov PubK). Accordingly, by sending the compliance-device-based rekeying key 594 to the storage server 510, and in response to the report request 592, the storage server re-encrypts (e.g., is caused to re-encrypt) the source-encrypted source data 586 (and optionally other report-related data) with the compliance-device-based rekeying key 594, where the re-encrypting results in the source/PII data being encrypted with the compliance device public key (compliance-device-based encrypted source data 595). Note still that the storage server is unable to decrypt the source data encrypted with the compliance device public key (i.e., compliance-device-based encrypted source data 595). The storage server 510 may then send the compliance-device-based encrypted source data 595 to the compliance device 550, which can then apply its own private key to obtain and process the user's identity information (and optionally other report data) from the previously encrypted source data (i.e., decrypting the compliance-device-based encrypted source data using a compliance device private key of the compliance device).

Figure 6:
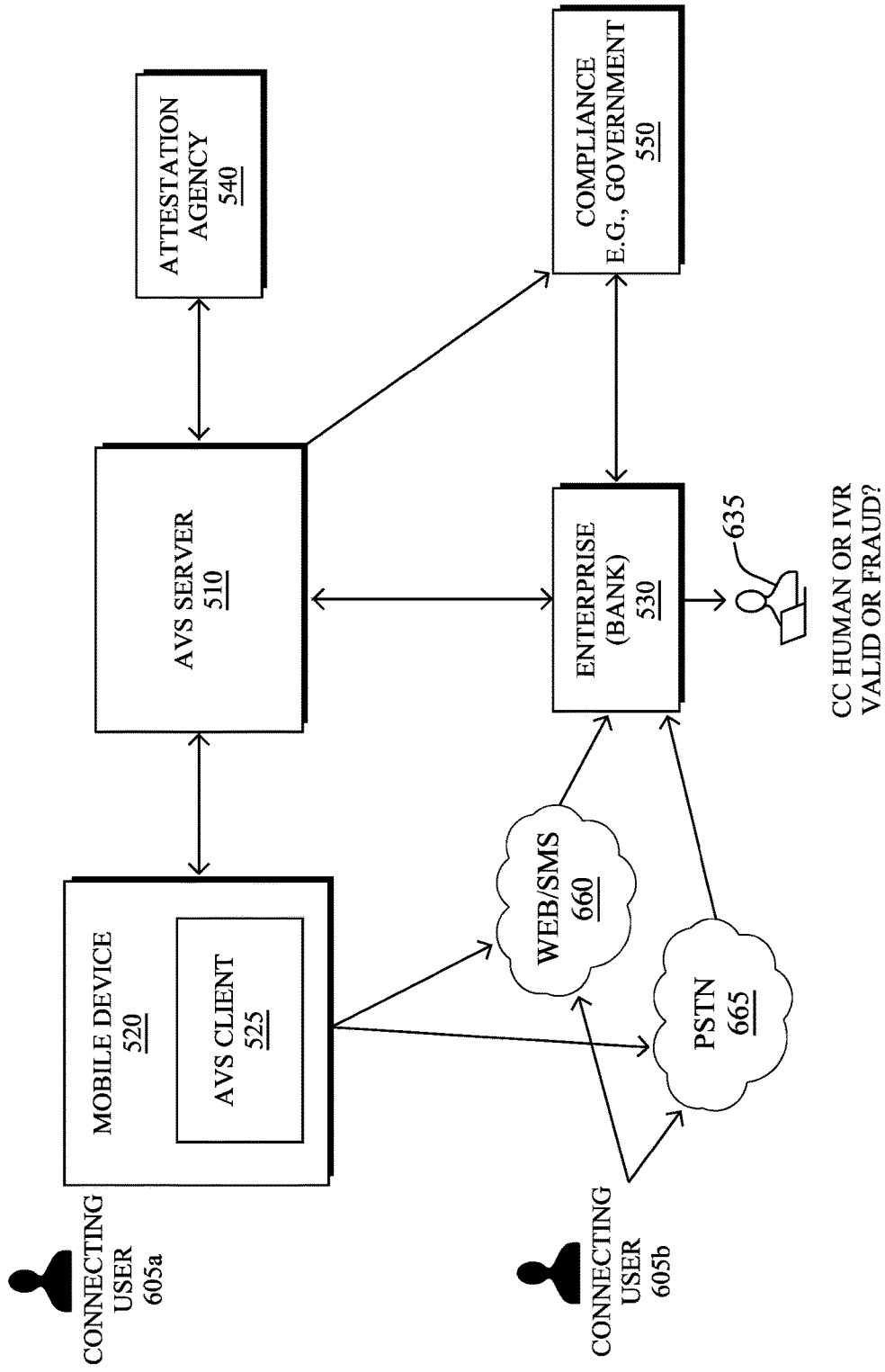
FIG. 6 illustrates an example of verifying a user connecting to a contact center, whether inbound or outbound, according to one or more embodiments herein.

As mentioned above, and with reference now to environment 600 of FIG. 6, in addition to original onboarding attestation of a particular user, there are challenges presented when verifying a user 605 (e.g., a user 605a via the mobile device 520 with an AVS client app 525 or a user 605b without the app 525) via web/SMS 660 or PSTN 665 connecting to a contact center 635 (a human and/or IVR), whether inbound or outbound. In particular, the challenge addressed by the techniques herein, and as described in greater detail below, is to determine whether the connecting user is a verified bank-authenticated (enterprise-authenticated) user or a generic non-verified user. Also, the techniques herein address whether an unverified connecting user attempts to appear as a verified connecting user, and how to mark it as an "attack". Furthermore, the techniques herein may detect the level of threat/attack, e.g., via a spoofed call ID, and may change the required level of MFA/authentication based on that level of threat (i.e., for the appropriate level of identify assurance). Additionally, the architecture 600 illustrated in FIG. 6 assures that the called party, in an outbound scenario, is actually being contacted by the enterprise indicated by the caller ID and not by a hacker pretending to be that enterprise. In yet another aspect of the embodiments herein, the enterprise does not need to disclose to the called party any private secured information other than the caller ID in order to assure the caller that they are being contacted by the enterprise that the caller ID claims. This prevents leakage of information in case the mobile device is answered by a party other than the intended party, particularly for unexpected calls (where expected, e.g., requested calls, may give the called party further confidence that the enterprise is in fact who they claim to be, since the call may be in response to or at a requested time of a call-back.

Figure 7:
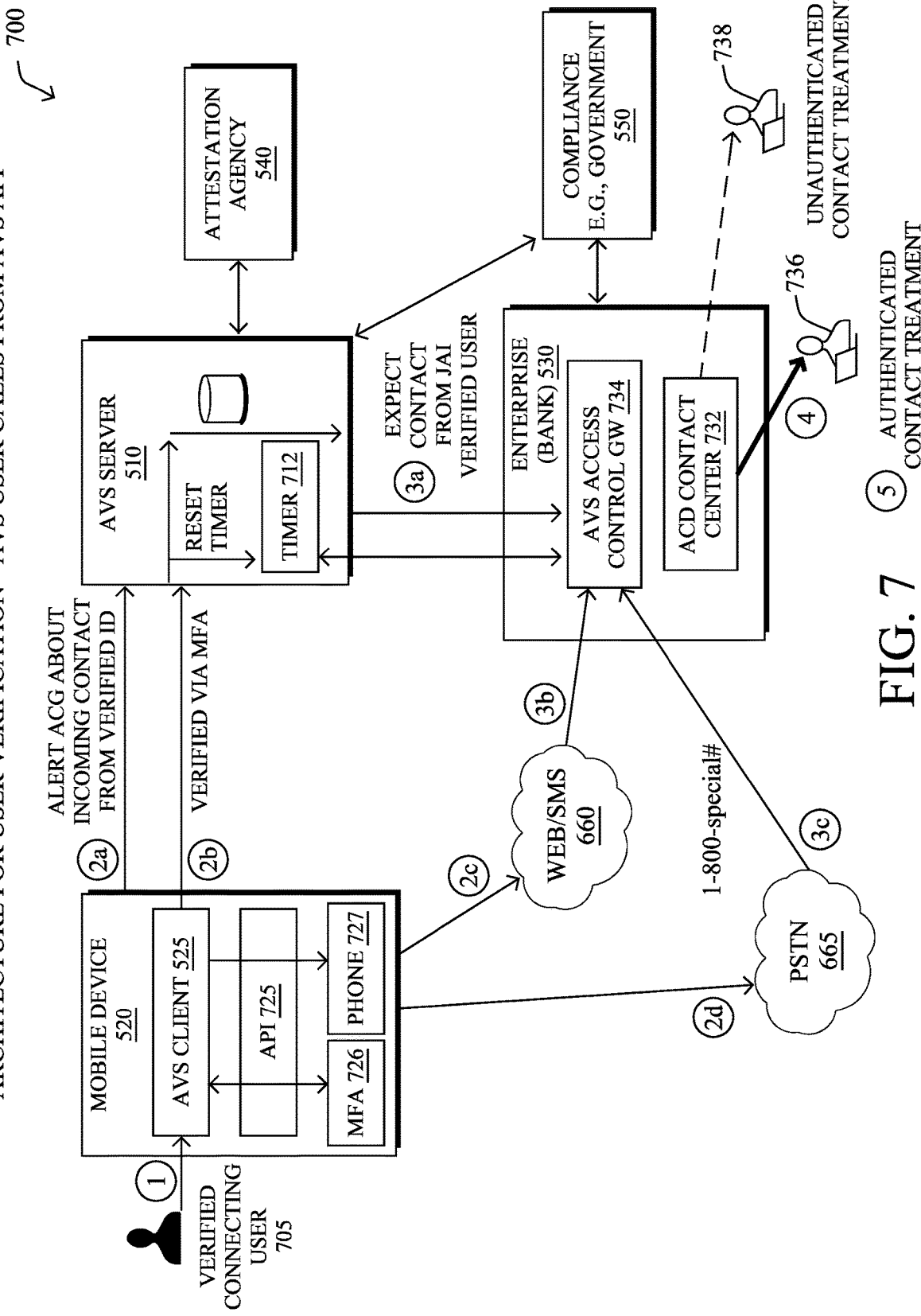
FIG. 7 illustrates an example architecture for user verification, particularly an inbound scenario where an access and verification services (AVS) user (a user with an AVS app) calls from the AVS app itself according to one or more embodiments herein.
Figure 8:
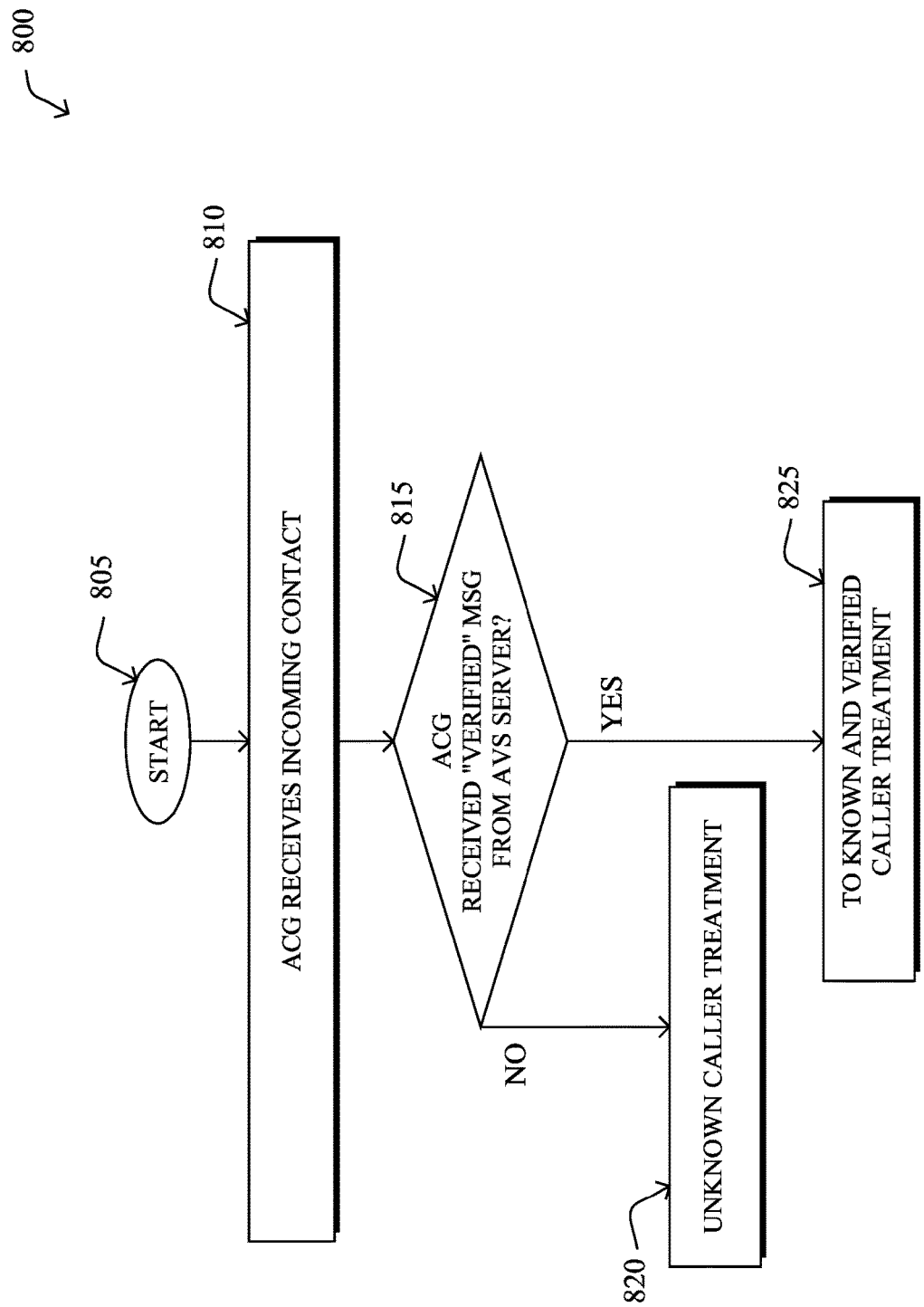
FIG. 8 illustrates an example flowchart detailing a procedure from the point of view of an access control gateway (ACG) in FIG. 7 above according to one or more embodiments herein.
Figure 9:
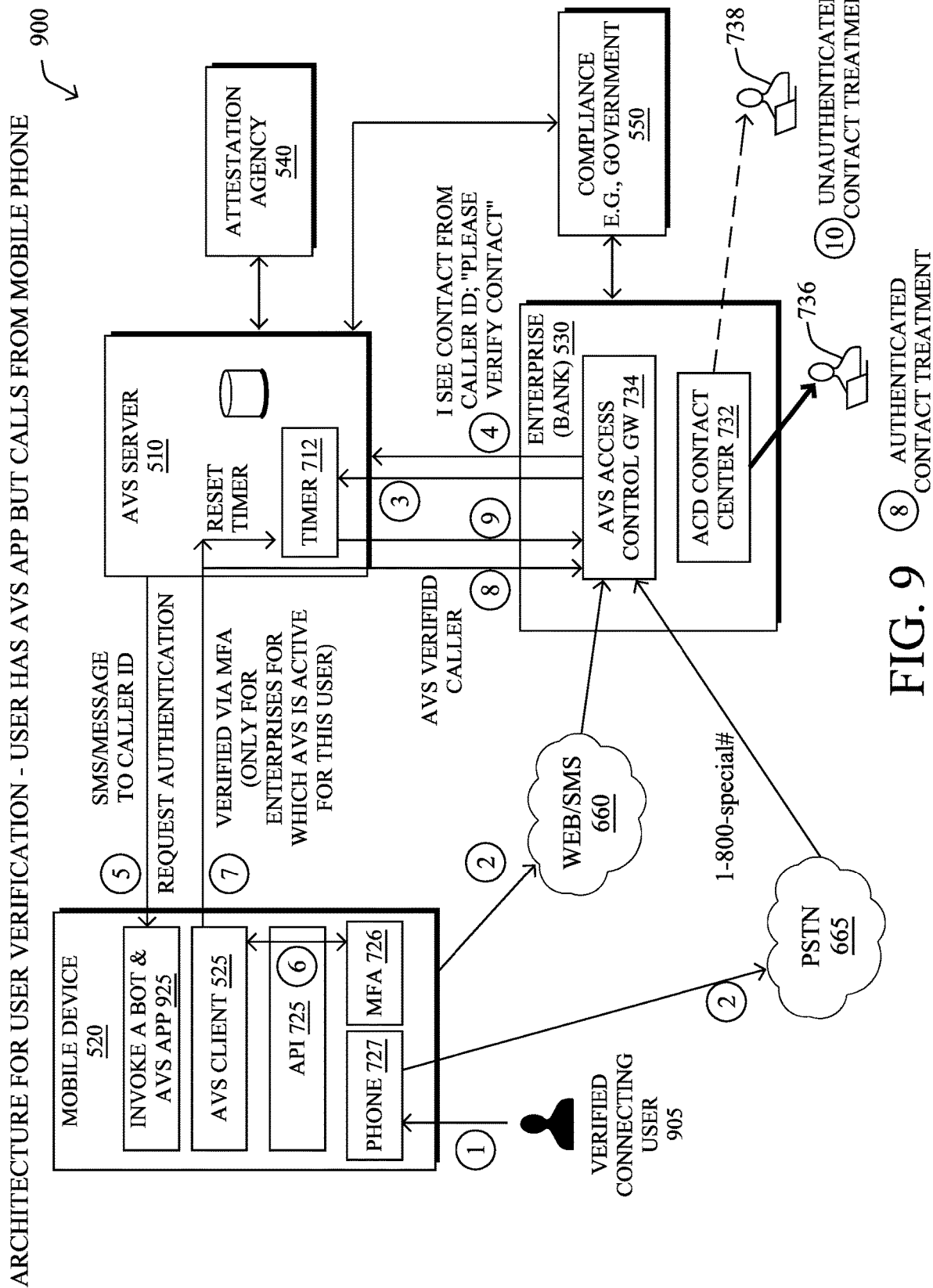
FIG. 9 illustrates an example architecture for user verification, now where an AVS user, with the AVS app, calls the contact center directly from a mobile phone according to one or more embodiments herein.
Figure 10:
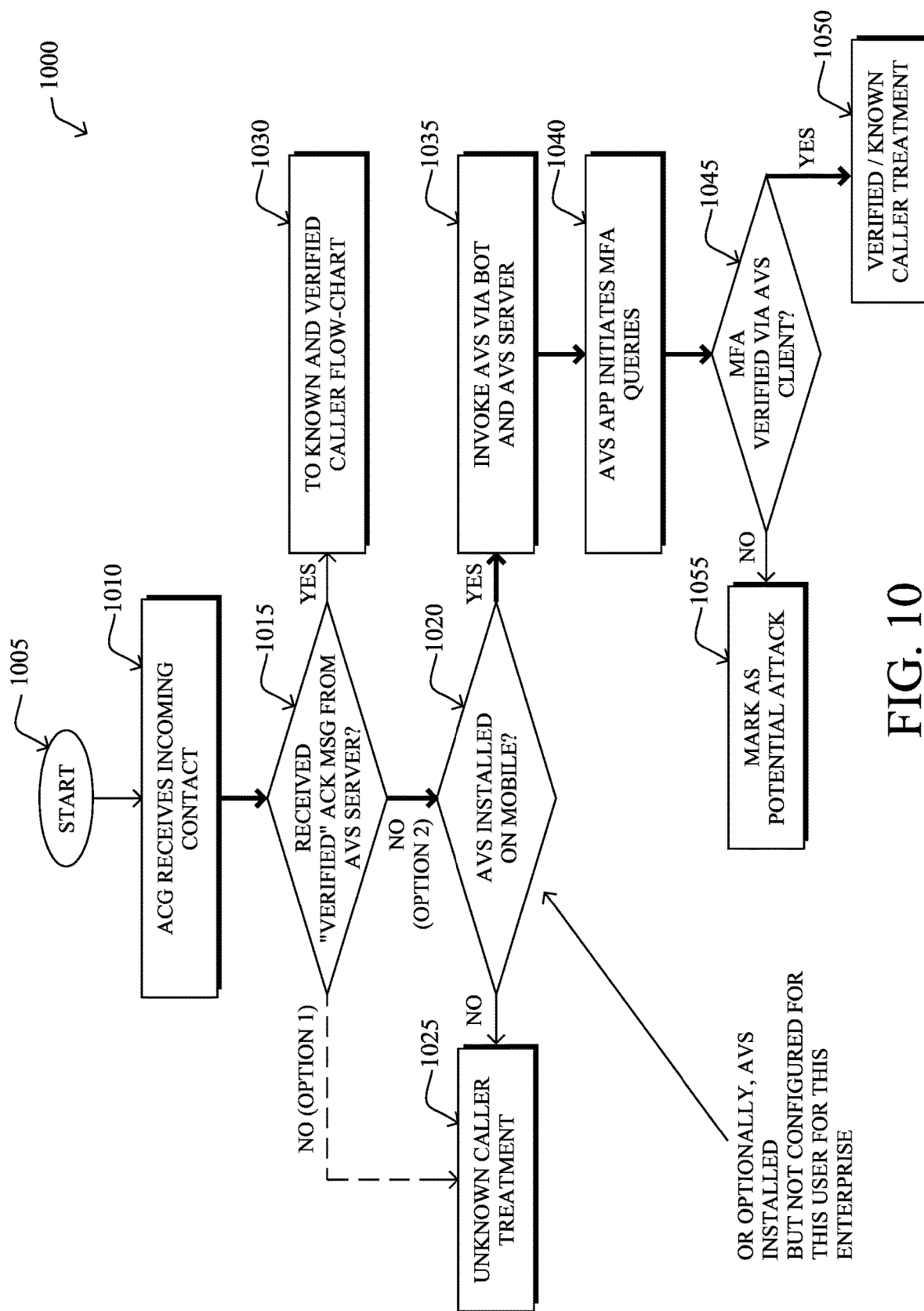
FIG. 10 illustrates an example flowchart detailing a procedure for FIG. 9 above according to one or more embodiments herein.

According to the techniques herein, to verify a user, and thus to establish an "AVS-verified" user (i.e., verified according to the techniques herein), there are two primary use cases to follow below:
1. As illustrated in FIGS. 7-8, a user calling through an (embedded) AVS App, either a standalone verification app or an app associated with a particular enterprise; or
2. As illustrated in FIGS. 9-10, a user calling through a mobile phone which has the AVS App installed.

FIG. 7 illustrates an example architecture 700 for user verification, particularly an inbound scenario where an "AVS user" 705 (a user with the AVS app) calls from the AVS app itself. In particular (and as denoted with corresponding step numbers in circles in the drawing):
1. A user 705 accesses the AVS app 525 on their mobile device 520 and is verified through authentication (i.e., is a verified customer for this enterprise contact center). The authentication may involve fingerprint, facial authentication, iris recognition, password, challenge questions, or any other authentication mechanism required by the AVS authentication. Note that the authentication may specifically take place through an API 725 with an MFA module 726. Note also that the user may be calling by invoking phone communication module 727 via API 725 from an AVS generic application or from a specific enterprise application (which embeds an AVS App), e.g., the enterprise is a bank, and the user is calling from the bank's own mobile application.
2. At this time:
    a. the AVS app may alert the AVS Access Control Gateway (ACG) 734, e.g., via the AVS server 510, about an incoming contact from a verified user ID (e.g., in response to a contact initiation by the verified user);
    b. the verification of the authentication/MFA is sent to the AVS server;
    c. and then the user initiates contact via Web/SMS 660 (e.g., a specific address, which may be known publicly or only via the app); or
    d. else via PSTN 665 (e.g., a specific phone number, such as "1-800-special #" as shown, which may be known publicly or else only through the app—optionally using only an internally known number as a number from which the ACD is willing to accept verified contacts).
3. In response:
    a. the AVS server 510 relays the notification to expect a contact from an AVS verified user (including identification such as caller ID, IP address, etc.) to the AVS access control gateway (ACG) 734; which is then:
    b. received over Web/SMS 660; or
    c. received over PSTN 665.
4. Once the contact is received from the pre-verified user, the AVS ACG 734 verifies that the contact is from the same user for whom the notification has been received within a predetermined time window, and determines that the contact was initiated by a verified user. The AVS ACG then notifies the ACD 732 that the incoming contact is from an authenticated/verified user.
5. ACD contact center 732 can then treat the user as an authenticated contact (e.g., authenticated contact treatment at agent 736, as opposed to unauthenticated contact treatment at agent 738, which may be the same agent just with different verification, or may be a different agent or routing for unauthenticated users generally).

Note that transferring a call to an agent may have a message that carries relevant associated (e.g., minimal) data, such as an indication that the contact has been verified and authenticated, an Account Number, Name, MFA level, etc. According to the techniques herein, the message displayed to the agent contains no password, no date of birth (DOB), or any other sensitive information. Abstraction of the customer PII as relevant for the call (e.g., age group instead of DOB, VIP customer instead of account balance and transactions, etc.), may, however, be included, if such information is deemed relevant to the particular contact center.

Note further that for incoming calls, there are generally two options here: a.) the call center has a single incoming number, e.g., 1-800-num1 number, and all calls to the contact center are coming through that number and through the AVS ACG; b.) the call center has two numbers: one number, e.g., 1-800-num1, which is configured in the AVS client and is intended for use by AVS clients and another number, e.g., 1-800-num2, which is a public number for generic non-authenticated callers to the contact center. In this scenario, only those contacts that arrive at the first number, e.g., 1-800-num1, are processed by the flow described above (provided they were alerted by the AVS server). Contacts arriving at the second number, e.g., 1-800- num2, are marked as unverified, and are treated as contacts from un-authenticated callers.

In case an unauthenticated caller, e.g., a caller without an AVS client, gets hold of the first number, e.g., 1-800-num1, and uses it to contact the call center, the call is received at the AVS ACG. In response, the AVS ACG 734 starts a timer 712 to monitor a predetermined time window. Since the AVS server 510 does not get a notification from the AVS client 525 within a pre-configured time-window, the timer 712 in the AVS server expires signaling to the AVS ACG that the call is from an unauthenticated caller. The call is then transferred for treatment as an unverified caller. Also, if the contact is received at the first number, e.g., 1-800-num, the contact may be marked as a potential fraudulent contact.

Those skilled in the art should recognize that each time a call arrives at the AVS ACG, the AVS ACG sends a message to the AVS timer which starts the measurement of preconfigured time-window. If a notification arrives from the AVS client alerting of an incoming call from the same caller ID before the timer expires, the timer is reset and the AVS ACG is notified of the incoming call as being a qualified call from an authenticated caller. Similarly, if the notification from the AVS client arrives first, the notification sets the timer for the pre-configured timeout. If the call from a caller with the same caller ID arrives before the timer expires, the call is again qualified as arriving from an authenticated caller. Otherwise, if the timer expires, the call is qualified as coming from an unauthenticated caller and is marked as such when it is transferred to the ACD.

FIG. 8 illustrates an example flowchart detailing a procedure 800 from the point of view of the access control gateway (ACG) in FIG. 7 above. In particular, the procedure starts in step 805, then when the ACG receives an incoming contact in step 810, the ACG determines in step 815 whether it has received a "verified" notification (msgs) from the AVS server for the same caller ID, IP address, etc. If not, then in step 820 the caller is marked for an "unknown caller" treatment and is transferred as such to the ACD to be treated by the ACD agent as an unverified contact. Alternatively, if the ACG receives an indication that the AVS server verified that contact in step 815, then the caller is deemed to be known and verified, and is marked for being treated accordingly in step 825 resulting in a frictionless treatment by the ACD agent.

FIG. 9 illustrates the example architecture 900 for user verification, now where an AVS user 905 (a valid but yet to be authenticated customer for this enterprise), with the AVS app 525, calls the contact center directly from a mobile phone 520 (rather than from the AVS client 525). As shown:

1. A (yet-to-be-determined-as-verified) user 905 gets hold of his/her mobile device 520.
2. The user connects (e.g., via Web/SMS 660, or PSTN 665) to the contact center at enterprise 530 directly via the mobile phone (e.g., using the dialer of the mobile phone and directly dialing the call center number, e.g., 1-800-num1, or by texting/sending SMS message to the same number).
3. As the contact arrives at the AVS ACG 734, it sends a message to the AVS server 510 notifying it of the incoming contact. This notification starts a timer 712 with a pre-configured duration in the AVS Server.
4. The same (or a second dedicated message) triggers a txt or SMS message from the AVS server 510 to mobile device 520 (of the user which initiated the contact in bullet 2 above) requesting authentication. In accordance with a specific example embodiment, the AVS server and the AVS client maintain a dedicated encrypted connection via which the message is communicated. Notably, the message sent can also be a branded notification message that is sent from the mobile AVS app 525 (e.g., where this type of message will be seen by the customer as more likely being from the enterprise).
5. When the client 905 sees the indication he/she invokes the AVS client 525 and authenticates himself using the AVS client (note that the AVS application may be invoked by a bot 925 to initiate MFA queries).
6. Upon verifying the authentication, the AVS client 525 replies to the AVS server 510 that the caller 905 has been authenticated.
7. Prior to the timer 712 expiring, the user verification is sent to the AVS server.
8. In this case, the verification of the caller is sent to the AVS ACG 734 and the timer is disarmed. Since the user is verified, he/she is given authenticated contact treatment by the contact center, accordingly. That is, once the contact is received from the pre-verified user, the ACD contact center 732 can then treat the user as an authenticated contact. (Note again that transferring the call to agent 736 may carry associated data, e.g., Account #, Name, MFA level, as well as abstracted PII information, but still no password, DOB, or other sensitive info.)
9. However, if the notification from the AVS client does not arrive before the timer 712 expires (or does not arrive at all), the timer expires and a timer expiration notification is sent accordingly to the AVS ACG 734.
10. Upon receiving the notification that the timer had expired, the incoming contact is marked as a contact from an unauthenticated user. The contact is transferred to the ACD and is treated accordingly with a treatment reserved for unauthenticated contacts (e.g., by agent 738).

FIG. 10 illustrates another example flowchart detailing a procedure 1000 now for FIG. 9 above. Here, the procedure starts in step 1005, and then when the ACG receives an incoming contact in step 1010, it determines whether it has previously received a verified acknowledgment message from the AVS server in step 1015 (e.g., if an installed AVS client is running and has verified the identity). If not, and if step 1020 determines that the AVS app is not installed on the mobile phone (e.g., at least for this user, or is not associated for this user with this enterprise), then the caller is treated as an unknown caller in step 1025. However, if the caller is verified by the AVS app in step 1015, then the caller is treated as a known and verified caller in step 1030.

In the event the caller is not verified first by the AVS server in step 1015, but the user does have the AVS client in step 1020, e.g., with the verification application on their mobile device (and the AVS client of the user is associated with the enterprise), then the AVS application may be invoked (e.g., to activate a non-running/non-open application), such as by a bot or by a message from the AVS server in step 1035 to initiate MFA queries in step 1040 (e.g., asking for a biometric proof of identity through the application). If at this point the MFA can verify the caller in step 1045, then the caller is marked as an authenticated caller and is given verified (authenticated) caller treatment in step 1050. On the other hand, if not, then the caller may be marked as a potential attack in step 1055 (i.e., has the AVS application, but cannot be verified by MFA 726).

Figure 11:
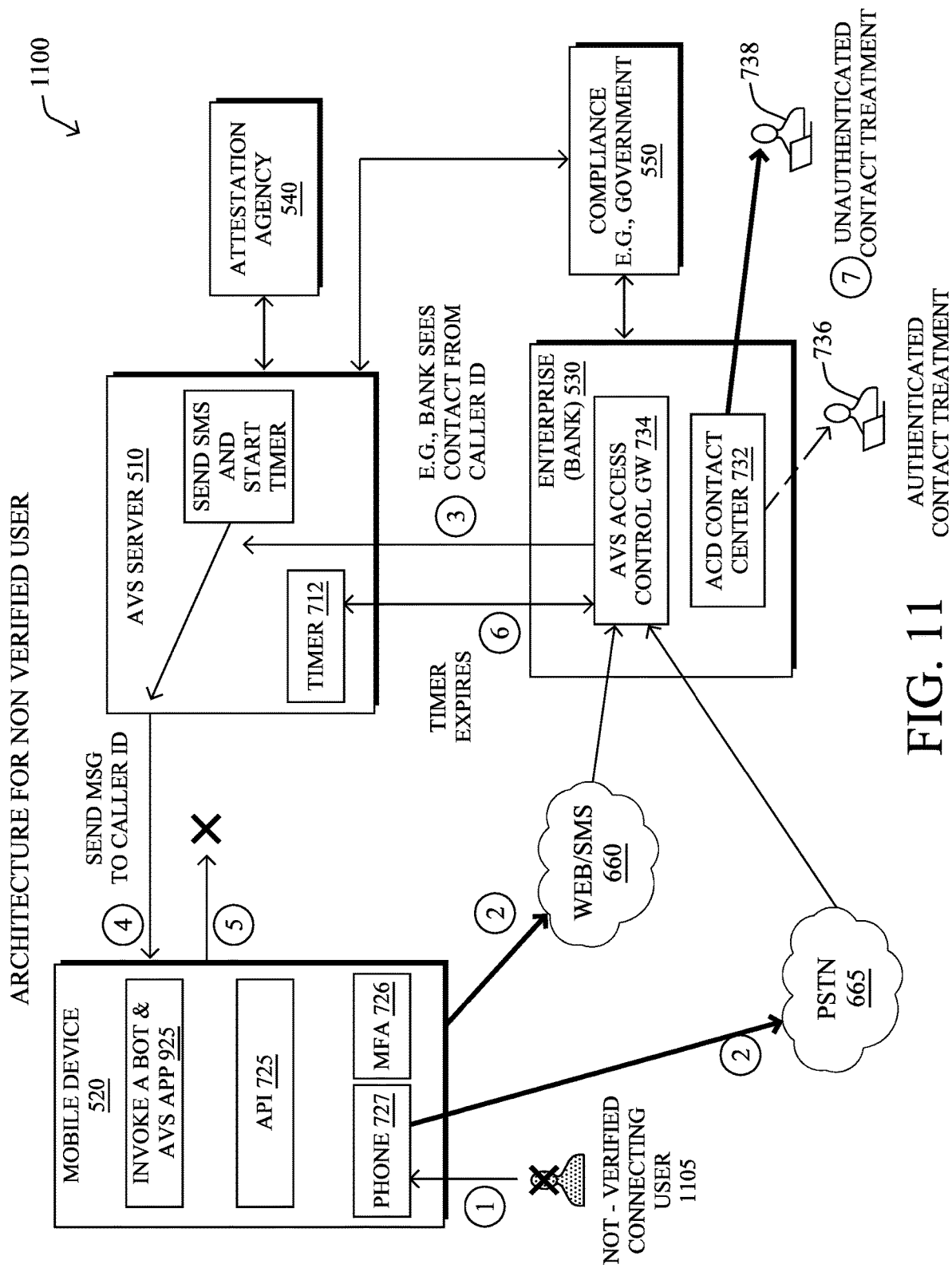
FIG. 11 illustrates an example architectural flow for a non-verified user according to one or more embodiments herein.

FIG. 11 illustrates the architectural flow 1100 for such a non-verified user. As shown:

1. A (yet-to-be-determined-as-unverified) user 1105 gets hold of a mobile device 520.
2. The user connects (e.g., via Web/SMS 660, or PSTN 665) to the contact center 530 by using the dialer of the mobile phone (phone module 727) and directly dialing the call center number, e.g., 1-800-num1, or by texting/sending SMS message to the same (or other corresponding) number.
3. As the contact arrives at the AVS ACG 734, it sends a message to the AVS server 510 notifying it of the incoming call. This notification starts a timer 712 with a pre-configured duration in the AVS Server.
4. The same (or a second dedicated message) triggers a text or SMS message from the AVS server to mobile device 520 (of the user 1105 which initiated the contact in bullet 2 above) requesting authentication.
5. Either because the user who initiated the contact does not have an AVS client on his mobile device or because the user has an AVS client but fails to authenticate himself as instructed, a verifying message is not returned from the mobile device to the AVS server.
6. Consequently, the timer expires before the user can be verified, and a timer expiration notification is returned to the AVS ACG 734. Note that the techniques herein may also detect the level of threat or "attack", e.g., via the spoofed caller ID or otherwise, and may change a required level of authentication/MFA based on that level of threat (e.g., requiring facial identification, rather than merely a passcode). For example, if the system detects that a caller presents a valid caller ID that belongs to the enterprise's customer, e.g., a bank customer, but failed to authenticate themselves, the system keeps track of this event and marks it as an attempt to misuse the caller ID. The system can then ask a caller with the same caller ID to authenticate themselves with additional factors such as voice recognition, facial recognition, etc.
7. Since the user is not verified, the contact is marked as unauthenticated contact and the contact is routed for unauthenticated treatment 738 by the contact center 732, accordingly.

Figure 12:
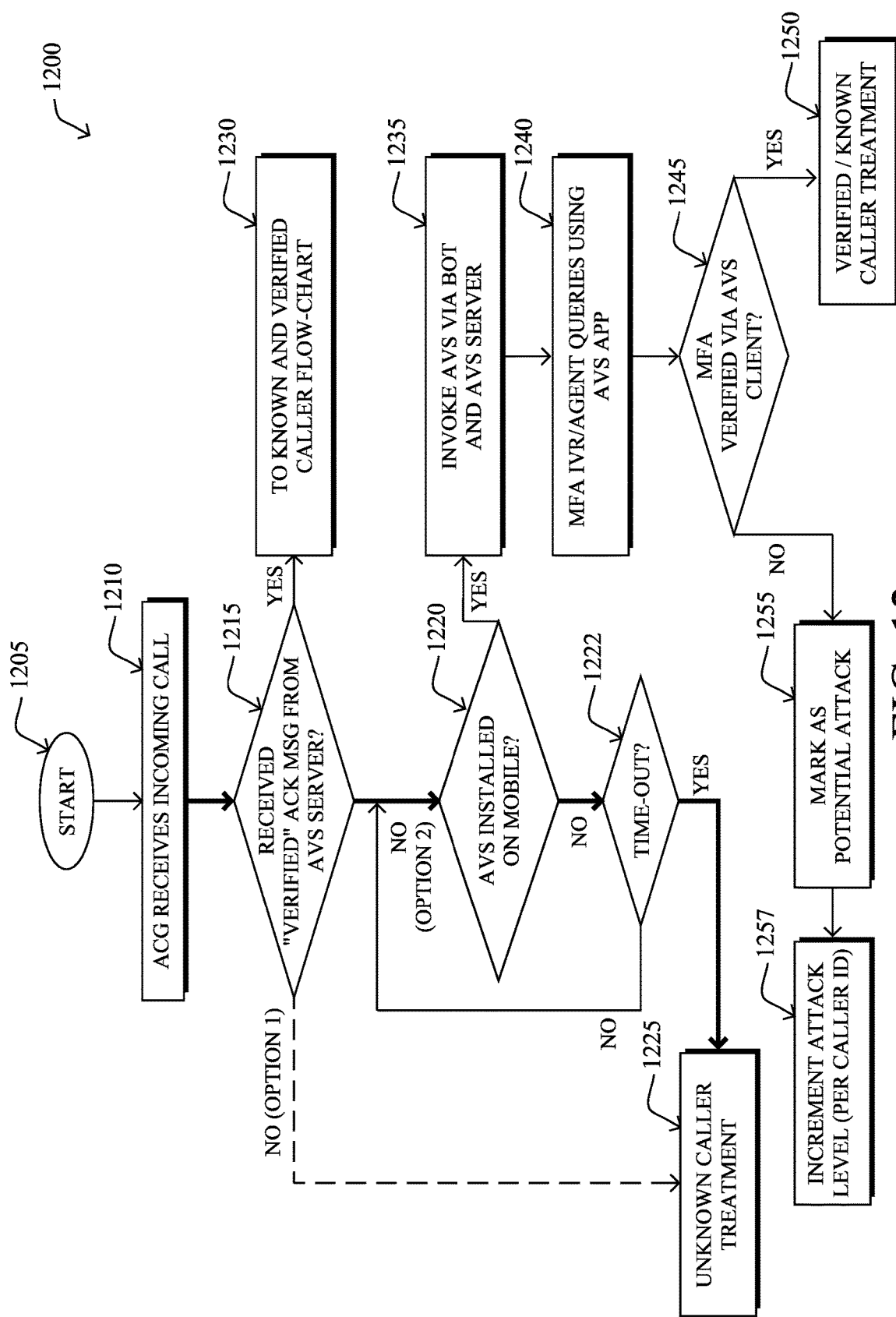
FIG. 12 illustrates an example flowchart detailing a procedure for FIG. 11 above according to one or more embodiments herein.

Similar to FIG. 10, FIG. 12 illustrates an example flowchart for procedure 1200 adding the demonstration of the timeout for AVS not being installed on the mobile device, and for the potential attack level being incremented (e.g., per caller ID), as mentioned above. As illustrated and detailed below, when the timer in the AVS Server times out, the system concludes that the contact is from a user who has not been authenticated and as a result the contact is routed for treatment reserved for unknown/unauthenticated contacts.

Specifically, the procedure 1200 starts in step 1205, and then when the ACG receives an incoming contact in step 1210, it determines whether it has received a verified acknowledgment message from the AVS server in step 1215 (e.g., an AVS app is installed and has verified the identity). If not, and if the AVS app is not installed on the mobile phone (e.g., at least for this enterprise) in step 1220, then once the timer in the AVS Server times out in step 1222, the caller is treated as an unknown caller in step 1225. If the caller is verified by the AVS app in step 1215, then the caller is treated as a known and verified caller in step 1230. If the contact was directed at a dedicated number e.g., 1-800-Num1 which is reserved for calls/contacts from the AVS client the call attempt is identified as a potential security threat and is dealt with accordingly.

In the event the caller is not verified first by the AVS server in step 1215, but the user does have the AVS client in step 1220, e.g., with verification application on their mobile device, then the AVS application may be invoked (e.g., activating an otherwise un-opened/minimized/non-running application) by a bot or by a message from the AVS server in step 1235 to initiate MFA queries in step 1240 (e.g., an MFA IVR/agent asking for a proof of identity through the application). (In accordance with another example aspect of the techniques herein, the AVS client is always active on the mobile device and does not need to be explicitly invoked.) If at this point the MFA can verify the caller in step 1245, then the caller is marked as an authenticated caller and is given verified/known caller treatment in step 1250. On the other hand, if not, then the caller may be marked as a potential attack in step 1255 (i.e., has the AVS application, but cannot be verified by MFA). As noted, the techniques herein may mark attempts to misuse a caller ID and may increment a potential attack level (e.g., to cause the agent to be on higher alert, or requiring greater authentication or limited services) in step 1257.

Figure 13:
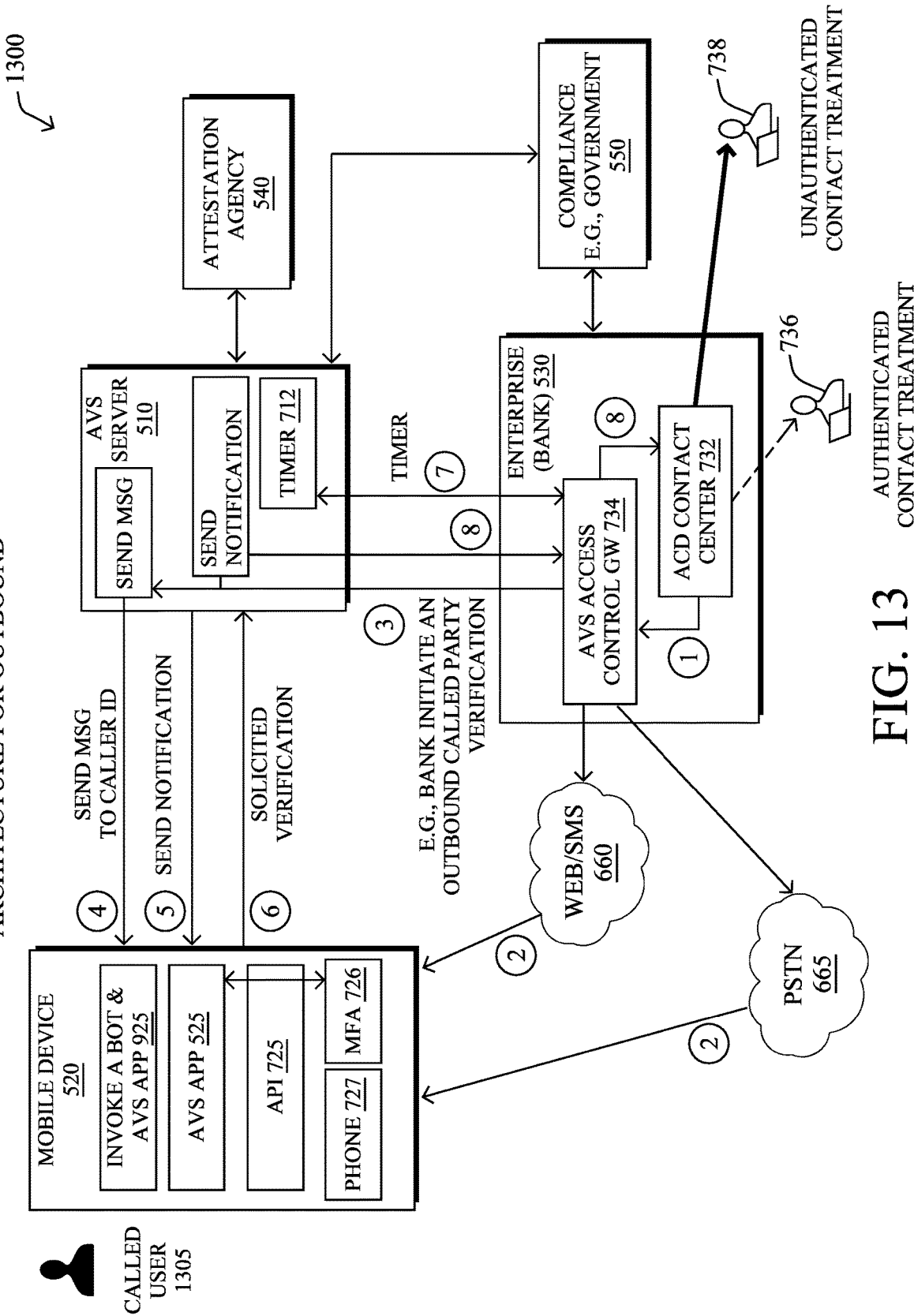
FIG. 13 illustrates an example architecture view of the contact center making an outbound call to a user's phone number (or other contacting identification, such as for VoIP, video calls, etc.) according to one or more embodiments herein.

FIG. 13 illustrates an example architecture view 1300 of the contact center 732 of the enterprise 530 making an outbound call to a user's phone number (or other contacting identification, such as for VoIP, video calls, text message, etc.). As shown:
1. The ACD contact center 732 initiates a contact to a customer ("called user") 1305 (e.g., based on a trigger, a queue, etc.).
2. The contact is extended by the AVS ACG 734 to the user (e.g., via web/SMS 660 or PSTN 665).
3. At substantially the same time, the enterprise also initiates an outbound called party verification process through the AVS server 510, as well as a process to reassure the called party that the contact request is from a valid enterprise and not a spoofed call.
4. An SMS message may be sent from the AVS server 510 to the caller ID of the party (mobile device 520 of user 1305), requesting authentication.
5. Alternatively, or in addition, if the AVS application 525 is installed/running, a notification may be sent from the AVS server directly to the AVS client app, requesting authentication. In either case, whether the AVS client was running on the mobile device or is invoked based on the request from the AVS Server, the AVS client exchanges messages with the AVS server, verifies that the contact was initiated by the enterprise, e.g., the bank, and provides the called party with assurance that the incoming contact is not from a hacker who spoofed the caller ID of the enterprise, e.g., the bank.
6. The solicited verification may then be performed (successful or not).
7. A timer 712 may have been set to allow a set amount of time for a successful authentication to occur.
8. The determination as to whether to acknowledge the answering party 1305 as the verified intended user (for authenticated contact treatment 736) or an unverified (for unauthenticated contact treatment 738) may then be returned from the AVS ACG 734 to the ACD contact center 732 and associated agent. In case the timer 712 expires before a message is received from the AVS client attesting that the intended caller has been authenticated, the contact is marked as an unauthenticated user.

Figure 14:
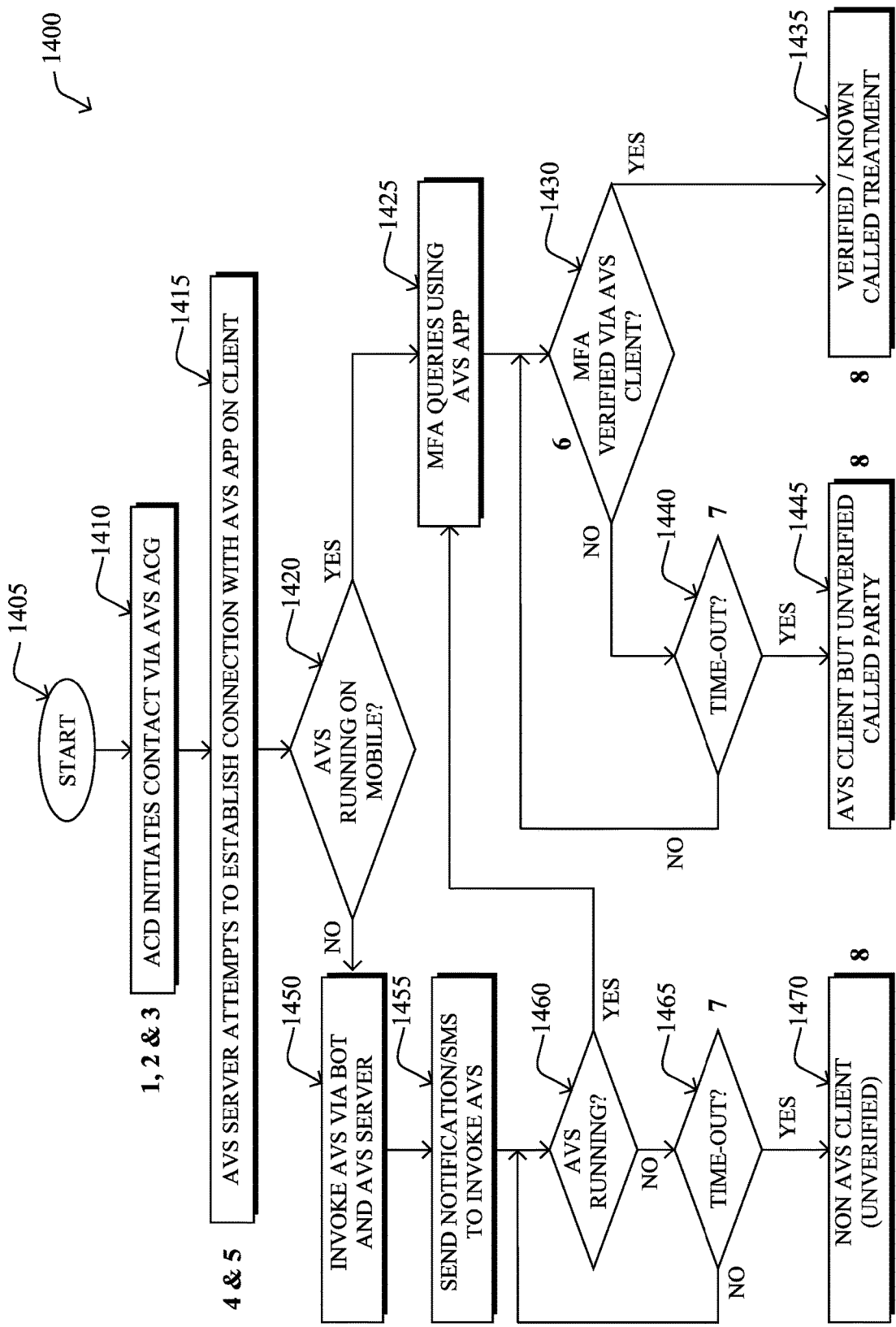
FIG. 14 illustrates an example flowchart detailing the outbound procedure described above in FIG. 13 according to one or more embodiments herein.

FIG. 14 illustrates an example flowchart detailing the outbound procedure 1400 described above in FIG. 13. Specifically, once starting in step 1405, the ACD initiates contact via the AVS ACG (1, 2, and 3 above) in step 1410, and then the AVS server attempts to establish connection with the AVS app on the client (4 and 5 above) in step 1415. If the AVS app is running on the mobile device and the connection is established in step 1420, then MFA queries are made on the app in step 1425, and the user may be verified using the MFA module of the AVS client (6 above) in step 1430, resulting in a verified/known caller treatment in step 1435 (8 above). If the user is not verified by the MFA module of AVS client in step 1430, by an expired timeout (7 above) in step 1440, then the called party is marked as unverified in step 1445, and treated accordingly (8 above), despite the called device having the AVS app installed and running (e.g., someone else may have answered the call).

Conversely, if the AVS app is not running on the mobile device in step 1420, then it may be invoked (activated) via a bot and the AVS server in step 1450, and notifications (alerts) or SMS/text messages may be sent to have the user invoke the AVS app on the mobile device in step 1455. In accordance with another embodiment (not shown) the AVS client application always runs in the background. If the AVS app is determined to be running in step 1460 before a timeout in step 1465, then MFA queries may be made in step 1425 as mentioned above. However, if the AVS app fails to establish communication with the AVS server (e.g., it does not get started) in step 1460 before the expiration of the timer in step 1465, then the person answering the call is marked as unauthenticated in step 1470 and is treated as an unverified person (8 above), who notably may not have the AVS client installed or running.

For a better understanding of the techniques herein, FIGS. 15A-15I illustrate an example of illustrations related to a visual walkthrough of one or more embodiments herein from the perspective of a user's mobile application (e.g., for a bank) and of a contact center agent's application (e.g., desktop app). As mentioned above, the techniques herein establish a secure and private data channel between a user's mobile app and a contact center app, which provides authentication prior to connecting a call/communication channel (e.g., biometric-based authentication or otherwise), behavioral and historical call routing, and zero knowledge requests for information. In addition, the techniques herein improve outbound connect rates with branded messages and frictionless authentication. Moreover, authenticating the to-be-verified party (called party or calling party) without involving agent results in improved efficiency/productivity of the enterprise/call center.

Figure 15A:
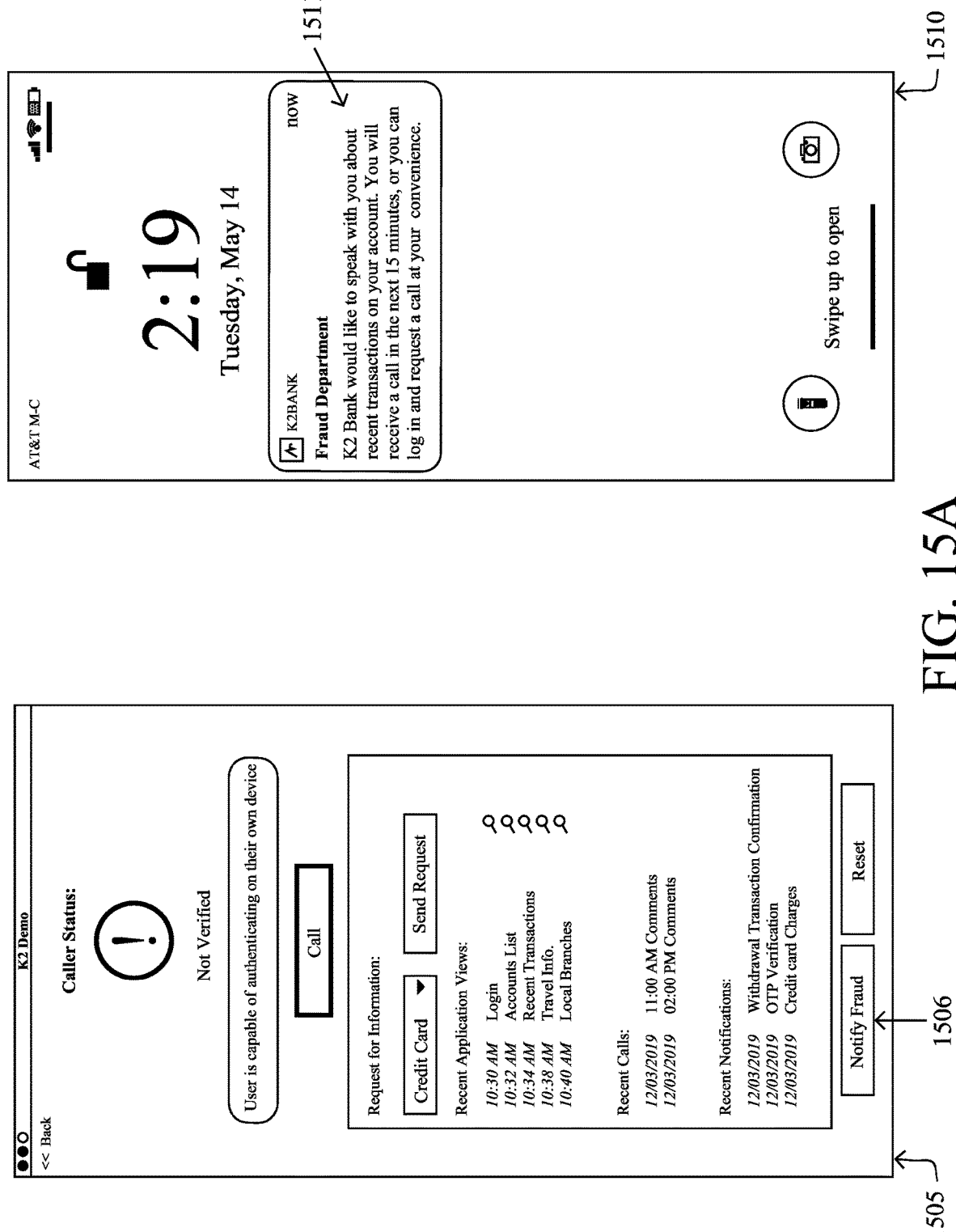
FIGS. 15A-15I illustrate an example walkthrough discussion of providing access control and user verification for a contact center according to one or more embodiments herein.

As shown in FIG. 15A, an example call center application such as an agent desktop (view 1505) is shown illustrating various status information which is provided to the contact center agent about a given user, who at this point, remains un-contacted and un-verified. The call center agent could be manually examining a customer's information, or else an automated alert may have triggered a reason for connecting with a user, such as a suspected fraud confirmation, or any other reason. In another example, a queue of users/customers may need to be called (e.g., for larger lists of calls that need to be made, such as for marketing, account changes, product recall, medical alert, etc.), and in this instance the techniques herein may be integrated with contact center computer telephony integration (CTI) to recognize when a user's number is approaching the top of a list manager's call queue.

Either by manually pressing a notification button in the agent's app (e.g., the "notify fraud" button 1506 at the bottom of the app), or else through programmatic triggers, a customizable (e.g., branded) notification may be sent to a user's preferred device(s) (e.g., mobile device view 1510 with pop-up notification 1511) to alert them of an upcoming call.

Figure 15B:
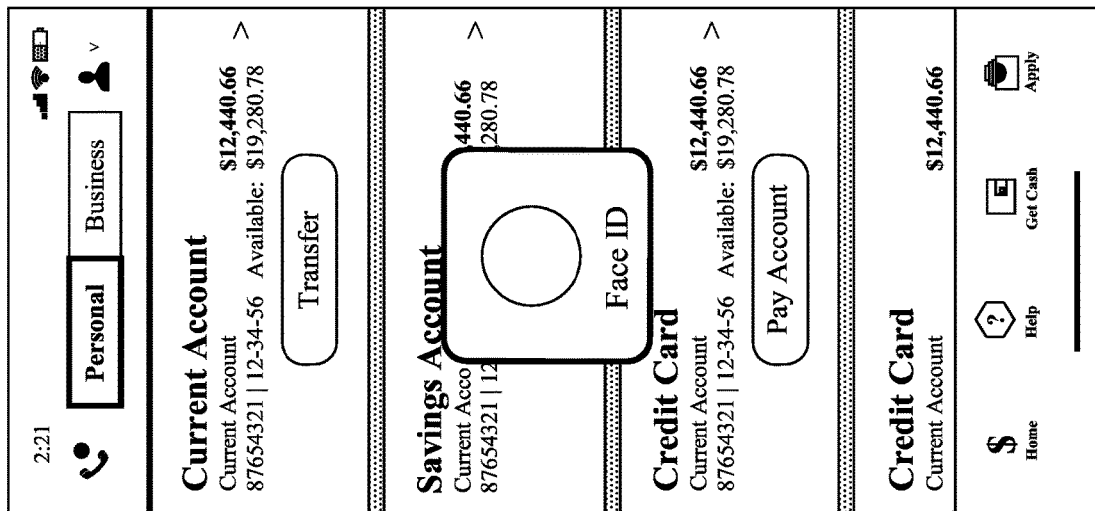
Figure 15B:
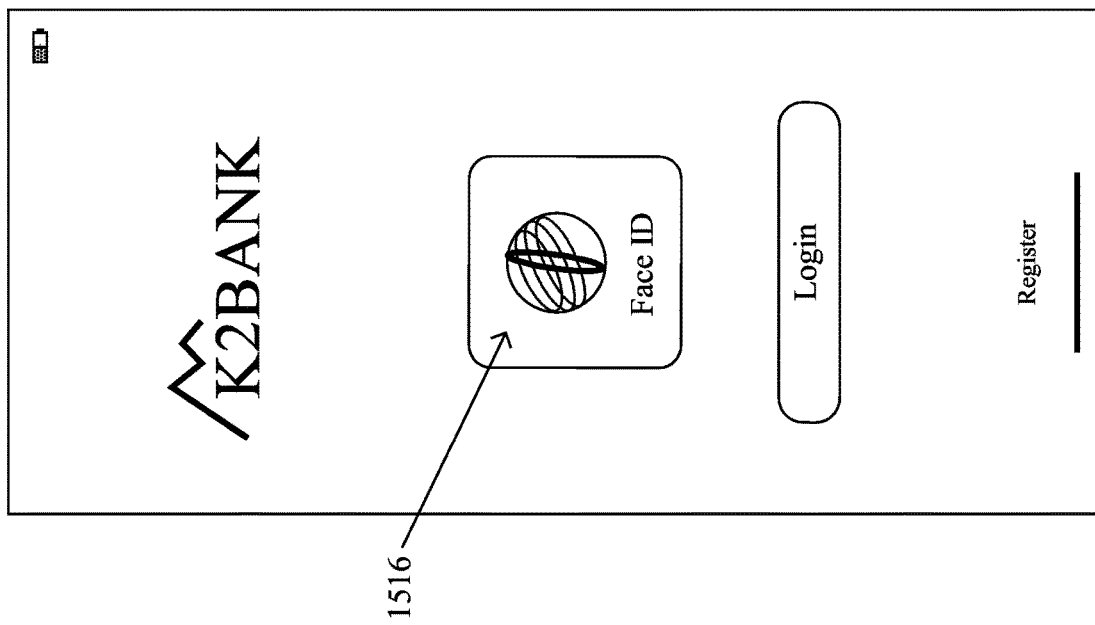
Figure 15C:
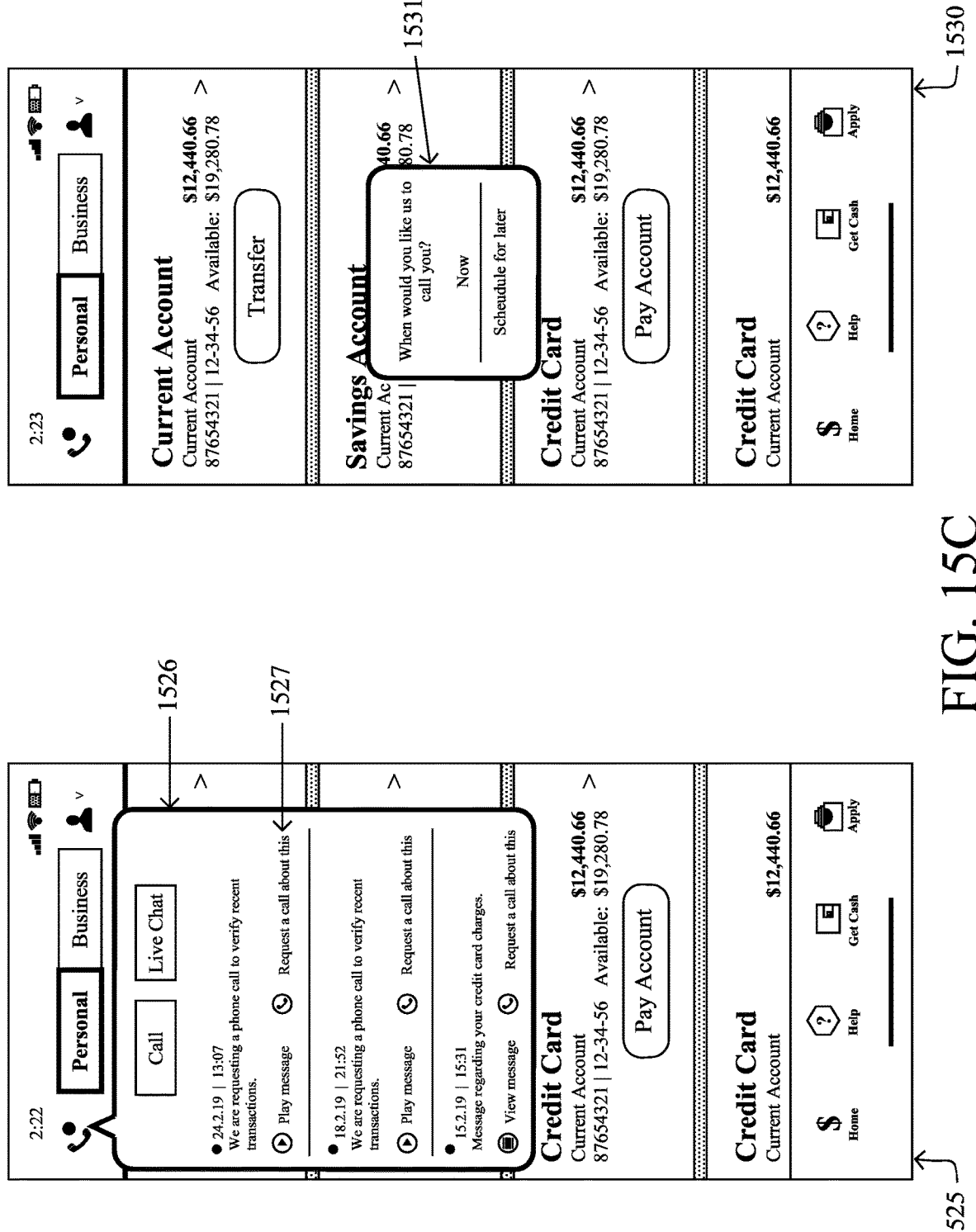

When the user taps the notification, it may open the associated company app (e.g., bank app), which as shown in FIG. 15B (view 1515) may request authentication of the user (e.g., authenticating with facial recognition 1516, fingerprint, etc.). When the AVS app/client is invoked it connects with the AVS server and over a secured connection verifies that the contact is being initiated by the enterprise, e.g., by the bank. The called party is then notified that the incoming contact request is from a valid enterprise, e.g., the bank, and not from a hacker who attempts to spoof the caller id of the bank. Upon authentication, the user's application may then be opened (view 1520), and the user may be delivered to a notification center to see more details regarding this notification (e.g., and any other previous notifications), as shown in FIG. 15C (view 1525, notifications 1526). Now, the user has the opportunity to tap an option to "request a call about this" (1527), which invokes an authenticated contact treatment and ensures that the user will not be placed at the end of the queue for a generic agent who is unaware of any unique account needs, but rather an agent who is ready to discuss the particular notification and who knows that the user is already verified.

Figure 15D:
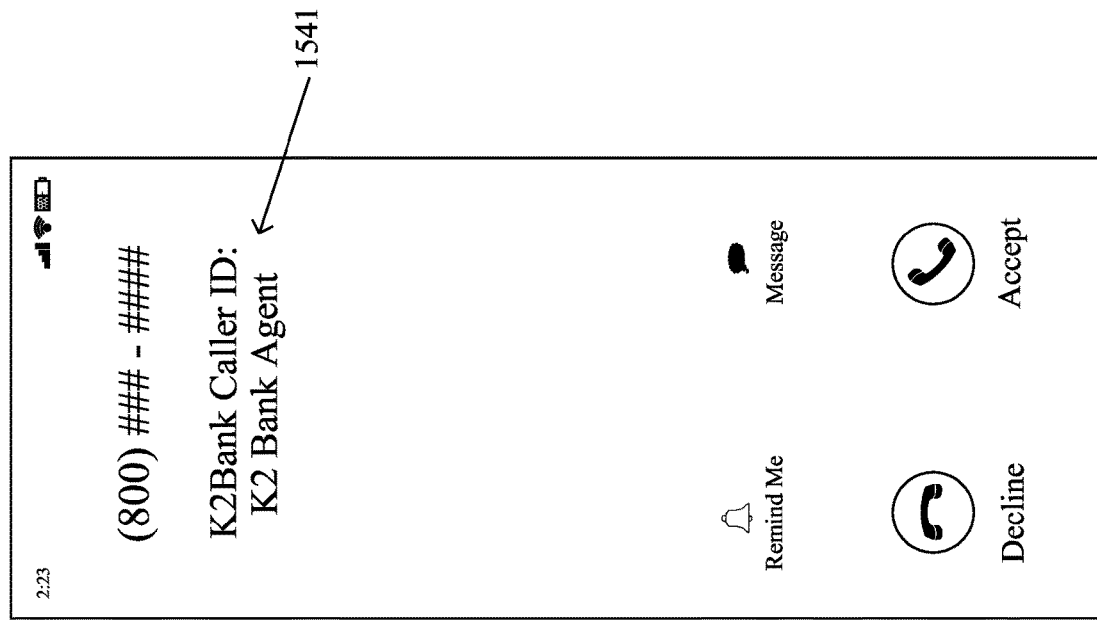
Figure 15D:
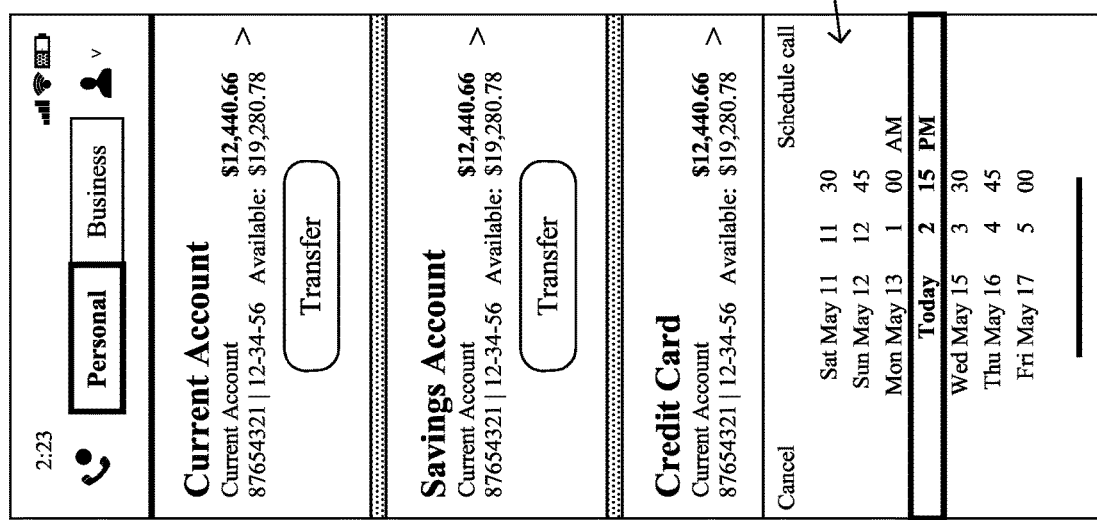
Figure 15E:
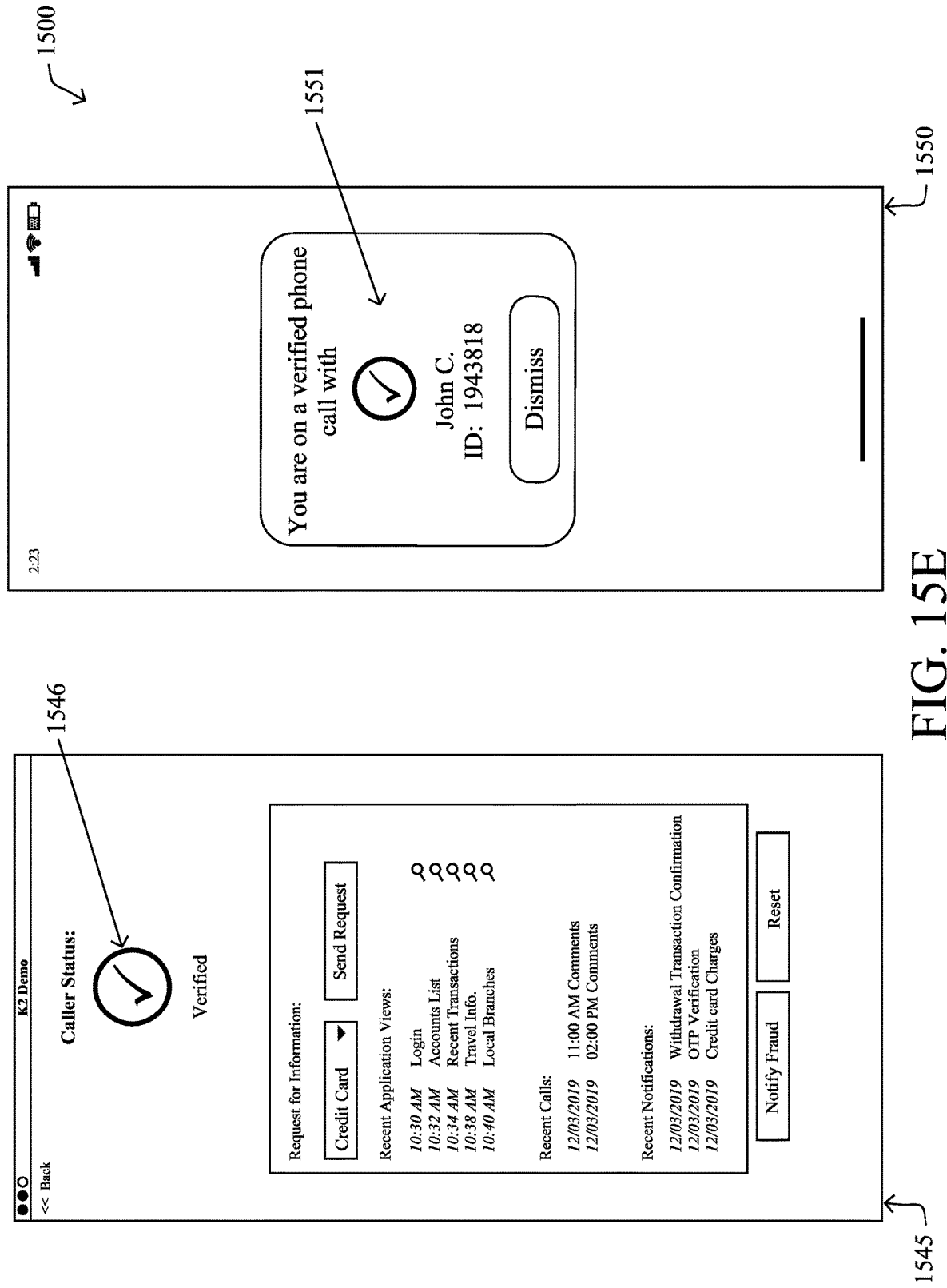

As shown in FIG. 15C view 1530, the user may be prompted (prompt 1531) to request to be called now, or a callback for later time (e.g., bringing up FIG. 15D, view 1535, for selecting a suitable date and time in window 1536). When requesting to be called now, since the user is already biometrically authenticated, the user can bypass any knowledge-based authentication (KB A) entirely when called by the contact center. Notably, when being called by the contact center, the contact center's caller ID will appear (FIG. 15D view 1540, ID 1541), and the call will be at the expected time (now or when requested). In some example embodiments, the display includes language mentioning to the called party that this call is in response to their request for a call, e.g., regarding the fraud notification (not shown).

On the agent desktop app (FIG. 15E, view 1545), it can now be seen that the caller status has changed to verified (status 1546), while on the mobile device (FIG. 15E, view 1550), a banner 1551 shows that the user is now on a verified phone call with a particular agent (e.g., name and ID number) and not on a call with a hacker spoofing the contact center of the enterprise.

Figure 15F:
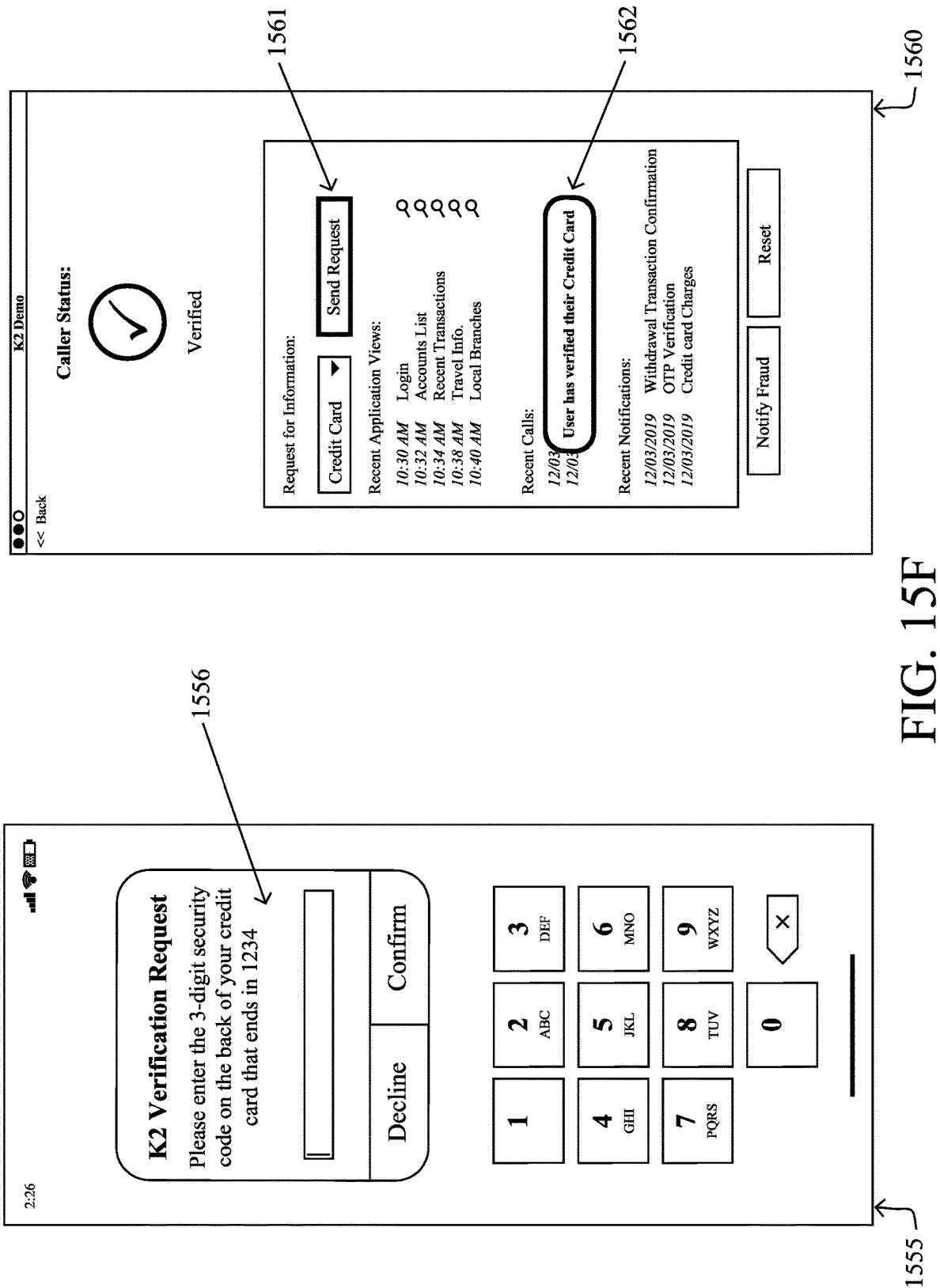

Once a secure data channel is established between the agent and the called party, the agent has an alternative to asking the user to share sensitive details, such as by sending a request to verify proof of having a credit card (e.g., clicking "send request" on the agent app for credit card verification), without having to send the information to the agent. For instance, as shown in FIG. 15F (view 1555), after an agent, on their view 1560 of FIG. 15F, clicks "send request" 1561, the user is prompted to enter security code for the credit card in a pop-up banner 1556. Once entered correctly, then the agent desktop may pop up a notification 1562 as confirmation that this card has in fact been verified, without exposing that sensitive information to the agent.

Figure 15G:
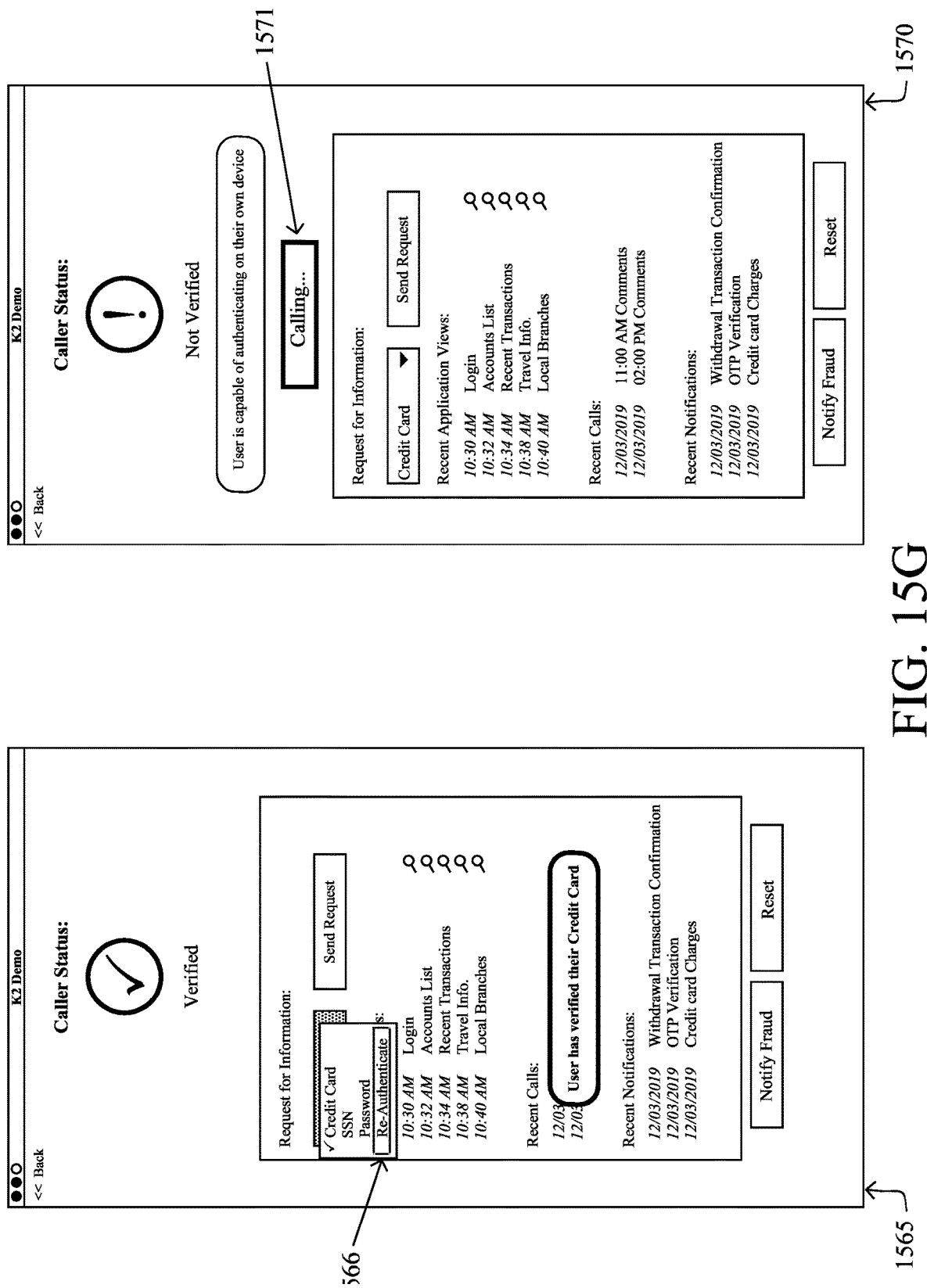

In addition to the credit card, the agent can also ask for other information, such as social security number (SSN), password, re-authentication (e.g., facial recognition again, or another biometric verification), and so on, as shown in FIG. 15G (view 1565, drop-down box 1566). In each of these cases, the user may authenticate the information on their mobile app, without exposing the information to the agent.

Figure 15H:
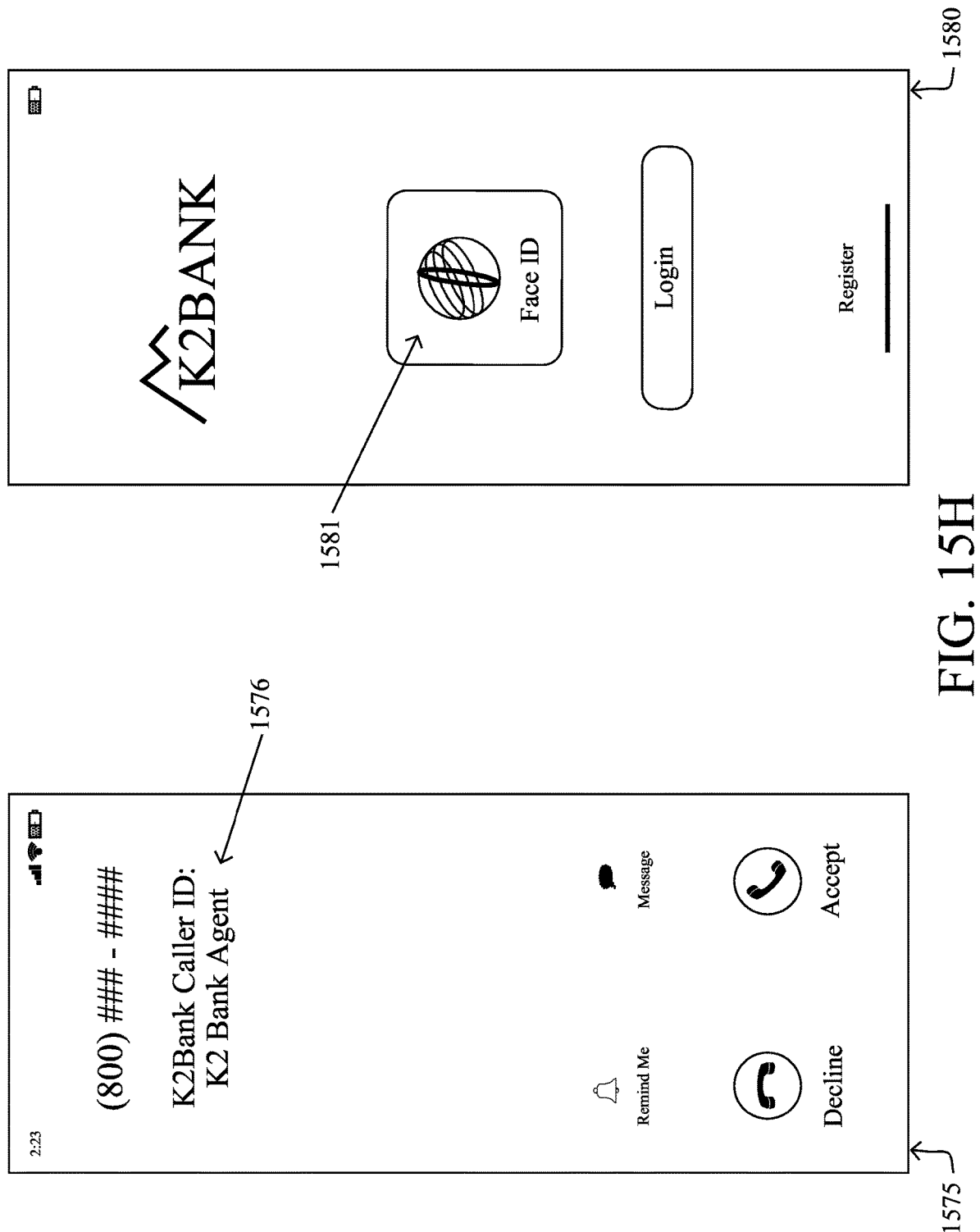
Figure 15I:
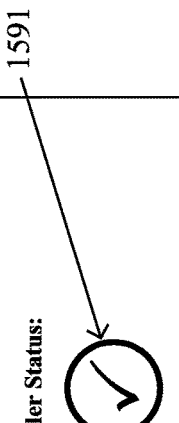
Figure 15I:
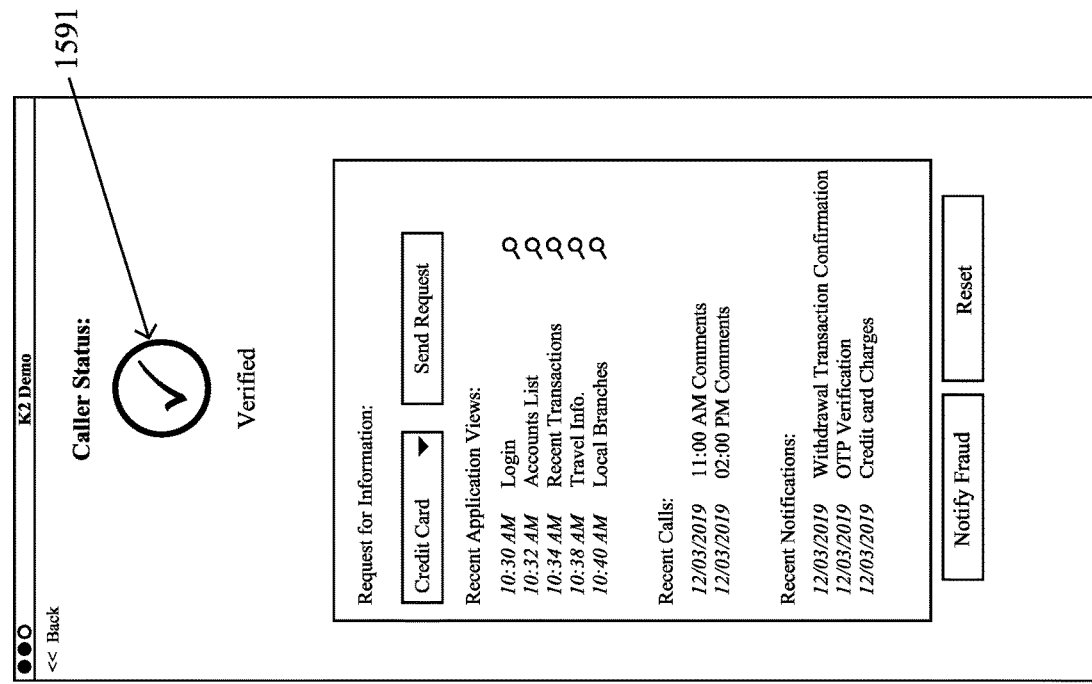
Figure 15I:
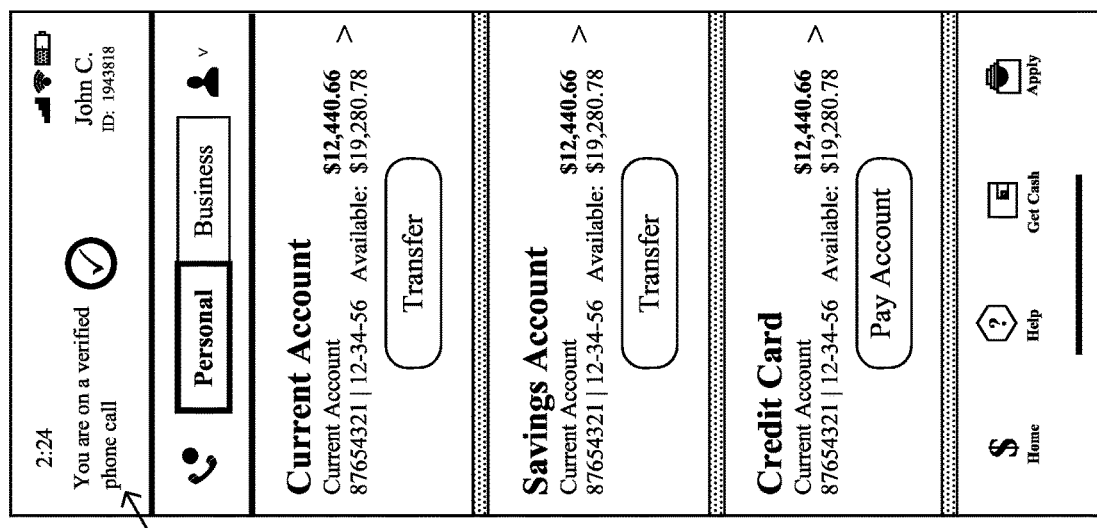
Figure 16A:
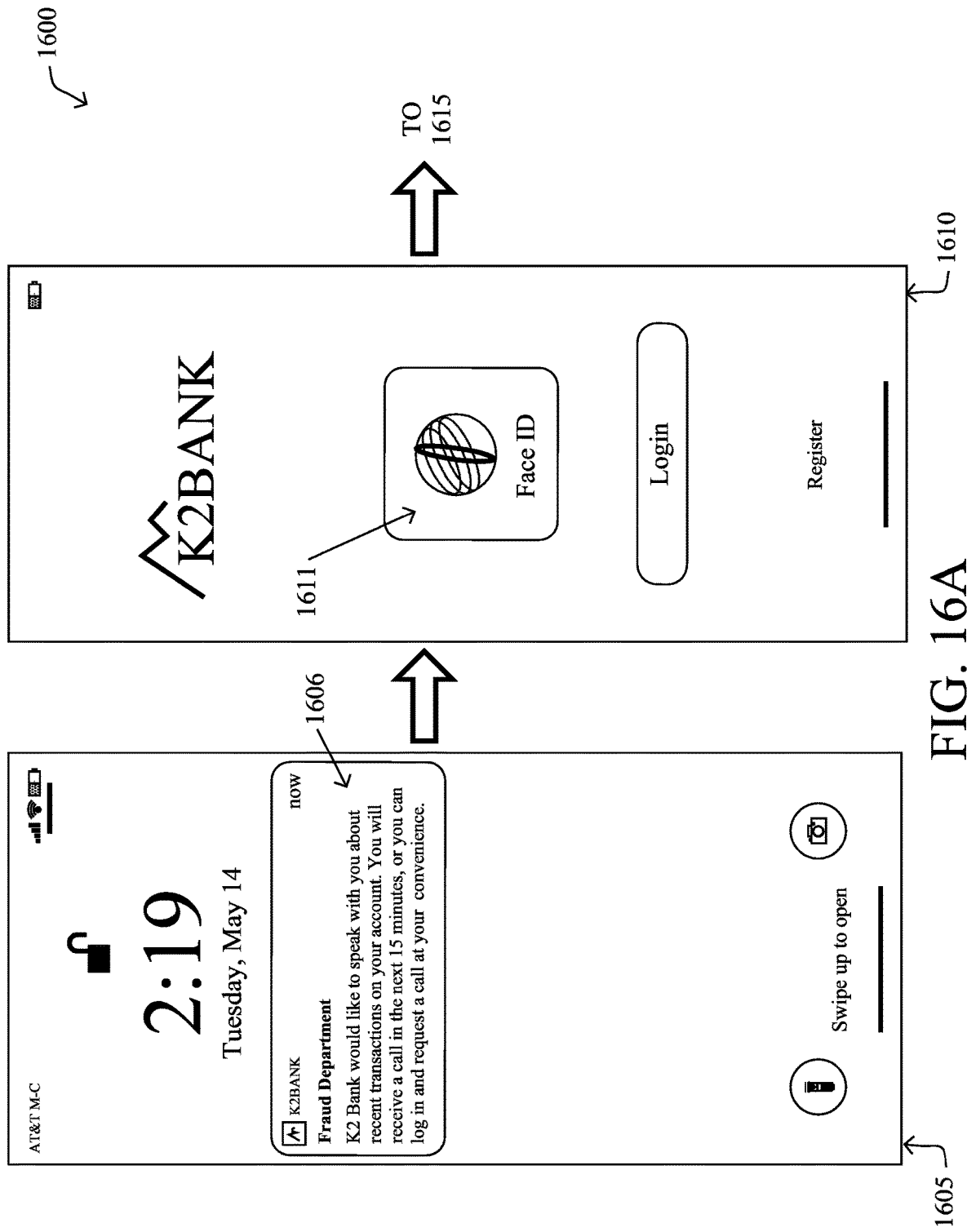
FIGS. 16A-16D illustrate an example for pushing an outbound request for communication (i.e., the contact center pushes a notification to the user) according to one or more embodiments herein.
Figure 16B:
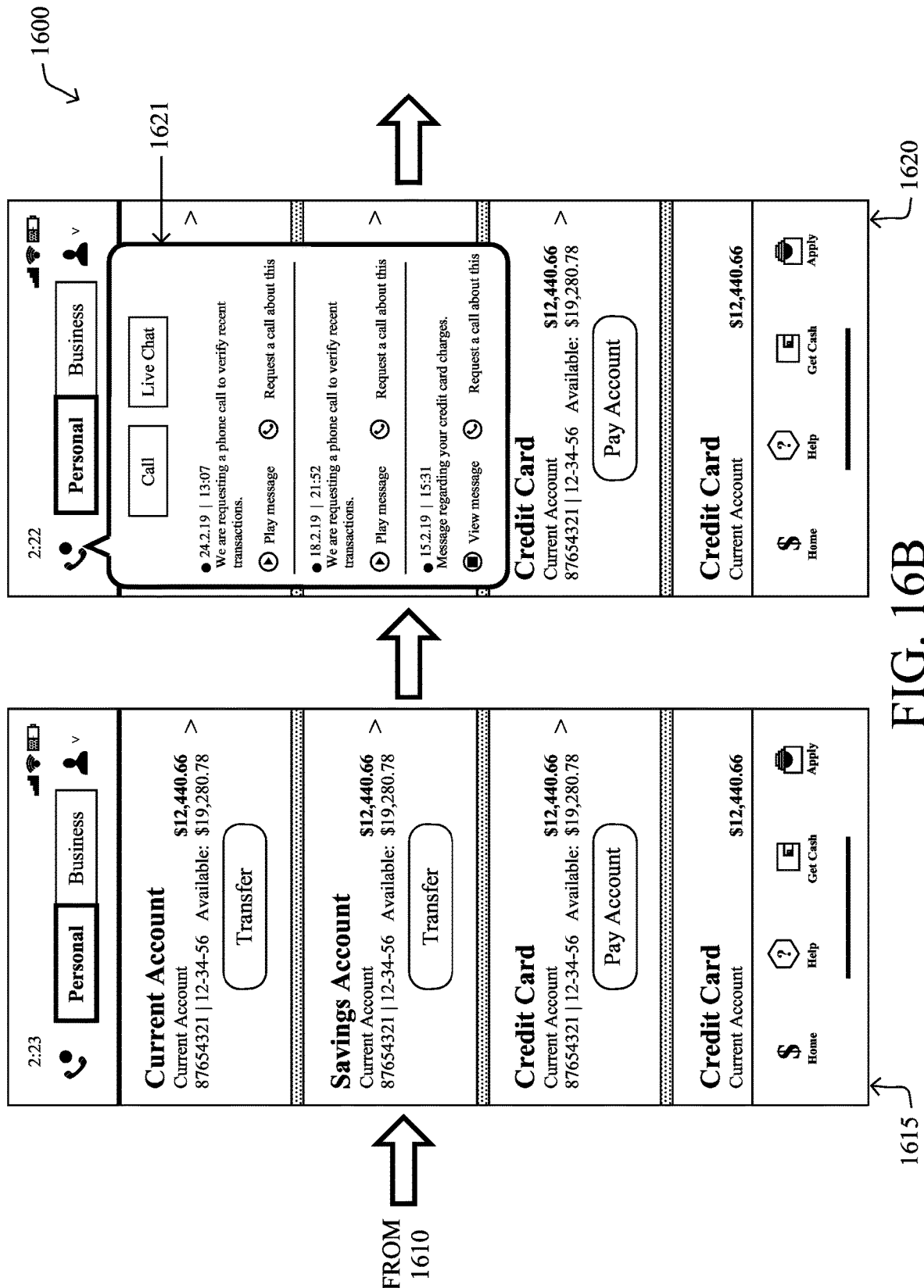
Figure 16C:
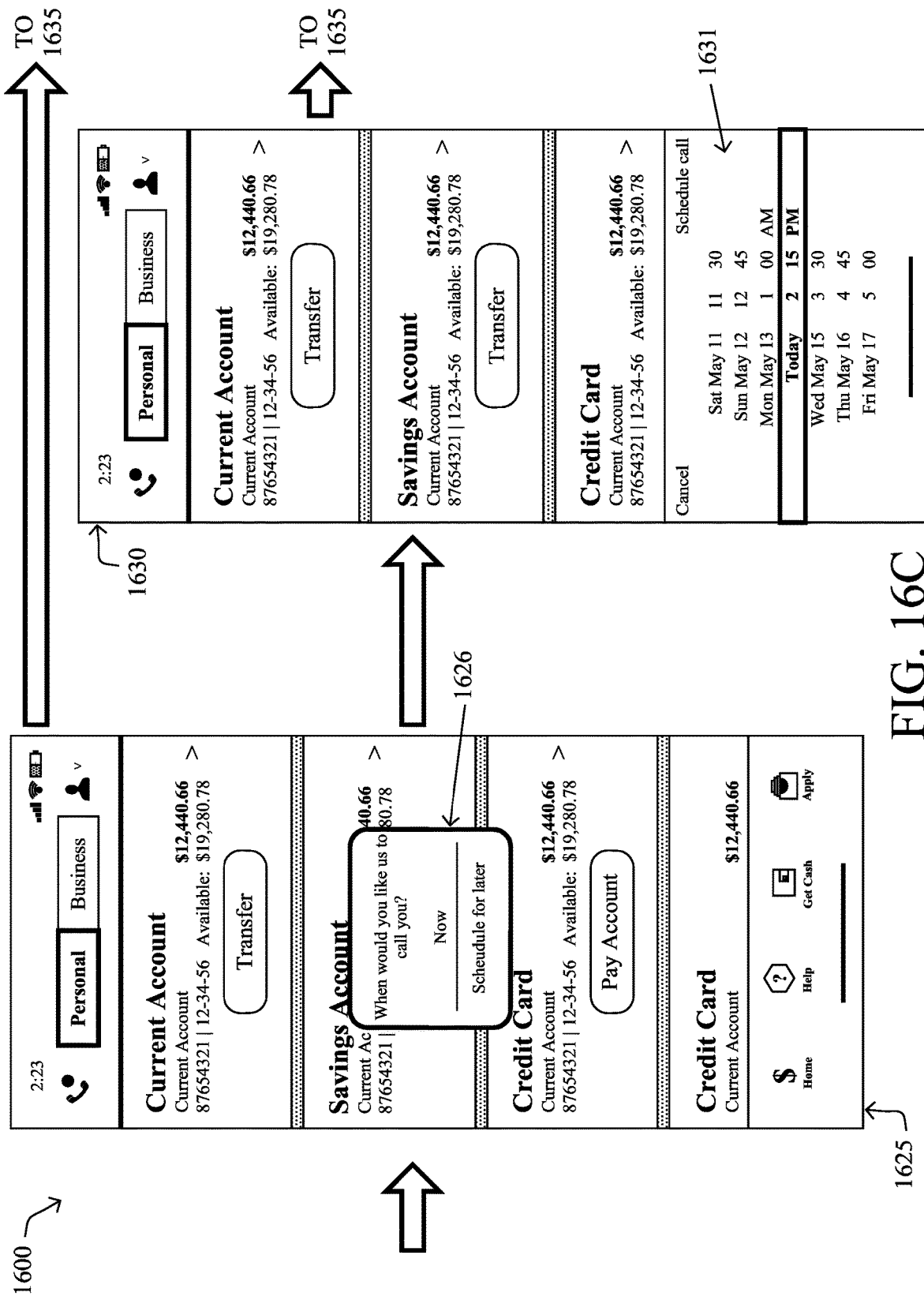
Figure 16D:
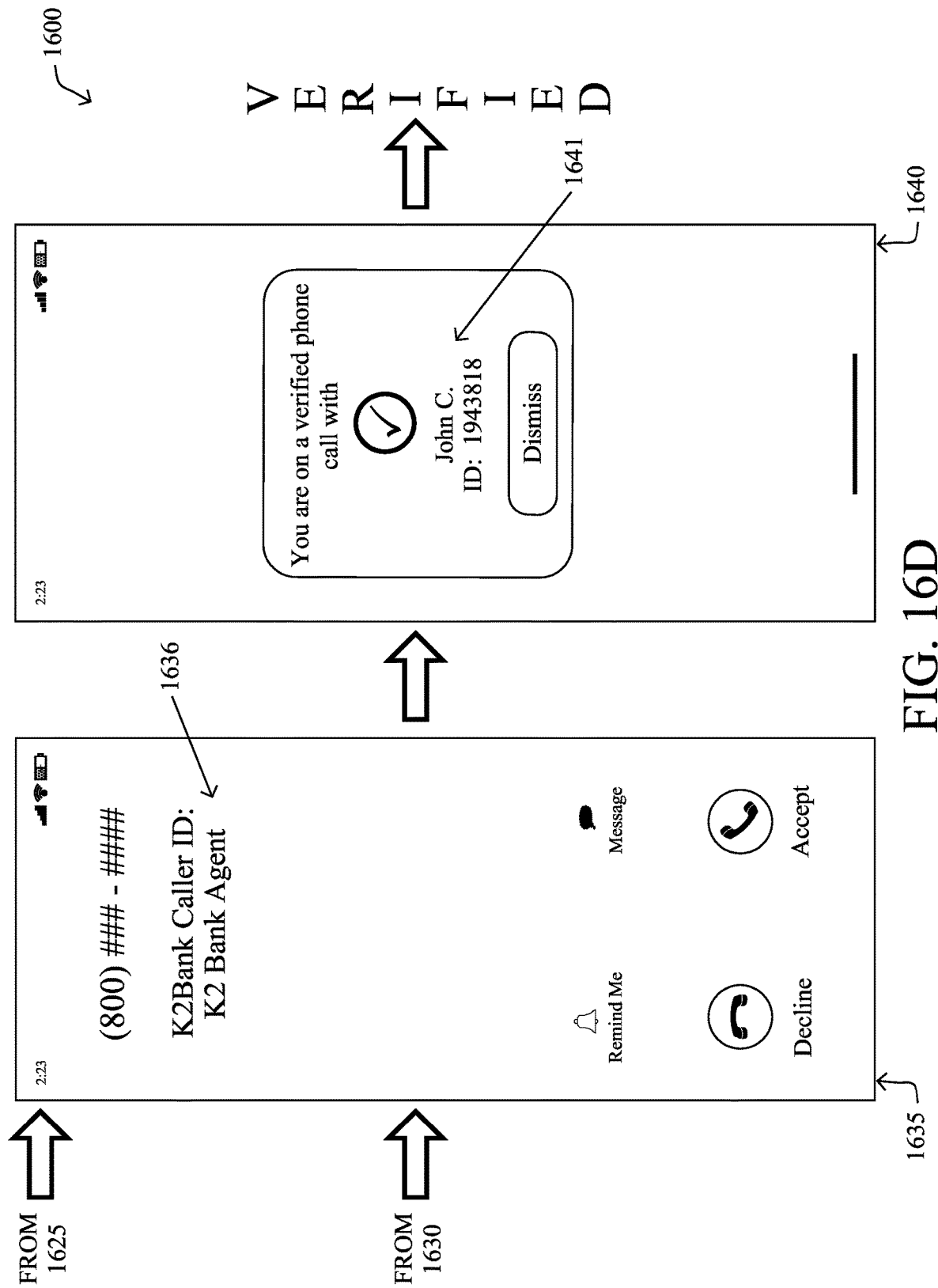

Turning now to an example where the user does not originally accept (push, react to, etc.) the notification sent in FIG. 15A (view 1505) above (e.g., within the 15 minutes), as shown in FIG. 15G (view 1570), the agent may click a "call" button 1571 to directly call the user (shown in view 1570 as clicked and "calling"). The user then receives the call (e.g., from the verified caller ID 1576 of the bank, as shown in FIG. 15H, view 1575). It should be noted that because the AVS server connected with the AVS client on the user's mobile device, the display on the user's mobile device may be the AVS client rather than the simple user interface of the phone. Upon answering the call the user may be prompted to log into their mobile app (e.g., "If you would like faster and more personalized experience, please log into your bank app on your mobile phone to verify yourself"). If the user so chooses, then as shown in FIG. 15H (view 1580), he/she may be prompted to verify his or her identity with the AVS app (e.g., Face ID 1581), bringing the user to the app landing page as shown in FIG. 15I (view 1585) with the banner 1586 at the top reassuring the user that he is talking with the actual enterprise, e.g., the bank, and not with a hacker spoofing the bank. Similarly, the agent's desktop app also now indicating that the called party has been authenticated and verified, as shown in FIG. 15I (view 1590, status 1591).

Notably, in the event the user begins the process by calling the bank/company directly, such as by calling the number of the back of his/her credit card instead of using the mobile app, then the contact center may again prompt the user to log into his or her mobile app (e.g., either as a default, or else after the call center, e.g., using CTI or an integrated module, recognizes that this user had a mobile device with an AVS client and/or the phone number is associated with a valid account). If the user complies, then again this results in a verified user before a contact center agent is added to the call (i.e., authenticating via the mobile app without sharing private information with the agent, and all done "pre-answer", i.e., before the agent was added to the call).

In one alternative or additional embodiment to the above description, a session may be initiated as described above, but now while the agent interacts with the verified customer, assume that the customer may request something that would prompt/require a higher level of security/verification. For instance, a first level of verification may allow for information sharing about account balances, while a second greater level of verification may be needed for withdrawals or transfers of a large amount of money, e.g., sums larger than $10,000. As a result, either based on agent trigger or based on heuristics that have to do with the forthcoming transaction (e.g., withdrawal of a large sum of money, or otherwise), the techniques herein may ask the user (caller) for yet another authentication factor/modality, e.g., facial recognition when the previous authentication was merely a passcode or fingerprint. Said differently, this embodiment allows the authentication mechanism to be dynamically tuned by the system to ask and convey stronger authentication based on dynamic needs of the communication interaction.

In particular, in certain embodiments herein, even though a user may already be authenticated and verified, the techniques herein may allow a verifying entity (e.g., the enterprise/call center/agent) to request an already verified user to provide additional information for additional security. For instance, this higher level of assurance/security (i.e., an "increased assurance of verification of the identity") may be needed in various situations, such as, for example, when going from a conversation about an account to requesting a financial transaction, or when going from a level of assurance where transactions below $10,000 are acceptable based on the original authentication, but once a requested transaction is above $10,000, then a higher security standard may need to be met. Such verification levels (levels of assurance of verification of an identity) may be based on an additional security measure (e.g., asking for another security answer), or based on more stringent security measures (e.g., a facial recognition being more secure than a password), or based on a greater number of security measures (e.g., going from a password to a Social Security number and a mother's maiden name), or any combination thereof. Also, according to embodiments herein, the additional authentication may be requested automatically (i.e., requesting the increased assurance of verification of the identity occurs automatically in response to one or more triggers during the communication) by the enterprise or the call center, and does not need intervention by a person/user to trigger this increased assurance.

According to the techniques herein, therefore, with all contact scenarios above, the agent's desktop shows all of the rich information about the individual user that the agent is connected with (e.g., recent application views, recent contacts, recent notifications, etc.), and whether the user's identity has already been verified, such as according to the techniques described in greater detail above.

By establishing this secure private data channel between this specific user and specific security module in the AVS server and/or the AVS ACG, the techniques herein have unlocked access to a rich set of contextual historical and behavioral data that can be used to affect call routing logic and better inform this agent about a unique caller's background, needs, and current situation. Similarly, in an outbound scenario, by assuring the called user that the call is coming from a valid authenticated enterprise, such as a bank, a doctor's office, etc., the user is more inclined to accept the call resulting in higher call completion rate for the enterprise.

FIGS. 16A-22 illustrate example workflows between a user's end device (e.g., smartphone, tablet, etc.) and the contact center's application (e.g., agent desktop app).

As shown in FIGS. 16A-16D, a first example 1600 for pushing an outbound request for communication is shown (i.e., the contact center pushes a notification to the user). As shown, in anticipation of an upcoming call, the bank contact center's outbound contact list manager pushes a notification to the user to alert him/her about an upcoming call (view 1605, notification 1606). The user taps the notification, which launches the bank's app (view 1610), which triggers the native authentication protocol(s) 1611, e.g., FaceID (facial recognition) in this case. Once authenticated, the authentication notification is sent to the contact center via the AVS Server and the user lands on their primary home screen (view 1615), and the user sees his/her notification window (view 1620), which shows the most recent notification in a list of notifications 1621 that initiated this process.

The user taps "Request a call about this" alongside the notification, and then, as shown, the user makes the choice whether they'd like to receive a call now or schedule it for a later date and time (view 1625, pop-up 1626). If they choose "Schedule for later", the example flow moves to view 1630, and the user can select from available (e.g., 15 minute) intervals (pop-up 1631). Shortly after (requesting a call "now" and bypassing view 1630), or at the scheduled date and time (set in view 1630), the user receives a call from the bank (complete with a matching caller ID) (view 1635, ID 1636), at which time the bank agent may say something like, "Hello Brett, this is John from the Bank. Thank you for requesting this call about recent transactions on your account. Your identity has already been verified through your mobile app, and if you look at your app, e.g., bank app or AVS app, you'll see you are now on a verified phone call." In the app, the user can now see that they are now on a verified call (view 1640), as well as the name and ID of the particular agent from the bank (window 1641). Verified treatment may then proceed with the called user, accordingly.

Figure 17A:
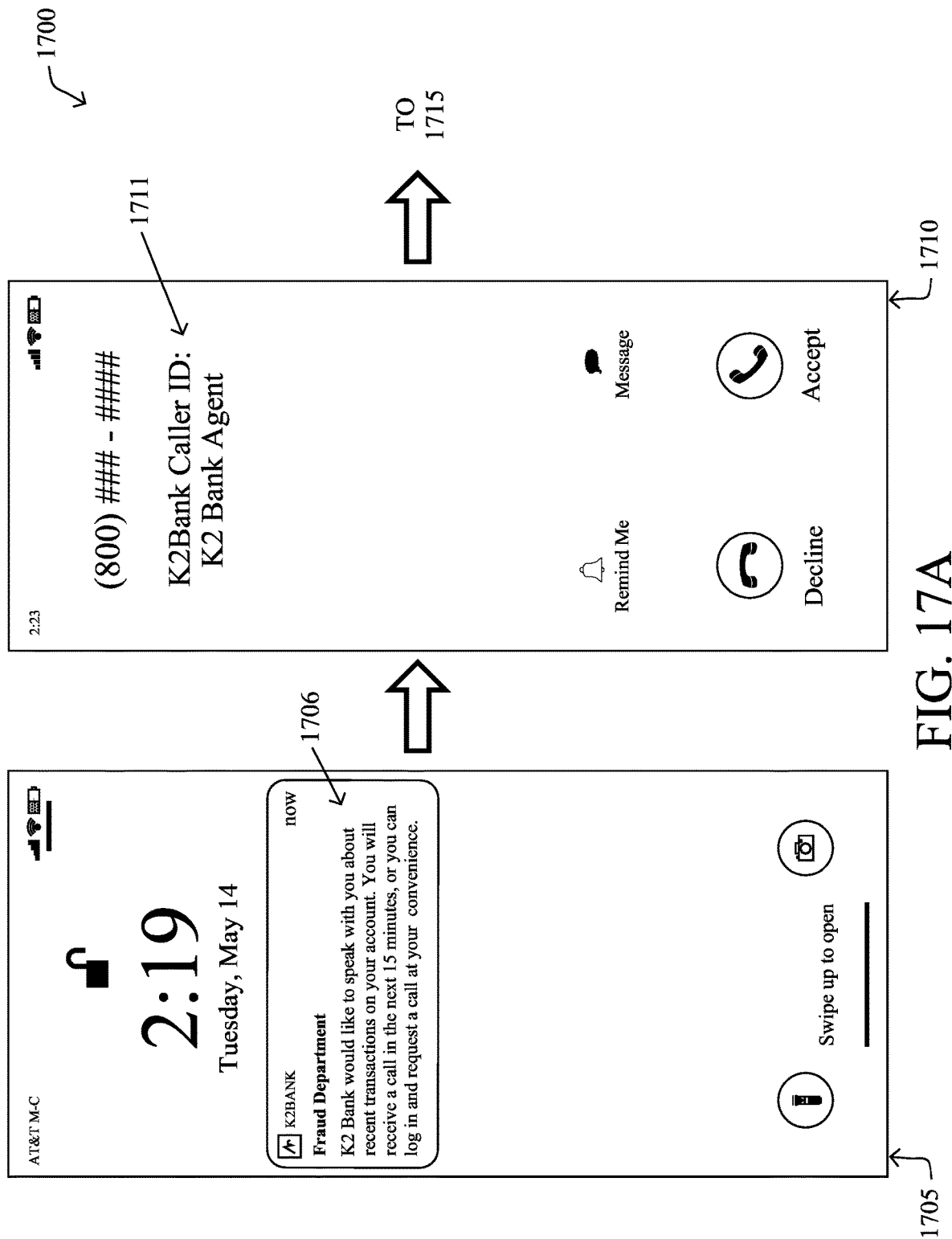
FIGS. 17A-17B illustrate an example where the user ignores an initial notification according to one or more embodiments herein.
Figure 17B:
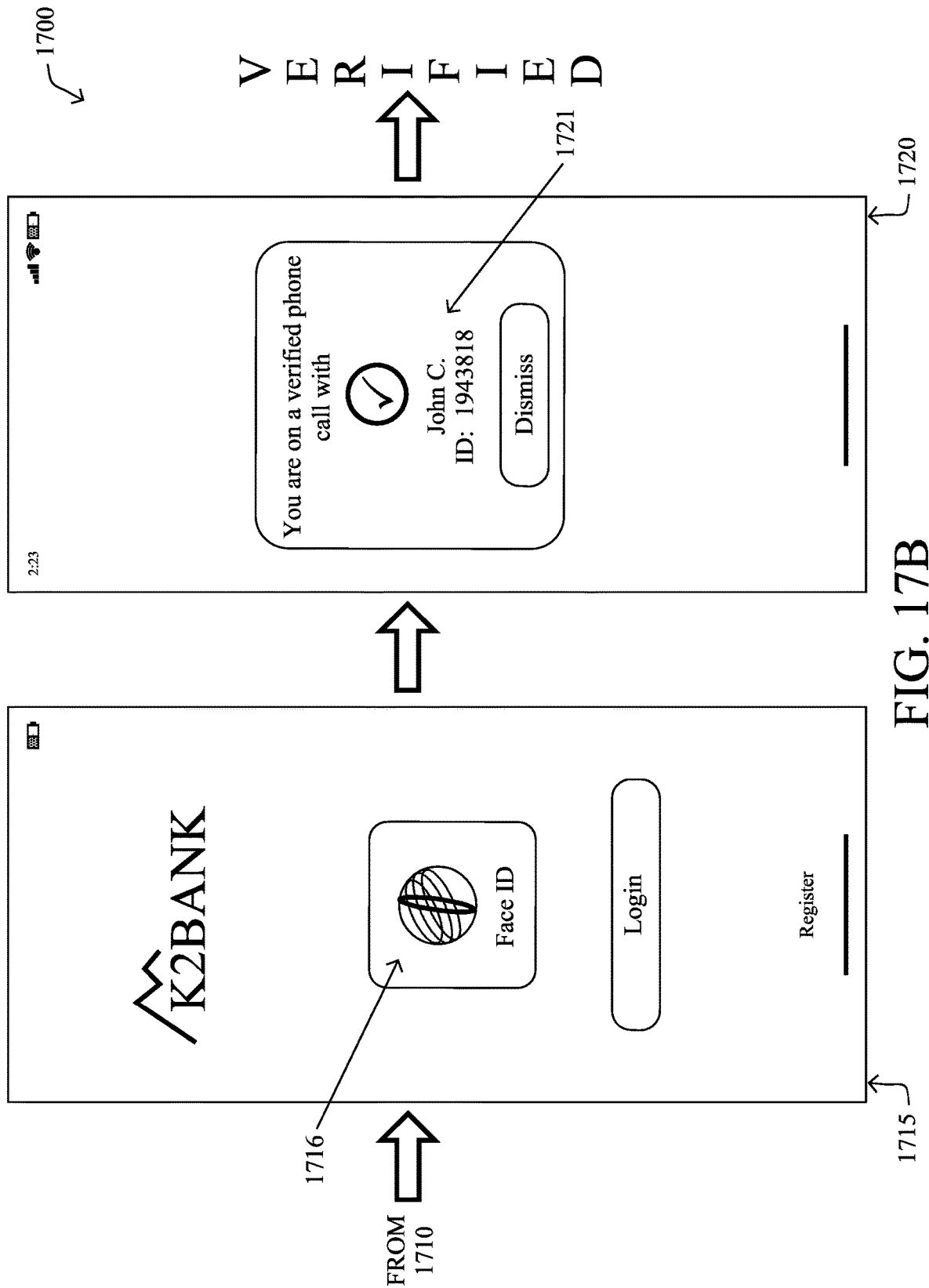
Figure 18A:
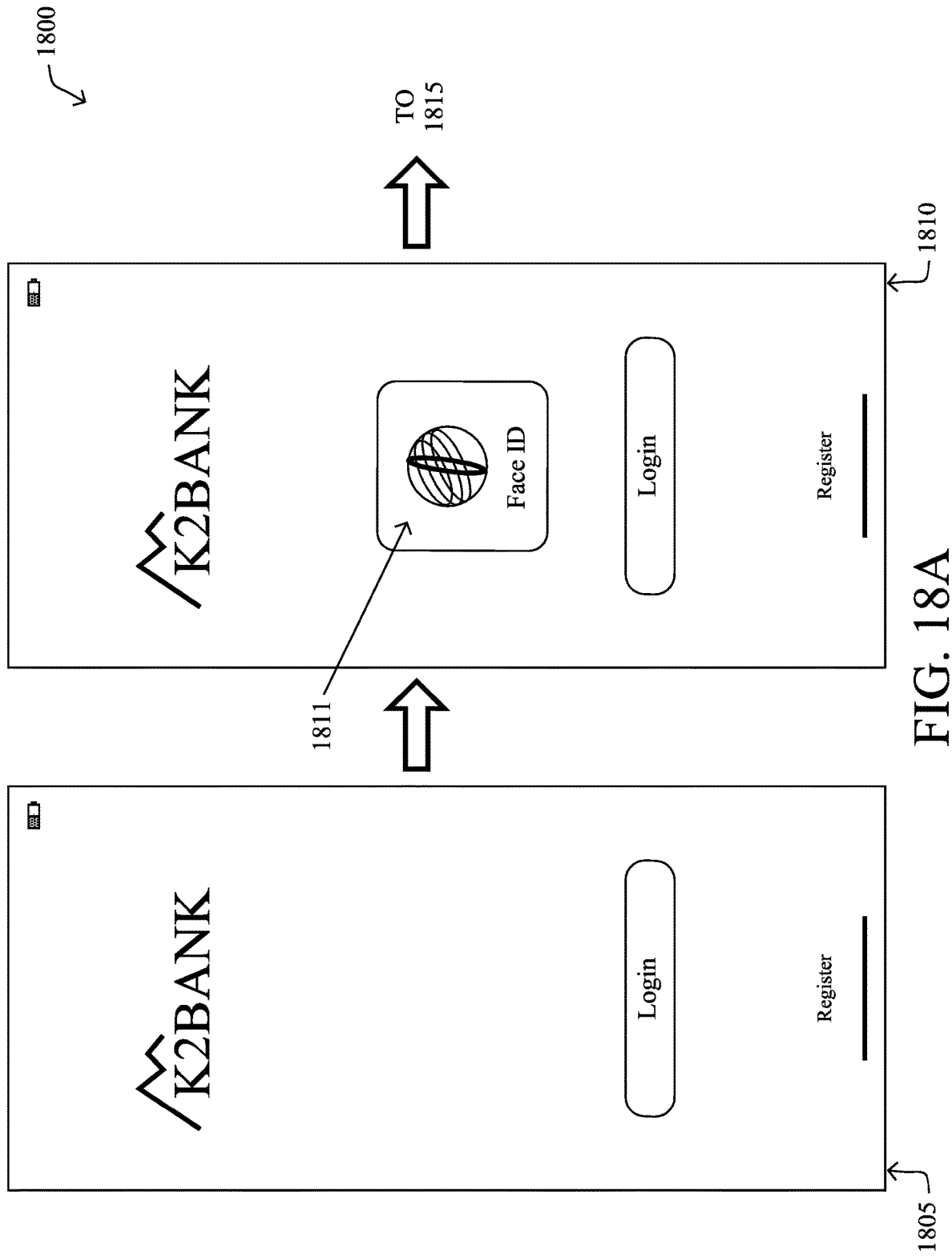
FIGS. 18A-18D illustrate an example of an outbound call being requested from the user according to one or more embodiments herein.
Figure 18B:
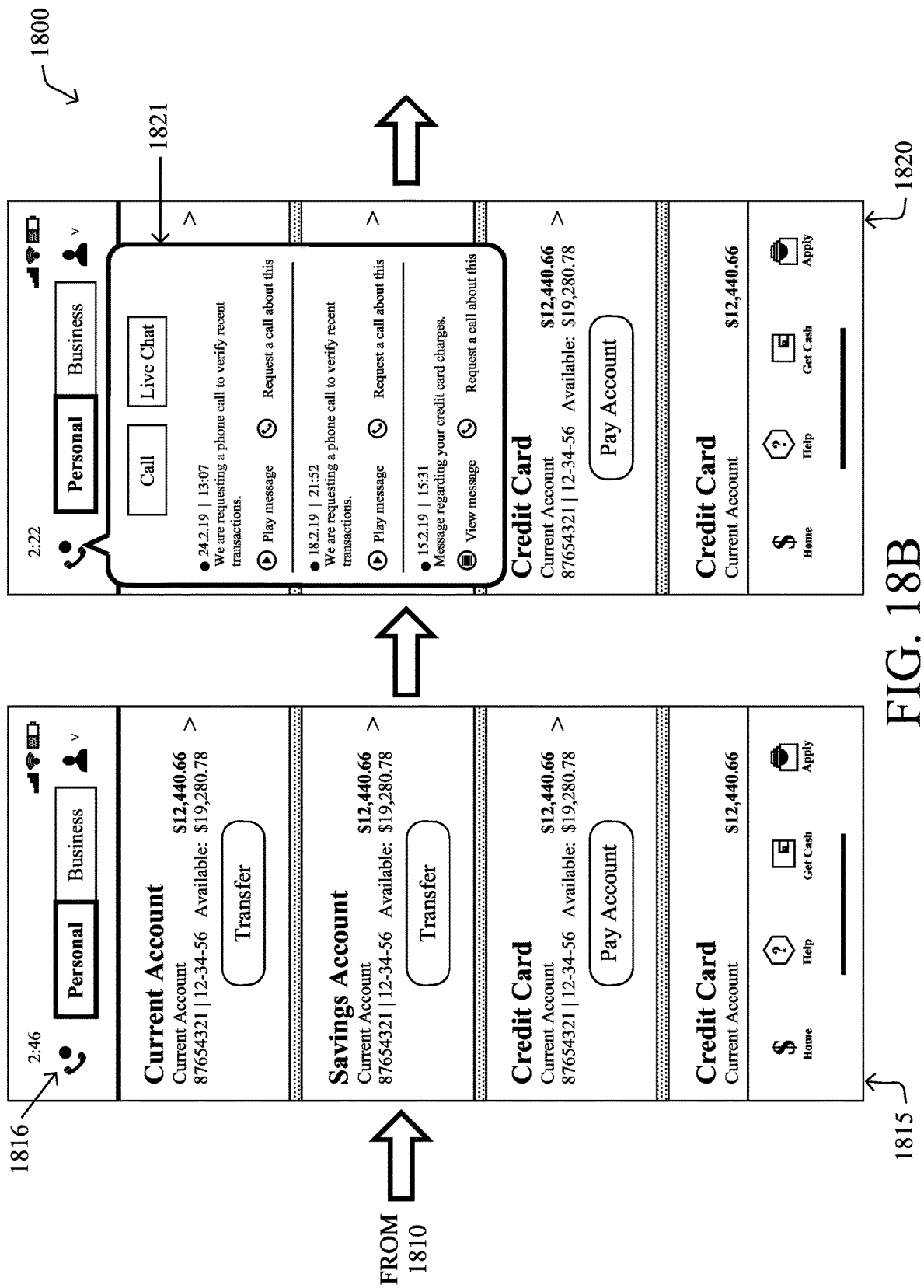
Figure 18C:
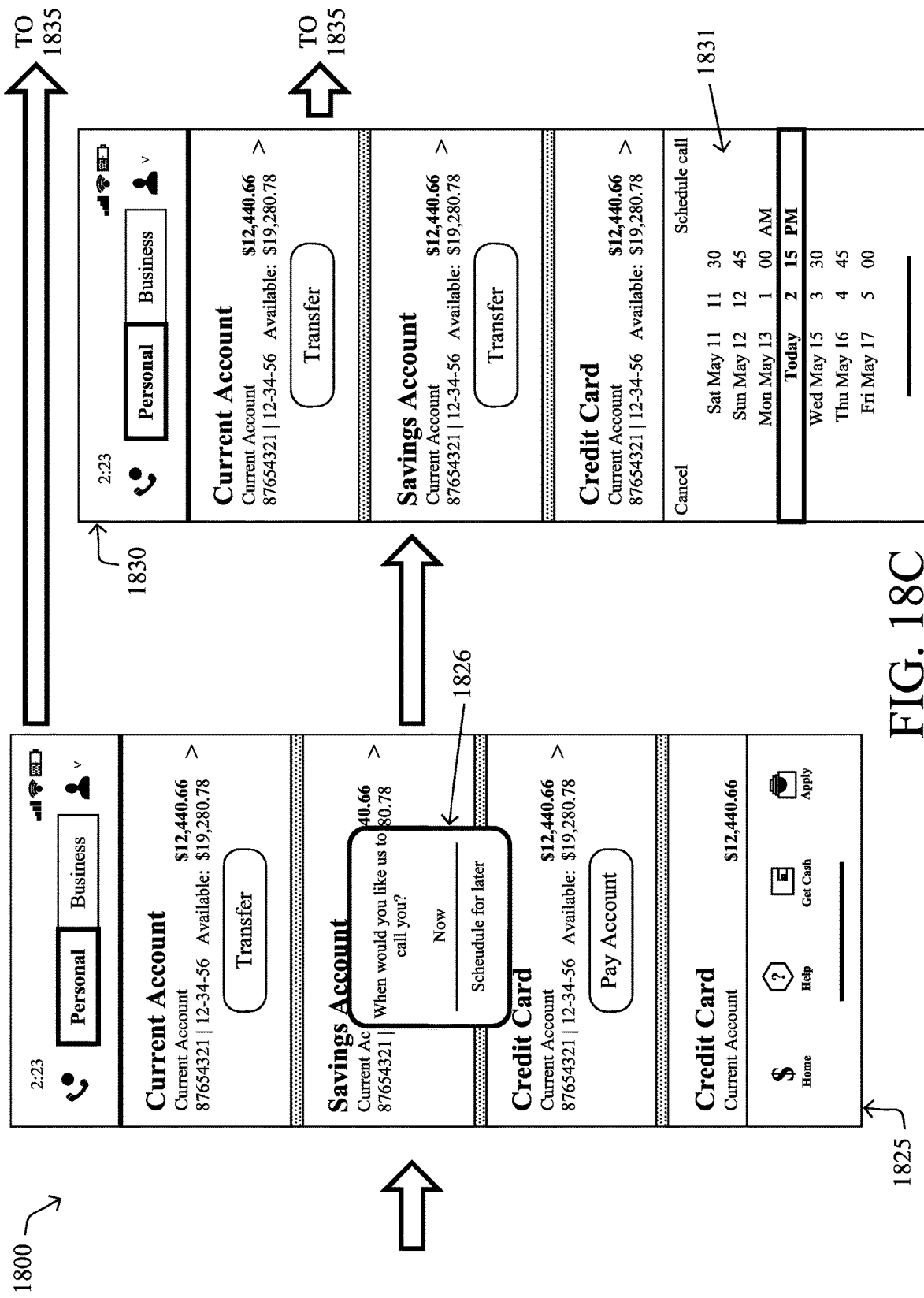
Figure 18D:
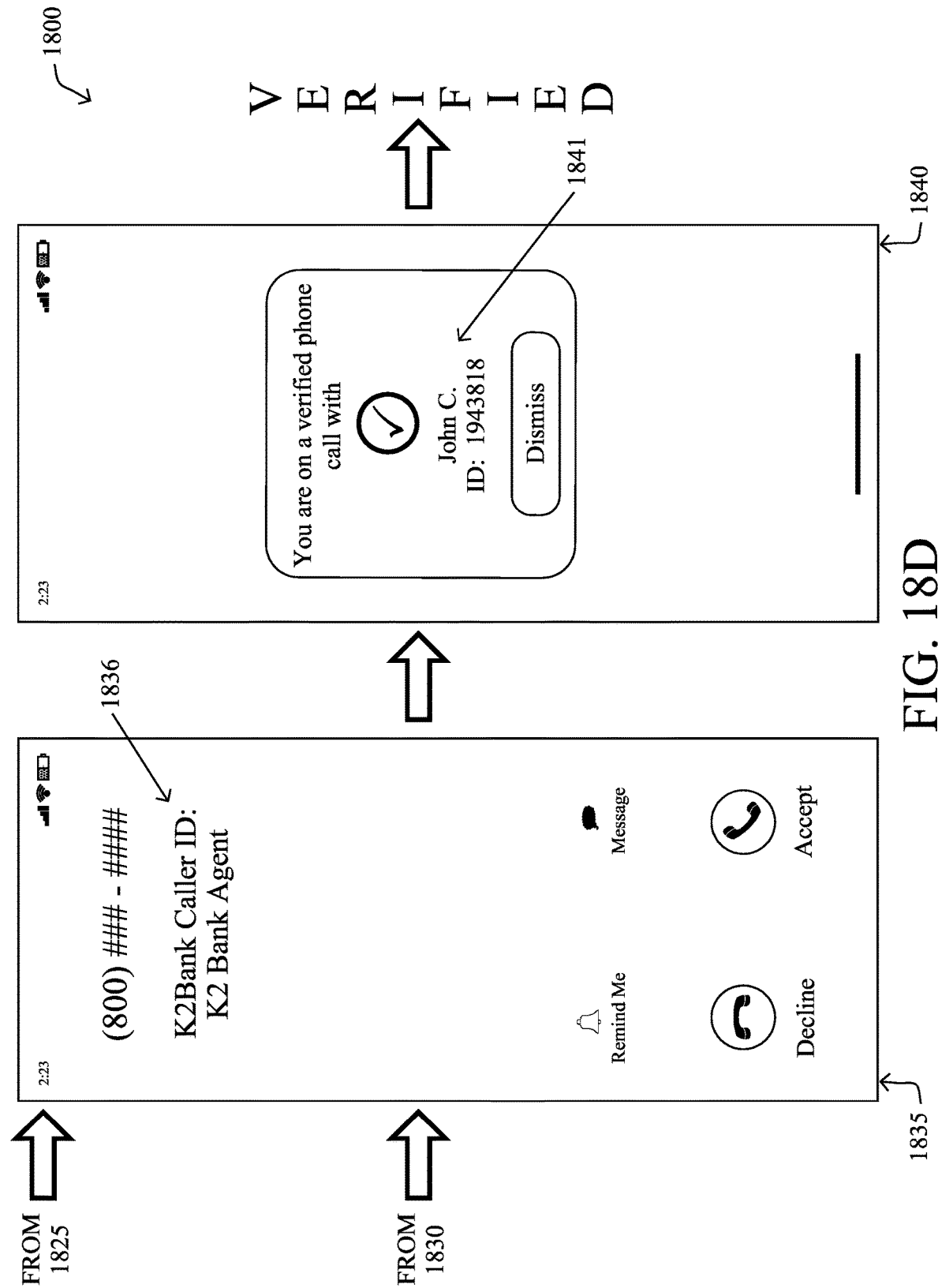

FIGS. 17A-17B illustrate another example 1700 where the user ignores the initial notification. For instance, in anticipation of an upcoming call, the bank contact center's outbound contact list manager pushes a notification to the user to alert them about an upcoming call (view 1705, notification 1706), but in this example, the user does not take any action. At a later time, the user receives a phone call with the caller ID of the Bank (view 1710, ID 1711), at which time an agent or automated prompt may prompt the user to log into the app, such as by saying "Hello, this is the Bank. If you'd like, you can receive faster and more personalized service on this call by logging into or bringing up your bank mobile app to verify yourself." The user opens their app and authenticates themselves (view 1715, FaceID 1716). Once their identity has been verified, the user may be instructed on the phone that an agent will be with them momentarily, and once an agent joins the call, the user and the bank's call center agent can again see that they are both now on a verified call (view 1720, agent ID window 1721). Here, verified treatment of the called user may again proceed.

FIGS. 18A-18D illustrate an outbound call being requested from the user in example 1800. For instance, as shown, the user opens their mobile app (view 1805), and authenticates himself/herself using his/her mobile AVS app or bank's app (view 1810, illustrative FaceID 1811). If the user taps the phone icon in the top left corner (view 1815, icon 1816), then once the notification screen pops up (view 1820, pop-up notifications 1821), the user may click "Request call about this" next to one of their notifications. As shown in view 1825, the user makes the choice whether they'd like to receive a call now or schedule it for a later date and time in selection window 1826. If they choose "Schedule for later", they can select from available dates and times (view 1835, selectable options 1836). The user receives a call from the bank (complete with a matching caller ID) (view 1835, ID 1836), either "now" or at the scheduled time. The bank's agent can see that the user is verified and can see the particular notification the user had originally selected to discuss (not shown). Since the user's identity has already been verified by his/her mobile app, he/she can open his/her app to see that he/she is now on a verified phone call (view 1840, verification window 1841). Once again, the user can now be treated as verified during the call.

Figure 19:
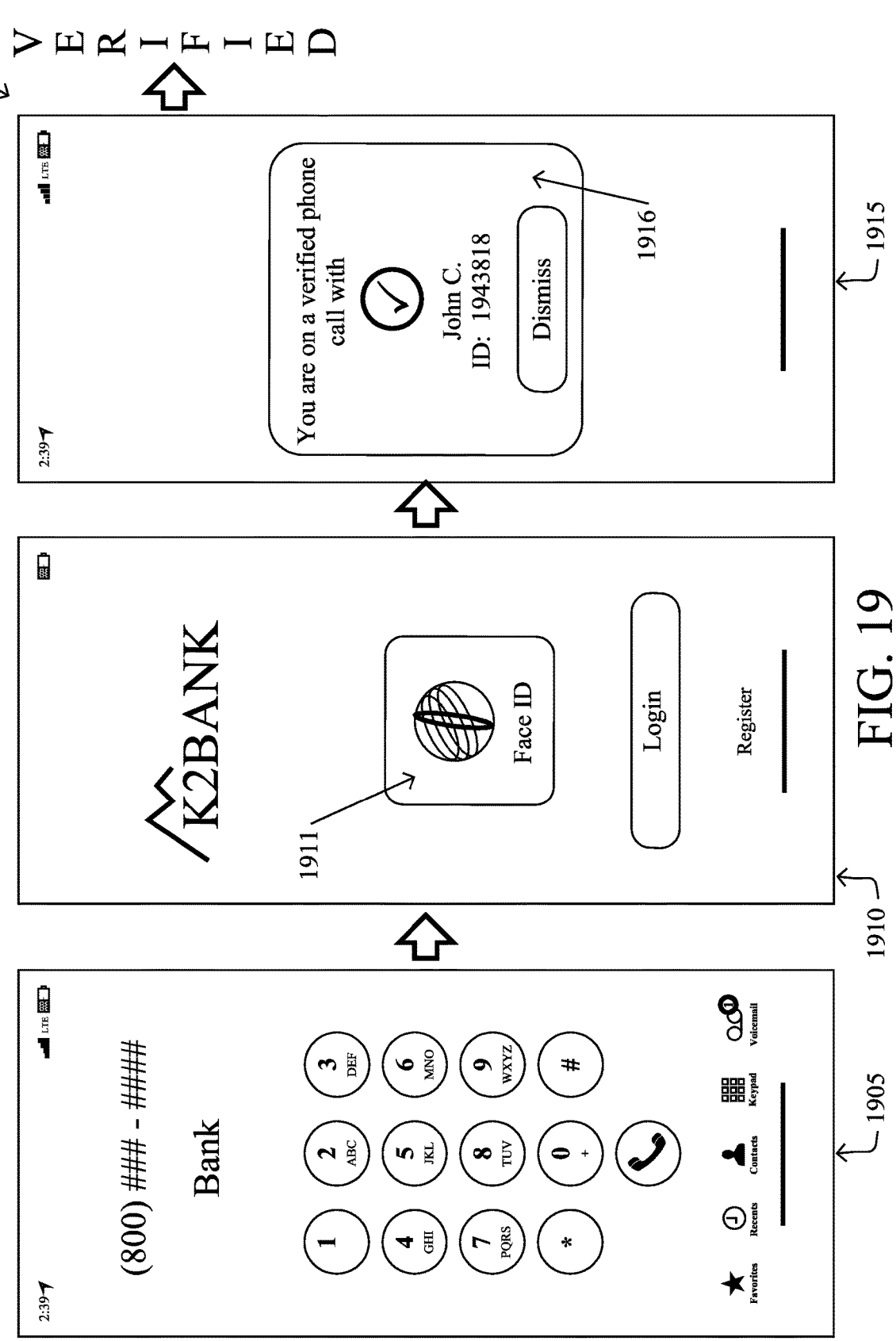
FIG. 19 illustrates an example for when a user calls the enterprise's phone number directly according to one or more embodiments herein.

FIG. 19 illustrates an example 1900 for when a user calls the bank's phone number directly (e.g., a number on the back of a credit card). For example, the user may choose to call the phone number on the back of their credit card, and may then dial it on their mobile device/phone (view 1905). Once answered (e.g., agent or automated), then the user may be prompted to receive faster and more personalized service on this call by logging into (or bringing up) their bank's mobile app and verify themselves. Once the user opens their AVS app or bank's app and authenticates themselves (view 1910, authentication 1911). If their identity has been verified with the system, an agent or automated system can then treat the caller as verified. By opening the mobile app, the user can now see the indication that they are now on a verified call (view 1915, verification confirmation 1916).

Figure 20A:
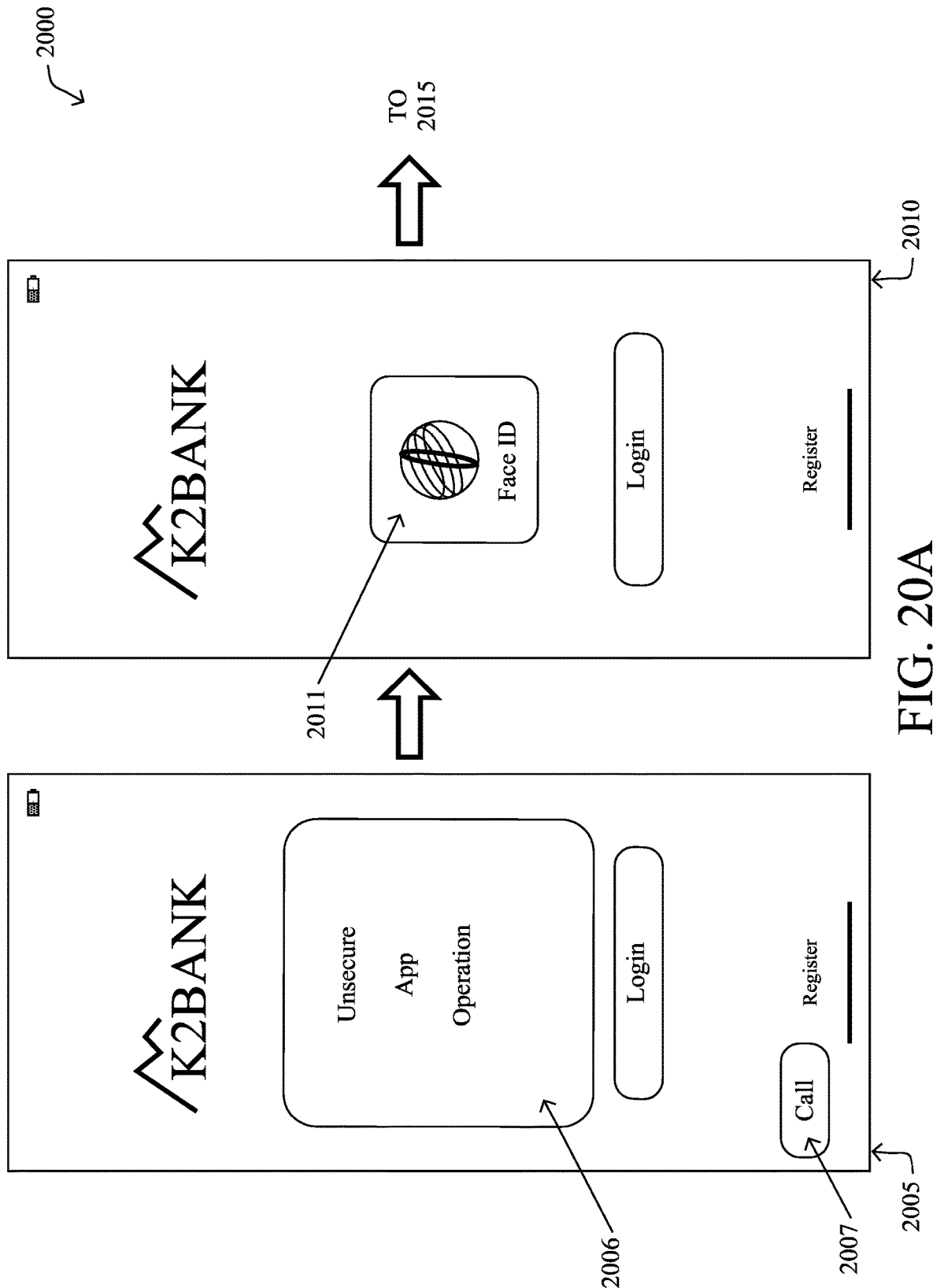
FIGS. 20A-20B illustrate an example where a user has opened their AVS app, but has not yet logged in (i.e., an inbound call pre-login) according to one or more embodiments herein.
Figure 20B:
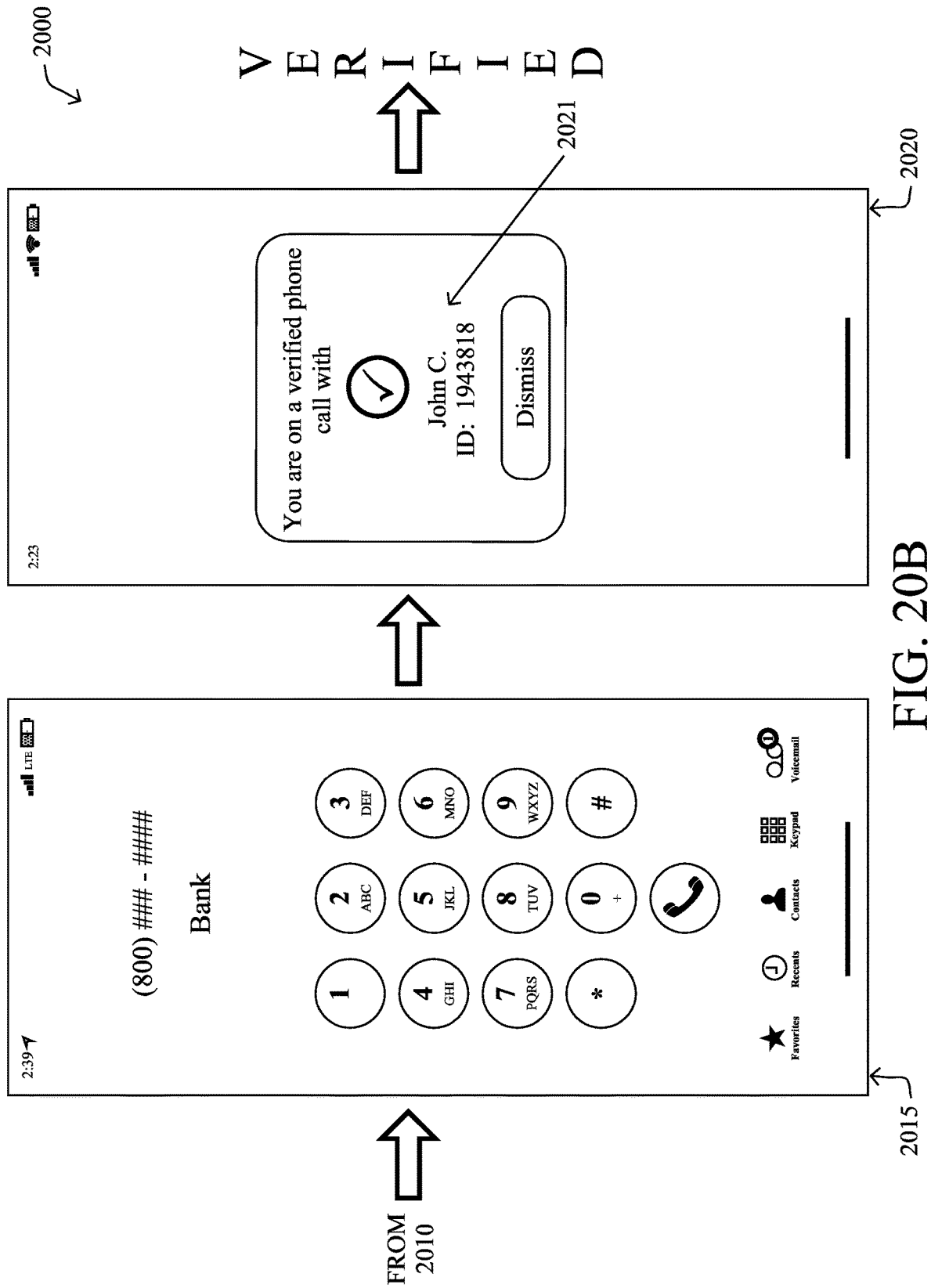

FIGS. 20A-20B illustrate a further example 2000, where the user has opened their app, but has not yet logged in or alternatively been authenticated (i.e., an inbound call pre-login or authentication). In this example, as shown in view 2005, the user launches their mobile app and may have the option to perform various "unsecure" operations 2006 (such as finding local bank branches, reading informational articles, accessing frequently asked questions (FAQs), etc.). The user may, at some point of their navigation, tap a "Call" button 2007 on the screen. This may now trigger the app to authenticate the user if not already authenticated (view 2010, authentication 2011). In other words, when a user wants to use the app, he/she may first authenticate himself/herself before doing anything, including make a call, or else as in example 2000, a "call" button may be available during unsecure use of the app, and prior to authenticating and thus entering a secured session. Once authenticated, the user's phone dialer is opened with the Bank's number entered and ready to call (view 2015). An automated system or live agent may then engage the user as a verified user, e.g., "Hello Brett, this is John from the Bank. Your identity has already been verified through your mobile app, and if you open your app you'll see you are now on a verified phone call. How can I help you today?" The user can see that they are now on a verified call (view 2020, verification information 2021), and be treated accordingly.

Figure 21A:
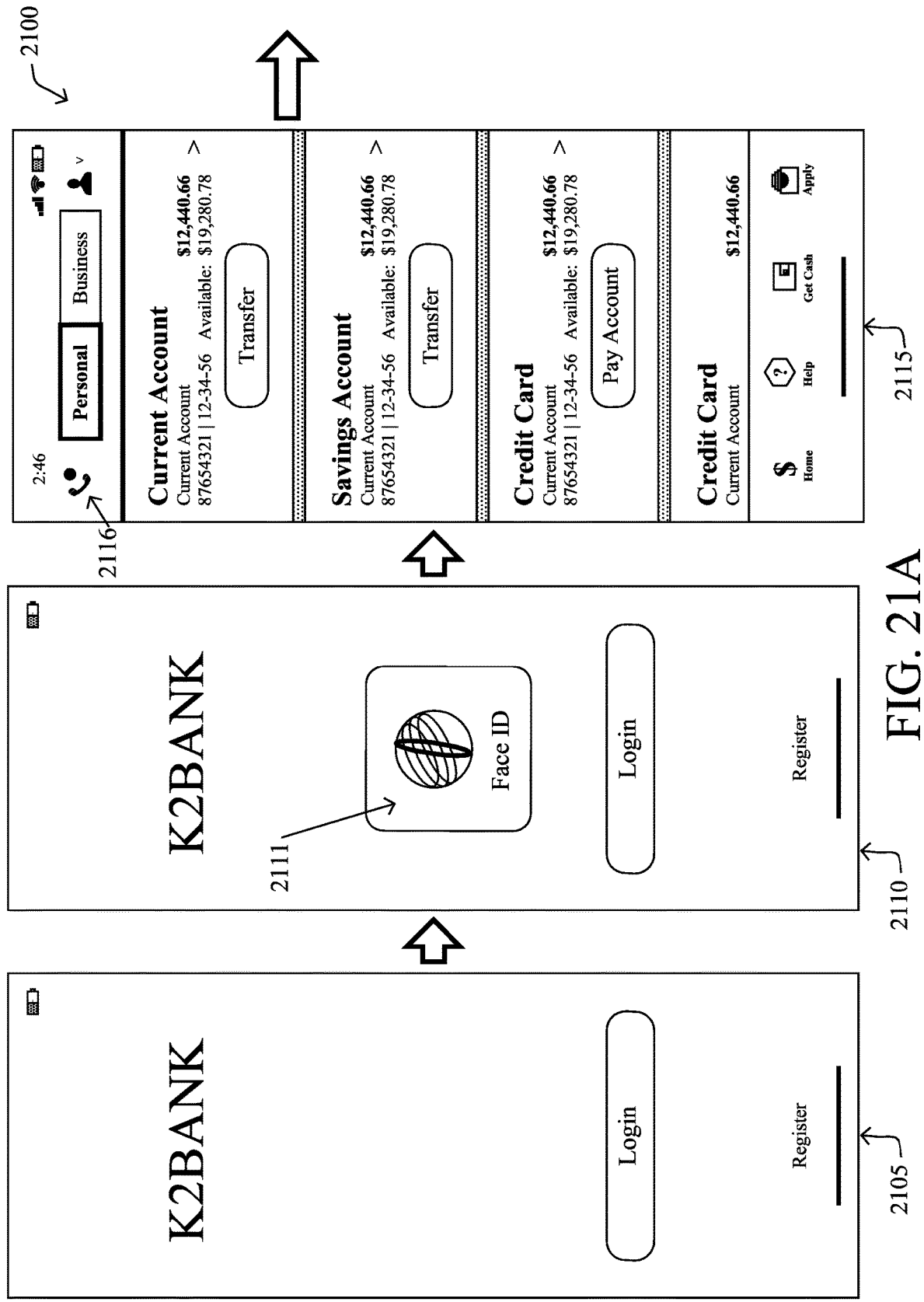
FIGS. 21A-21B illustrate an example where the user has opened their app and has logged in (i.e., an inbound call post login) according to one or more embodiments herein.
Figure 21B:
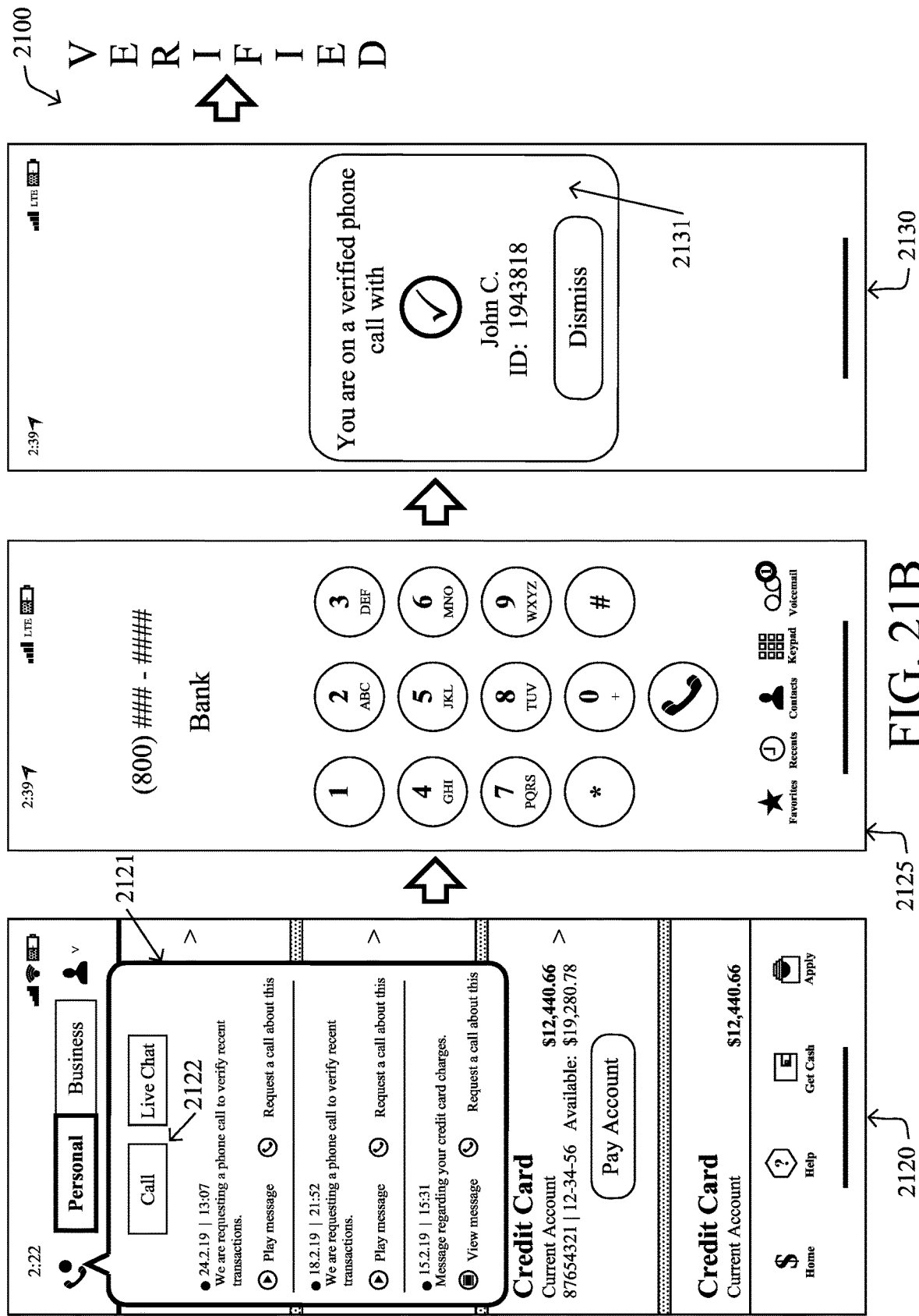

FIGS. 21A-21B illustrate a further example 2100 where now the user has opened their app and has logged in (i.e., an inbound call post login). In particular, as shown in FIG. 21A, the user opens their mobile app (view 2105), and authenticates themselves to their mobile app (view 2110, authentication 2111). Now, while in secure view of the app (view 2115), the user has the option to tap a phone icon 2116 (e.g., as shown in the top left corner). As shown in FIG. 21B in view 2120, if the user selects this icon, a popup notification window 2121 may allow the user to click a "CALL" button 2122 at the top of their call/notification window. Note that other illustrative techniques for initiating a call from a mobile app will be appreciated by those skilled in the art, and those shown herein are merely examples. The user's phone dialer is then opened with the Bank's phone number entered and ready to call (view 2125), or optionally auto-dialing the number. Upon contact center answering of the call, the user's identify is already verified, and by opening the app, the user can see that they are now on a verified call (view 2130, verification 2131), and will be treated accordingly.

Figure 22:
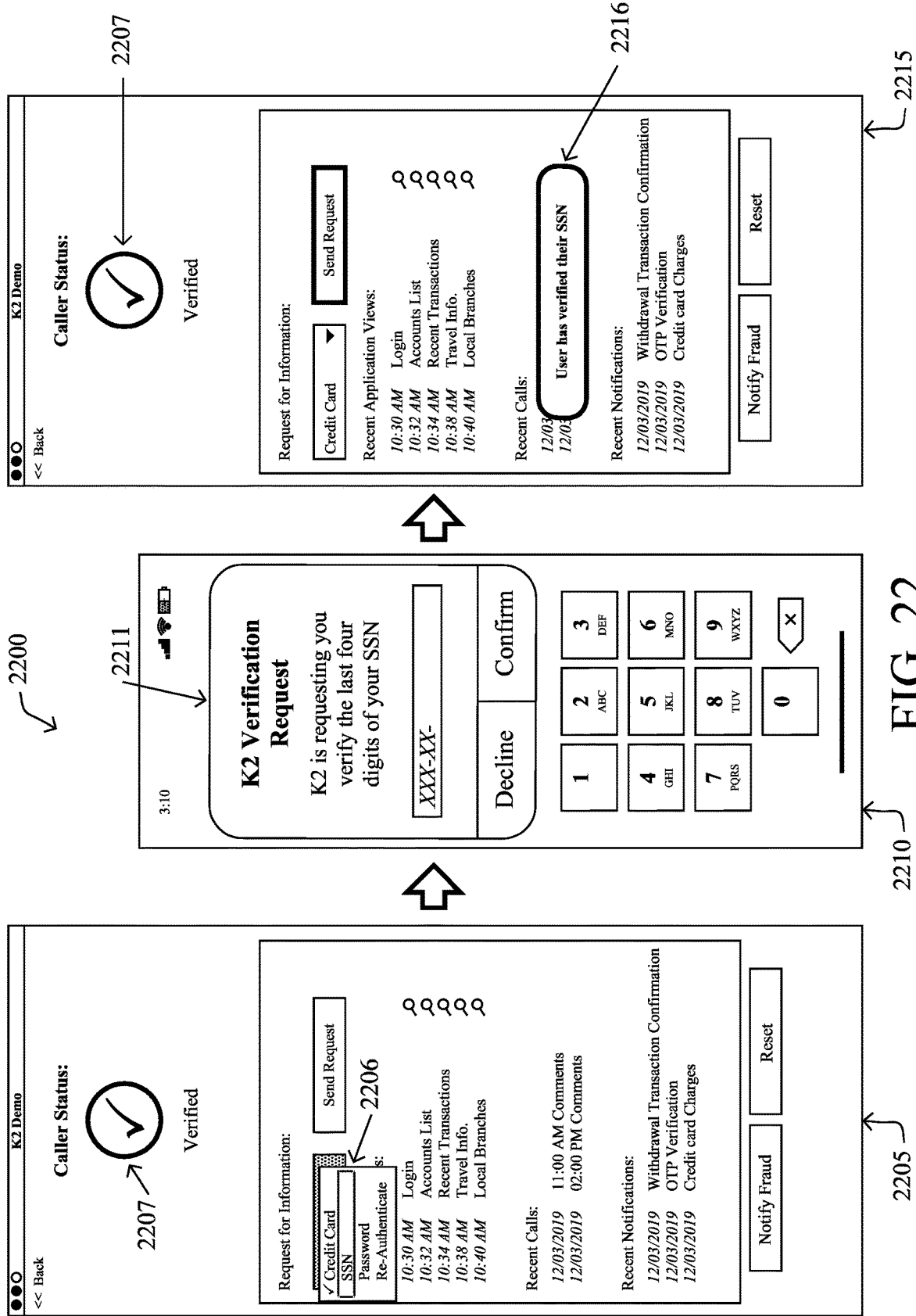
FIG. 22 illustrates an example "zero knowledge" request and verification according to one or more embodiments herein.

As still another example, FIG. 22 illustrates an example "zero knowledge" request and verification process 2200. For instance, assume that the contact center or the agent of the call center, presently on a verified phone call with a customer, sends a request to the user's device for the user to verify the last 4-digits of their social security number (view 2205, drop-down box 2206 selecting SSN for verification). Note that as shown in the caller status 2207, the user is already verified, and thus this may be an example of an additional level of verification (e.g., based on higher security needs before proceeding with a particular transaction or sharing certain information). In view 2210, the user receives the request (pop-up window 2211) and can choose to confirm the last 4 digits in their app rather than telling them to the agent. The agent cannot see any digits of the customer's SSN, but they receive a notification that the 4-digits that the customer entered have been verified by the bank's back-end system (view 2215, verification notification 2216). Note that the verification status 2207 may remain "verified", or may indicate a certain level of verification (not shown).

Other example workflows may be presented, and those illustrated herein are not meant to be limiting to the scope of embodiments afforded by the techniques herein.

Figure 23:
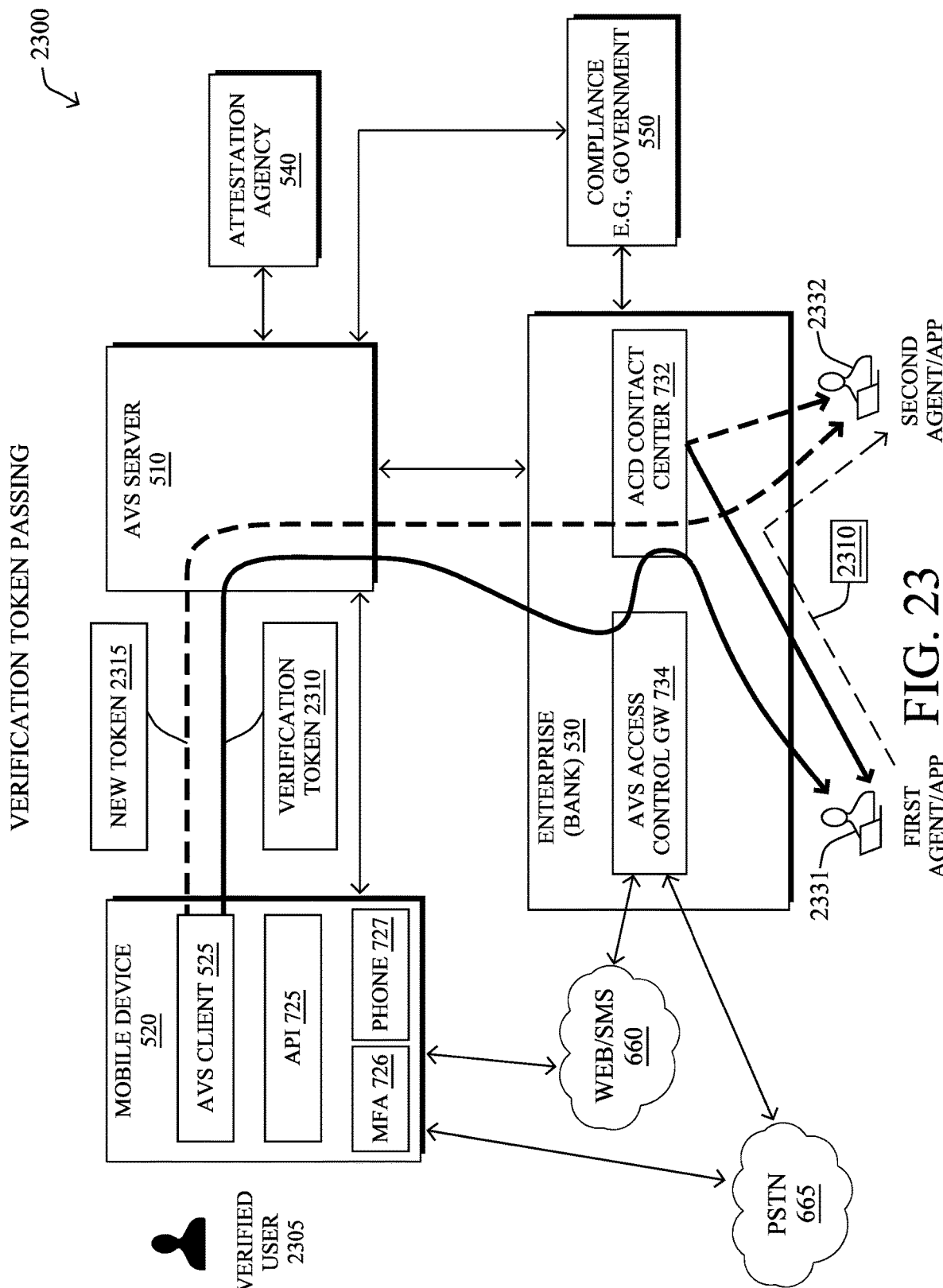
FIG. 23 illustrates an example of verification token passing according to one or more embodiments herein.

Notably, for one additional embodiment, it is important to point out that one of the reasons that companies ask for new identity information every time a call is transferred between applications or between agents is that the security teams are reluctant to allow identity data to be transferred via a CTI link, since they either don't understand, don't trust, or don't have the proper security. As such, in this particular embodiment, with reference to environment 2300 of FIG. 23, an identity token 2310 may be created as soon as the customer 2305 is verified, rating the veracity of the customer verification (e.g., from fully trusted down to completely unverified), and moving the identity token around between apps and agents as the customer is moved around (e.g., from agent 2331 to agent 2332). As shown, the token is generated by the AVS client 525, but in other embodiments, the token may be established by any trusted authority receiving the verification (e.g., the AVS server 510 or enterprise 530). In accordance with yet another aspect of the embodiments herein, rather than passing the token 2310 between the different apps/agents, the AVS client application 525 on the mobile device may issue a new security token 2315 on demand in response to any authenticated application that requests it. This prevents a single token from being overused and compromised (i.e., each verification token is "unexchangeable"). These embodiments would thus allow for greater acceptance of providing verified identity, while alleviating a lot of perceived customer friction such as customers being asked by each different application/agent on a single phone call to be authenticated.

Advantageously, the techniques described herein thus provide access control, assurance that the user is called by a valid enterprise rather by a hacker spoofing the ID of the enterprise, as well as user verification for a contact center. In particular, the techniques herein allow for both end-users (e.g., a customer and a company or any two end-users) to verify their identity to each other through frictionless user experiences with the stringent security required to prevent improper use or abuse of their data. Also, the techniques herein further provide consumers greater control over who has access to their secure information, such as by authenticating through an app without sharing secret information with the company or its representatives (e.g., completely removing the agent from the call authentication). The techniques herein also reduce average call handling time, which benefits the user's experience as well as the company's expenses (e.g., cost-per-minute, staffing needs, etc.). Moreover, the techniques herein increase self-service containment, as customers are not expected to enter pins, account numbers, or answer knowledge-based authentication questions. Additionally, by assuring that a call is arriving to a user from a verified enterprise, e.g., a bank, and not from an entity that spoofs the caller ID of the enterprise, the rate of call completion (answered/accepted calls) of outbound calls from the enterprise increases, resulting in higher call center productivity.

In addition, the solutions herein thus offer highly reliable pre-answer as well as post-answer authentication (e.g., adaptive authentication/MFA to prevent cross-channel fraud, including account takeover), that not only verifies users seamlessly, but also protects against internal attacks (avoiding the contact center agent from needing or seeing the customer's PII), and also avoids the AVS server from having knowledge of, or even access to, the connecting user's PII. For instance, while MFA is a known technique for verification, sending a user a text message or email to their device merely confirms the device, and not the particular user. Moreover, most MFA techniques require the user to convey the pin/code/answer to the operator at the other end of the call, which again may cause problems with regard to privacy if the operator is an unscrupulous party. On the contrary, the techniques herein use different channels (communication and verification channels), and maintain privacy of the various authentication factors used during the validation (in addition to the PII, and so on). Additionally, as the user changes the nature of the ongoing transaction, e.g., the amount of money to be transferred, the system may require a different level of authentication and consequently automatically invoke an additional MFA means. For example, the interaction may start with user authentication based on fingerprint. As the system detects that the amount of money the user attempts to transfer is greater than a specific threshold, e.g., $10,000, the system automatically and without intervention by a bank agent requests an additional authentication level by presenting the user with, for example, a facial recognition demand.

It is important to note that the techniques herein are not limited to inbound user-to-enterprise communications or outbound enterprise-to-user communications, but may be generally applicable to any user-to-user (person-to-person) communication or device-to-device communications where one device has an associated identity that needs to be verified to the other device (or user of the other device). That is, the identity of any entity (i.e., an identity of an entity associated with a particular device) may be verified herein, whether that entity is a person, a device itself, an enterprise, and so on. Moreover, while the description herein often refers to the example of a contact center (or call center) for an enterprise, the present disclosure also applies to any interaction with enterprises which is either have or do not have a contact center. In addition, though mentioned above, it is worth pointing out that both sides of a communication may request verification of the other corresponding side, prior to or during the communication. For example, though the use-case above is generally directed to an enterprise (e.g., bank) requiring verification of the customer, the techniques herein also allow the customer to request/obtain verification of the enterprise's identity as well (e.g., confirming that the customer is, in fact, talking to an agent of his/her bank). Also, while the description herein often describes the request for authentication to be invoked by an agent, it should be understood that the request may be invoked either by a person using a device or automatically by a device based on a preprogrammed or configured policy.

Illustratively, the techniques described herein may be performed by hardware, software, and/or firmware, such as in accordance with the "access and verification" process 248, which may include computer executable instructions executed by a processor 220 (of a particular correspondingly operative computing device 200) to perform functions relating to the techniques described herein, e.g., in conjunction with other devices which may have a correspondingly configured access and verification process 248 depending upon the functionality of the device, as described below (e.g., a user device, a storage server, a call center device, a controller device, an attestation service, and so on).

Figure 24:
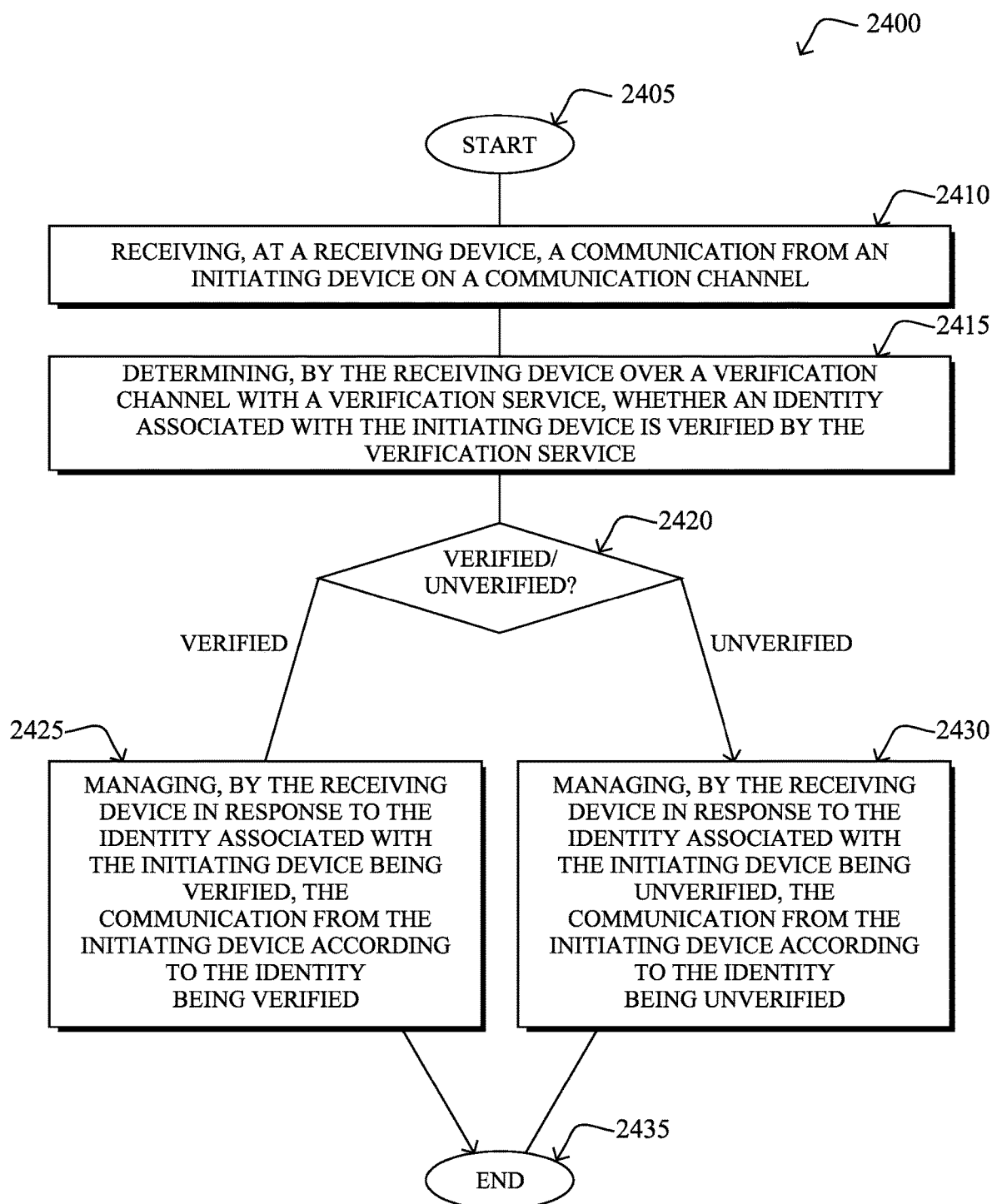
FIG. 24 illustrates an example simplified procedure for providing access control and identity verification for communications in accordance with one or more embodiments described herein, particularly when receiving a communication from an entity to be verified.

FIG. 24 illustrates an example simplified procedure for providing access control and identity verification for communications in accordance with one or more embodiments described herein, particularly when receiving a communication from an entity to be verified. For example, a non-generic, specifically configured device (e.g., device 200, such as an end device (mobile device, any one or more of the enterprise devices, etc.)) may perform procedure 2400 by executing stored instructions (e.g., process 248). The procedure 2400 may start at step 2405, and continues to step 2410, where, as described in greater detail above, a receiving device (e.g., an enterprise 530) receives a communication from an initiating device (e.g., a mobile device 520) on a communication channel. In step 2415, the receiving device determines, over a verification channel with a verification service (e.g., AVS server 510), whether an identity associated with the initiating device is verified by the verification service. As described above, verification of the identity may occur based on a verification service client application (e.g., AVS app 525) being logged in, initiated, or installed, accordingly.

Notably, as described herein, whether an identity associated with a particular device is verified or unverified may be based on a number of authentication factors depending upon the particular "identity" being (or not being) verified. Generally, as used herein, term "identity" may refer to the identity of a person who is actually communicating on the device (e.g., holding the mobile device). Since anyone may attempt to answer an incoming call or place an outgoing call from someone else's device, the techniques herein are thus directed to providing assurance that the identity associated with the device during a communication is verified, e.g., that the identity of person assumed to be communicating on the device is verified. Accordingly, the "identity" associated with a particular device may be any corresponding entity, such as an individual person, an enterprise being verified as a whole, an agent of an enterprise or of a person (e.g., an authorized broker), or an authorized machine (e.g., authorized computerized virtual assistants representing a person). Note also that this verification may occur in either direction of a communication regardless of use case (e.g., a bank customer may need to be verified, but may also like to verify that he/she is, in fact, speaking to the bank).

Based on the determination of whether the identity is verified or unverified (a "verified/unverified result") in step 2420, the receiving device may then manage, in step 2425 in response to the identity associated with the initiating device being verified, the communication from the initiating device according to the identity being verified (e.g., allowing certain transactions, sharing or modifying of information, and so on). Examples of how the communication may be managed with a verified identity include such things as: sharing secure information over the communication; allowing transaction requests received over the communication; modifying information associated with the verified identity; and continuing the communication.

Alternatively, in step 2430 in response to the identity associated with the initiating device being unverified, the receiving device manages the communication from the initiating device according to the identity being unverified (e.g., managing the communication from the initiating device as a potential attack in certain embodiments as mentioned above). Note that managing the communication for an unverified identity may involve a number of actions from which to choose, such as restrictively preventing the actions listed above (e.g., preventing sharing secure information over the communication and so on as a security policy), or else instructing against such actions (e.g., instructing against sharing secure information over the communication and so on as a recommendation for an agent/person). Generally, a notification may be raised to establish that the communication should be treated as having an unverified identity on the other end of the communication, which may adjust security policies or may simply adjust personal behavior of the opposite participant. Note that as another option, where an identity remains unverified, the communication may simply be discontinued.

The simplified procedure 2400 may then end in step 2435.

Figure 25:
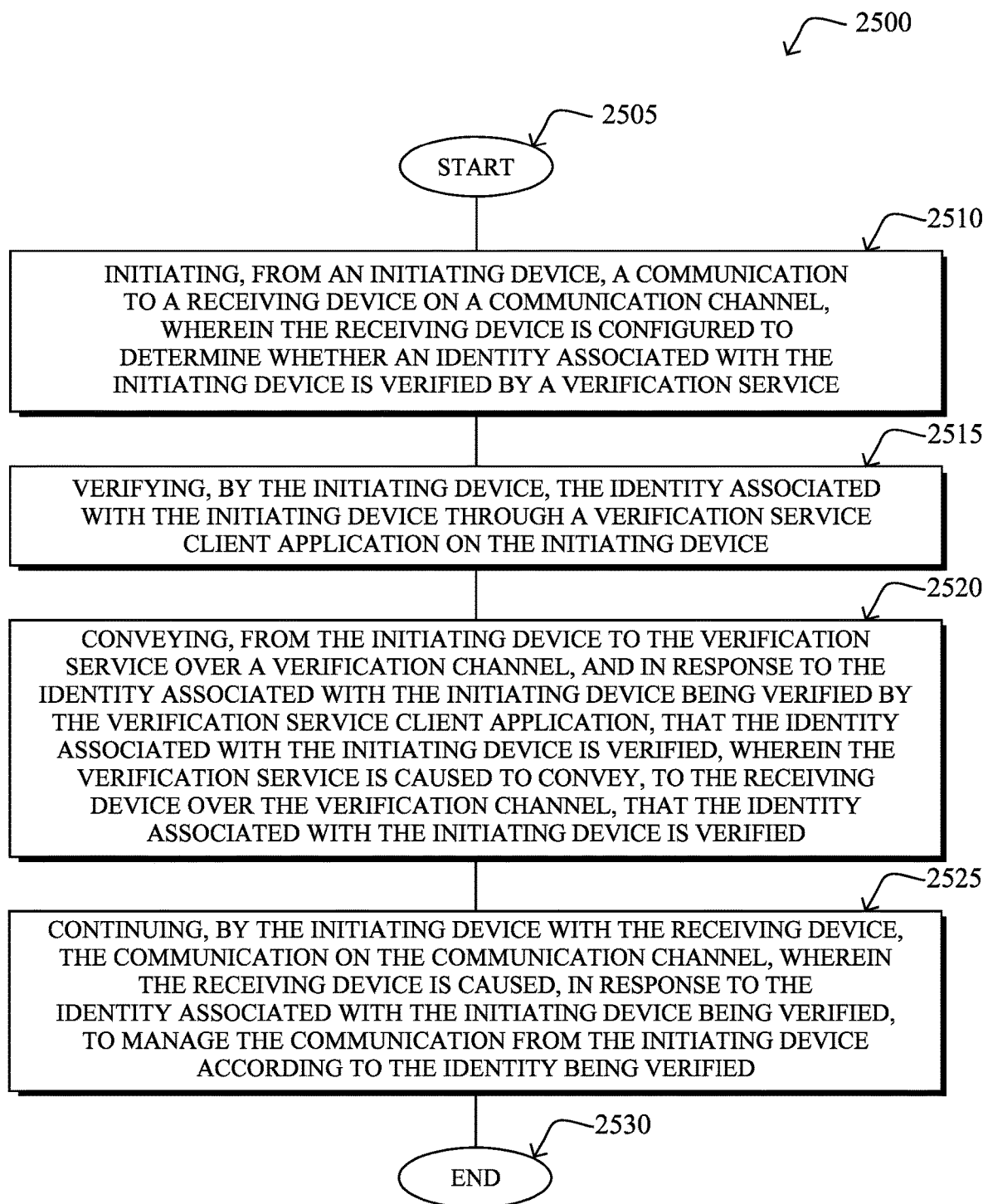
FIG. 25 illustrates an example simplified procedure for providing access control and identity verification for communications in accordance with one or more embodiments described herein, particularly when initiating a communication from an entity to be verified.

FIG. 25 illustrates an example simplified procedure for providing access control and identity verification for communications in accordance with one or more embodiments described herein, particularly when initiating a communication from an entity to be verified. For example, a non-generic, specifically configured device (e.g., device 200, such as an end device (mobile device, any one or more of the enterprise devices, etc.)) may perform procedure 2500 by executing stored instructions (e.g., process 248). The procedure 2500 may start at step 2505, and continues to step 2510, where, as described in greater detail above, an initiating device (e.g., a mobile device 520) initiates a communication to a receiving device (e.g., an enterprise 530) on a communication channel, wherein the receiving device is configured to determine whether an identity associated with the initiating device is verified by a verification service (e.g., AVS server 510). In one embodiment, for example, a verification service client application (e.g., AVS app 525) on the initiating device receives a prompt from the receiving device to initiate the communication, wherein the verification service client application initiates the communication in response to the prompt.

In step 2515, the initiating device verifies the identity associated with the initiating device (e.g., of a user of the mobile device) through a verification service client application on the initiating device. In one embodiment, the verification service client application has verified the identity associated with the initiating device prior to initiating the communication, and the verification service client application initiates the communication, while the verification service client application also conveys that the identity associated with the initiating device is verified to the verification service over the verification channel upon initiating the communication on the communication channel. In an alternative embodiment, the communication is initiated prior to the verification service client application verifying the identity associated with the initiating device, and the verification service client application is caused to activate during the communication to perform verification of the identity associated with the initiating device. Note that "activating" may mean logging into the verification service (e.g., a user providing a password, FaceID, etc.), which provides at least a first manner for the identity to be authenticated/verified. Alternatively, "activating" may imply opening of an application (i.e., the application is installed on the device, but is not running), where the application (e.g., the AVS client app 525) may perform the verification (e.g., requesting/receiving one or more authentication factors).

In step 2520, in response to the identity associated with the initiating device being verified by the verification service client application, the initiating device conveys that the identity associated with the initiating device is verified to the verification service over a verification channel. The verification service is thus caused to convey, to the receiving device over the verification channel, that the identity associated with the initiating device is verified.

As such, in step 2525, the initiating device may continue, with the receiving device, the communication on the communication channel, wherein the receiving device caused, in response to the identity associated with the initiating device being verified, to manage the communication from the initiating device according to the identity being verified. The simplified procedure 2500 may then end in step 2530.

Figure 26:
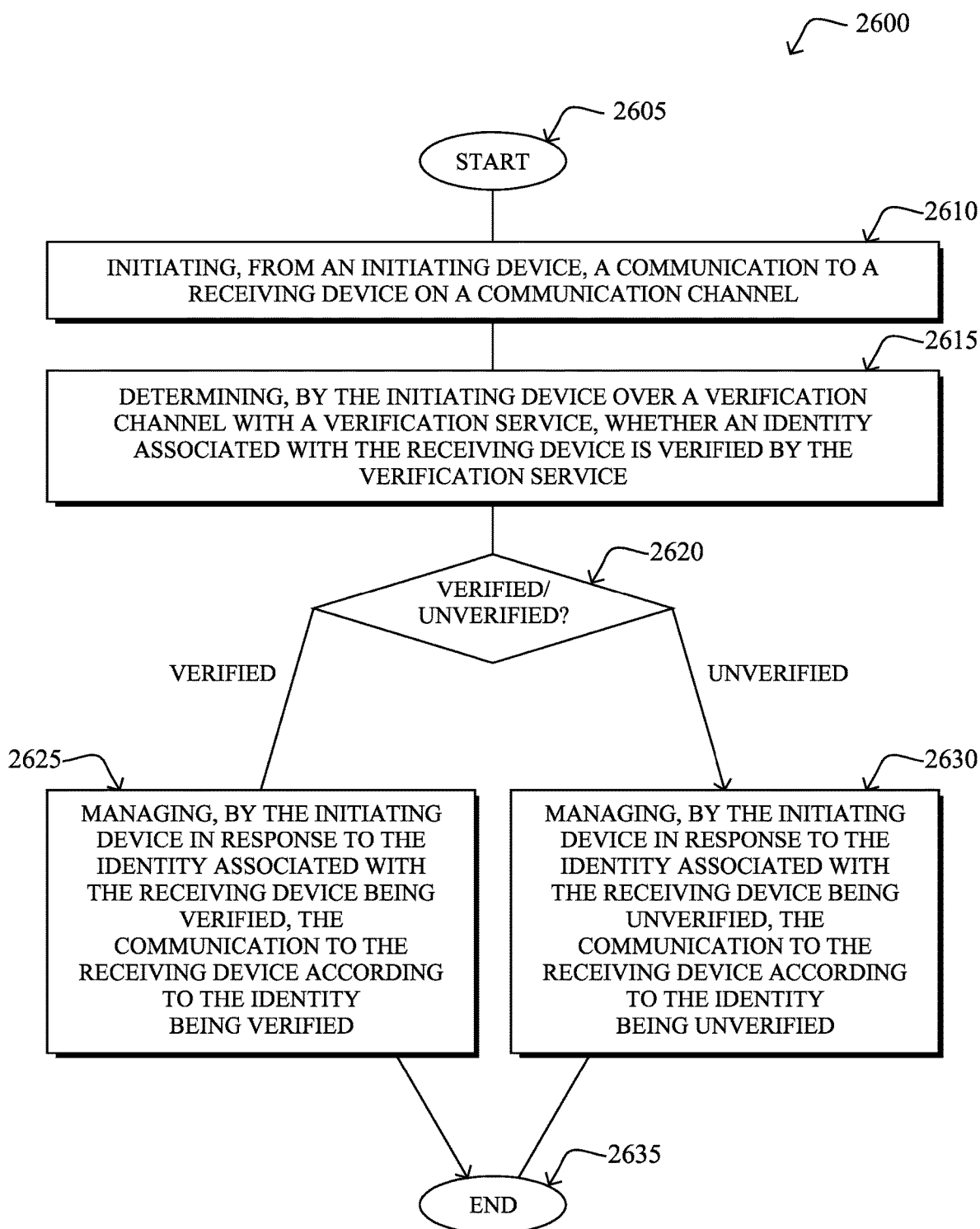
FIG. 26 illustrates an example simplified procedure for providing access control and identity verification for communications in accordance with one or more embodiments described herein, particularly when initiating a communication to an entity to be verified.

FIG. 26 illustrates an example simplified procedure for providing access control and identity verification for communications in accordance with one or more embodiments described herein, particularly when initiating a communication to an entity to be verified. For example, a non-generic, specifically configured device (e.g., device 200, such as an end device (mobile device, any one or more of the enterprise devices, etc.)) may perform procedure 2600 by executing stored instructions (e.g., process 248). The procedure 2600 may start at step 2605, and continues to step 2610, where, as described in greater detail above, an initiating device (e.g., an enterprise 530) initiates a communication to a receiving device (e.g., mobile device 520) on a communication channel. In certain embodiments, the initiating device may inform a verification service (e.g., AVS server 510), over a verification channel, of an intention to initiate the communication to the receiving device, causing the verification service to relay the intention to the receiving device. In certain other embodiments, the initiating device may receive a prompt/response from a verification service client application on the receiving device to initiate the communication, such that the initiating device initiates the communication in response to the prompt. In either event, the intention and/or response may be associated with a particular time of initiating the communication, as noted above.

In step 2615, the initiating device may then determine, over a verification channel with a verification service, whether an identity associated with the receiving device is verified by the verification service (e.g., based on an invoked verification service client application that verifies the identity).

Based on the result in step 2620, then, in response to the identity associated with the receiving device being verified, the initiating device manages the communication to the receiving device in step 2625 according to the identity being verified. Conversely, in step 2630 in response to the identity associated with the receiving device being unverified, the initiating device manages the communication to the receiving device according to the identity being unverified. The simplified procedure 2600 may then end in step 2635.

Figure 27:
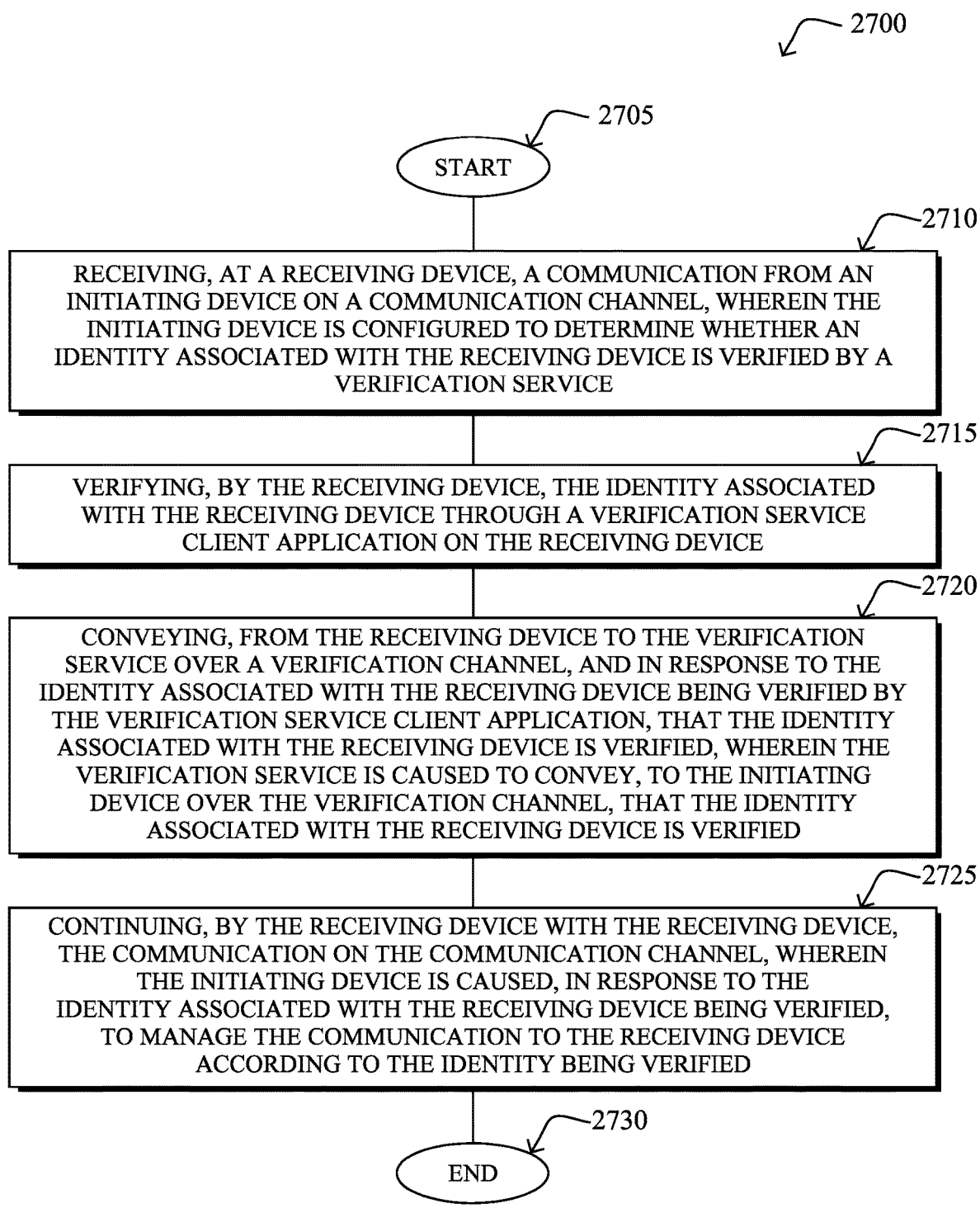
FIG. 27 illustrates an example simplified procedure for providing access control and identity verification for communications in accordance with one or more embodiments described herein, particularly when receiving a communication at an entity to be verified.

FIG. 27 illustrates an example simplified procedure for providing access control and identity verification for communications in accordance with one or more embodiments described herein, particularly when receiving a communication at an entity to be verified. For example, a non-generic, specifically configured device (e.g., device 200, such as an end device (mobile device, any one or more of the enterprise devices, etc.)) may perform procedure 2700 by executing stored instructions (e.g., process 248). The procedure 2700 may start at step 2705, and continues to step 2710, where, as described in greater detail above, a receiving device (e.g., mobile device 520) receives a communication from an initiating device (e.g., enterprise 530) on a communication channel, wherein the initiating device is configured to determine whether an identity associated with the receiving device is verified by a verification service (e.g., AVS server 510). As noted above, the communication may be based on intentions to initiate the communication, prompts to initiate the communication, setting certain times to initiate the communication, and so on.

In step 2715, the receiving device verifies the identity associated with the receiving device (e.g., of a user of the receiving device) through a verification service client application (e.g., AVS app 525) on the receiving device. In one embodiment, the verification service client application has verified the identity associated with the receiving device prior to receiving the communication, and the verification service client application conveys that the identity associated with the receiving device is verified to the verification service over the verification channel upon receiving the communication on the communication channel. In another embodiment, the communication is received prior to the verification service client application verifying the identity associated with the receiving device, and the verification service client application is caused to activate during the communication to perform verification of the identity associated with the receiving device.

In step 2720, in response to the identity associated with the receiving device being verified by the verification service client application, the receiving device conveys to the verification service over a verification channel that the identity associated with the receiving device is verified, such that the verification service is caused to convey, to the initiating device over the verification channel, that the identity associated with the receiving device is verified. (Note that as described herein, the receiving device may receive one or more authentication factors input, but conveying that the identity associated with the receiving device is verified may be completed in a manner that may prevent (or at least not require) access to the one or more authentication factors by at least the initiating device, and in certain embodiments also the verification service, itself.)

Accordingly, in step 2725, the receiving device continues the communication with the receiving device on the communication channel, where the initiating device is caused, in response to the identity associated with the receiving device being verified, to manage the communication to the receiving device according to the identity being verified. The simplified procedure 2700 may then end in step 2730.

Figure 28:
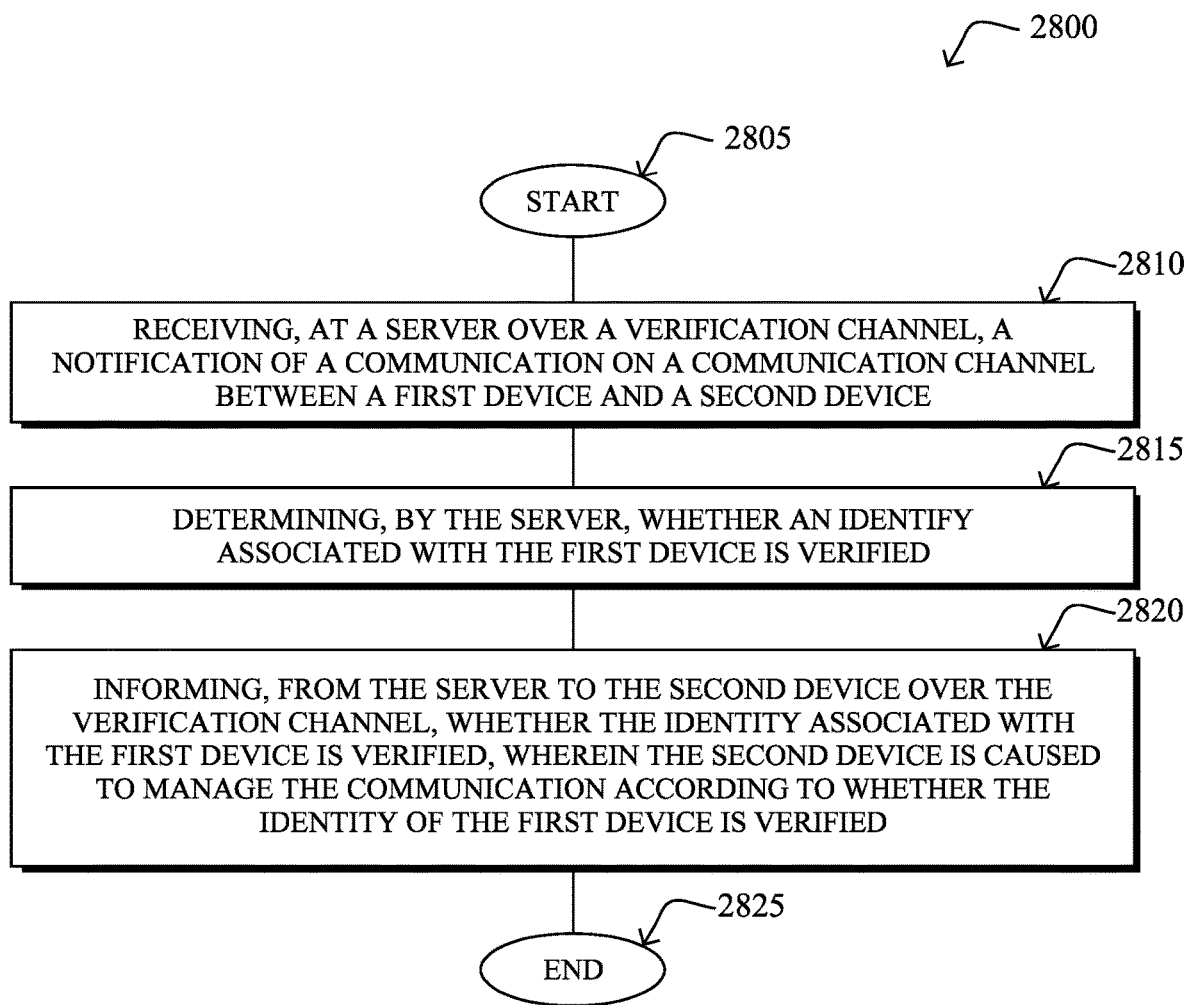
FIG. 28 illustrates an example simplified procedure for providing access control and identity verification for communications between an initiating device and a recipient device in accordance with one or more embodiments described herein.

FIG. 28 illustrates an example simplified procedure for providing access control and identity verification for communications between an initiating device and a recipient device in accordance with one or more embodiments described herein. For example, a non-generic, specifically configured device (e.g., device 200, such as an AVS server 510) may perform procedure 2800 by executing stored instructions (e.g., process 248). The procedure 2800 may start at step 2805, and continues to step 2810, where, as described in greater detail above, a server (e.g., AVS server 510) receives, over a verification channel, a notification of a communication on a communication channel between a first device and a second device. In one example, the first device is an initiating device of the communication to the second device as a receiving device. In another example, the second device is an initiating device of the communication to the first device as the receiving device. Also, in one example, the notification is received from the second device, while in still another example, the notification is received from the first device.

In step 2815, the server may correspondingly determine whether an identity associated with the first device is verified. As described in detail above, this may involve such things as receiving a verification of the identity from a verification service client application (e.g., AVS app 525) on the first device over the verification channel, performing verification of the identity with the first device over the verification channel, invoking a verification service client application on the first device to obtain verification (such as initiating the verification service client application on the first device (e.g., a "pop up message), prompting the first device to install the verification service client application, and so on).

In step 2820, the server may then inform, to the second device over the verification channel, whether the identity associated with the first device is verified, such that the second device is caused to manage the communication according to whether the identity of the first device is verified, as described in greater detail herein. The simplified procedure 2800 may then end in step 2825.

It should be noted that the steps shown and described in the procedures above are merely examples for illustration, and certain other steps may be included or excluded as desired. For instance, other steps may also be included generally within procedures above as described herein. For example, such steps (whether additional steps or furtherance of steps already specifically illustrated above) may include such things as: how communications are managed based on verified/unverified identities, how verification occurs, various timers, procedures for increased identity verification requests, displaying verification/assurance levels, generating and passing verification tokens, and so on. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

In closing, an illustrative method according to one or more embodiments of the present disclosure may comprise: initiating, from an initiating device, a communication to a receiving device on a communication channel, wherein the receiving device is configured to determine whether an identity associated with the initiating device is verified by a verification service; verifying, by the initiating device, the identity associated with the initiating device through a verification service client application on the initiating device; conveying, from the initiating device to the verification service over a verification channel, and in response to the identity associated with the initiating device being verified by the verification service client application, that the identity associated with the initiating device is verified, wherein the verification service is caused to convey, to the receiving device over the verification channel, that the identity associated with the initiating device is verified; and continuing, by the initiating device with the receiving device, the communication on the communication channel, wherein the receiving device is caused, in response to the identity associated with the initiating device being verified, to manage the communication from the initiating device according to the identity being verified.

In one embodiment, the verification service client application has verified the identity associated with the initiating device prior to initiating the communication, wherein the verification service client application initiates the communication, and wherein the verification service client application conveys that the identity associated with the initiating device is verified to the verification service over the verification channel upon initiating the communication on the communication channel.

In one embodiment, the communication is initiated prior to the verification service client application verifying the identity associated with the initiating device, and wherein the verification service client application is caused to activate during the communication to perform verification of the identity associated with the initiating device. In one embodiment, the method further comprises: receiving an identity verification request from the receiving device over the verification channel during the communication; and invoking the verification service client application in response to the identity verification request to verify the identity associated with the initiating device.

In one embodiment, the communication is initiated without the verification service client application on the initiating device, the method further comprising: receiving a prompt from the receiving device over the verification channel during the communication to install the verification service client application; and installing the verification service client application in response to the prompt to then verify the identity associated with the initiating device. In one embodiment, a time limit is associated with the prompt to install the verification service client application.

In one embodiment, verifying the identity associated with the initiating device through a verification service client application on the initiating device comprises: receiving one or more authentication factors input at the initiating device, wherein conveying, to the verification service over the verification channel, that the identity associated with the initiating device is verified, prevents access to the one or more authentication factors by at least the receiving device. In one embodiment, conveying, to the verification service over the verification channel, that the identity associated with the initiating device is verified, further prevents access to the one or more authentication factors by the verification service.

In one embodiment, the method further comprises: receiving, by the verification service client application on the initiating device, a prompt from the receiving device to initiate the communication, wherein the verification service client application initiates the communication in response to the prompt.

In one embodiment, the method further comprises, in response to the communication being managed by the receiving device according to the identity being verified, one or more of: receiving secure information over the communication; relaying transaction requests over the communication; and requesting modification of information associated with the verified identity.

In one embodiment, in response to the communication being managed by the receiving device according to the identity being verified, the receiving device is caused to receive one or more identity attributes associated with the identity selected from a group consisting of: a name; an account number; an identification number, a verification level; a demographic; and a treatment level.

In one embodiment, the method further comprises: conveying, from the initiating device to the verification service over the verification channel, and in response to the identity associated with the initiating device being unverified by the verification service client application, that the identity associated with the initiating device is unverified, wherein the verification service is caused to convey, to the receiving device over the verification channel, that the identity associated with the initiating device is unverified; and continuing, by the initiating device with the receiving device, the communication on the communication channel, wherein the receiving device is caused, in response to the identity associated with the initiating device being unverified, to manage the communication from the initiating device according to the identity being unverified. In one embodiment, in response to the communication being managed by the receiving device according to the identity being unverified, the receiving device is caused to perform one or more actions selected from: preventing sharing secure information over the communication; preventing transaction requests received over the communication; preventing sharing of information associated with the unverified identity; preventing requests for modification of information associated with the unverified identity; instructing against sharing secure information over the communication; instructing against performing transaction requests received over the communication; instructing against sharing of information associated with the unverified identity; instructing against modification of information associated with the unverified identity; treating the communication with an unverified identity; and discontinuing the communication.

In one embodiment, the communication is selected from a group consisting of: a user-to-user communication; a user-to-enterprise communication; and an enterprise-to-user communication.

In one embodiment, the identity associated with the initiating device is verified in response to attestation of a user identity at the initiating device.

In one embodiment, the identity associated with the initiating device is verified without the receiving device accessing personally identifying information (PII) associated with the identity.

In one embodiment, the communication is selected from a group consisting of: a voice communication; a video communication; a text communication; an email communication; and a data communication.

In one embodiment, verifying the identity associated with the initiating device is based on one or more authentication factors selected from a group consisting of: facial recognition; iris recognition; device location information; fingerprint recognition; social security number input; federal identification number input; password input; pin input; security question input; and credit card code input.

In one embodiment, verifying the identity associated with the initiating device is based on one or more authentication factors input at the initiating device, and wherein the receiving device has no access to the one or more authentication factors input at the initiating device.

In one embodiment, the method further comprises, in response to the identity being verified: receiving a request for increased assurance of verification of the identity from the receiving device during the communication; verifying the identity associated with the initiating device through the verification service client application on the initiating device according to the increased assurance of verification request; conveying, from the initiating device, in response to the increased assurance of verification, the increased assurance of verification to the verification service over the verification channel, wherein the verification service is caused to convey, to the receiving device over the verification channel, the increased assurance of verification of the identity associated with the initiating device; and continuing, by the initiating device with the receiving device, the communication on the communication channel, wherein the receiving device is caused to manage the communication from the initiating device according to whether an increased assurance is conveyed.

In one embodiment, the method further comprises: receiving an identity verification level of the receiving device via the verification channel.

In one embodiment, the method further comprises: sending an identity verification request from the initiating device to the receiving device during the communication; and receiving a response to the identity verification request from the receiving device. In one embodiment, sending the identity verification request and receiving the response to the identity verification request occurs via the verification channel.

In one embodiment, the method further comprises: displaying a verification level of the receiving device.

In one embodiment, the method further comprises: generating a verification token in response to the identity associated with the initiating device being verified; and wherein conveying that the identity associated with the initiating device is verified comprises sending the verification token to the verification service, wherein the verification service is caused to convey the verification token to the receiving device over the verification channel. In one embodiment, the receiving device is configured to pass the verification token to a second device to cause the second device to determine that the identity associated with the initiating device is verified based on receiving the verification token. In one embodiment, the verification token is unexchangeable.

Also, an illustrative apparatus according to one or more embodiments of the present disclosure may comprise: one or more network interfaces to communicate on a communication channel; one or more network interfaces to communicate on a verification channel; a processor adapted to execute one or more processes; and a memory configured to store a process executable by the processor, the process when executed operable to perform a method comprising: initiating a communication to a receiving device on the communication channel, wherein the receiving device is configured to determine whether an identity associated with the apparatus is verified by a verification service; verifying the identity associated with the apparatus through a verification service client application on the apparatus; conveying, to the verification service over the verification channel, and in response to the identity associated with the apparatus being verified by the verification service client application, that the identity associated with the apparatus is verified, wherein the verification service is caused to convey, to the receiving device over the verification channel, that the identity associated with the apparatus is verified; and continuing, with the receiving device, the communication on the communication channel, wherein the receiving device is caused, in response to the identity associated with the apparatus being verified, to manage the communication from the apparatus according to the identity being verified.

Furthermore, an illustrative tangible, non-transitory, computer-readable medium according to one or more embodiments of the present disclosure may store program instructions that cause a computer to execute a process comprising: initiating a communication to a receiving device on a communication channel, wherein the receiving device is configured to determine whether an identity associated with the computer is verified by a verification service; verifying the identity associated with the computer through a verification service client application on the computer; conveying, to the verification service over a verification channel, and in response to the identity associated with the computer being verified by the verification service client application, that the identity associated with the computer is verified, wherein the verification service is caused to convey, to the receiving device over the verification channel, that the identity associated with the computer is verified; and continuing, with the receiving device, the communication on the communication channel, wherein the receiving device is caused, in response to the identity associated with the computer being verified, to manage the communication from the computer according to the identity being verified.

While there have been shown and described illustrative embodiments, it is to be understood that various other adaptations and modifications may be made within the scope of the embodiments herein. For example, though the disclosure was often described with respect to enterprise, or more specifically, banking, examples, those skilled in the art should understand that this was done only for illustrative purpose and without limitations, and the techniques herein may be used for any secure communication environment between any two end-users/systems. Furthermore, while the embodiments may have been demonstrated with respect to certain communication environments, physical environments, or device form factors, other configurations may be conceived by those skilled in the art that would remain within the contemplated subject matter of the description above. For example, various components and modules may be distributed in manners not specifically described or illustrated herein, but that provide functionally similar results (e.g., the timer which was described as part of the AVS Server may in fact be placed, in one embodiment, in the AVS ACG, and so on). Also, while the terms "inbound" and "outbound" may have been used herein with regard to perspectives from the point of view of a call center/enterprise, the techniques herein are not so limited, and may generally refer to "inbound" communication as communication received at a receiving device, and "outbound" communication as communication initiated by an initiating device, each regardless of whether the initiating device or the receiving device is the device that needs to have an associated identity verified by the respective other device.

Further, while certain authentication factors and/or verification response inputs have been noted above, other factors/inputs may be used in accordance with the techniques herein that are not specifically mentioned. Similarly, while certain actions have been listed with regard to managing a communication based on whether the entity to be verified is, in fact, verified or unverified, other managing actions may be taken with the scope of the present disclosure, and those specifically mentioned are non-limiting examples.

In addition, while the techniques have been described above in terms of one-to-one communication, the present disclosure may be applicable to one-to-many or many-to-one communications, such as conference calls, web conferences, and so on. For example, a presenter of a one-to-many conference with a plurality of end users may wish to verify the identity of certain or all of the users, for security, attendance, or other reasons. Example scenarios may include education, seminars, board meetings, shareholder meetings, business meetings, and so on.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   initiating, from an initiating device, a communication to a receiving device on a communication channel, wherein the receiving device is configured to determine whether an identity of a user using the initiating device is verified by a verification service associated with the initiating device and whether the identity of the user using the initiating device is attested by an attestation service;
   verifying, by the initiating device, the identity of the user using the initiating device based on whether or not the user has logged into a verification service client application on the initiating device;
   conveying, from the initiating device to the verification service over a verification channel, and in response to the identity of the user using the initiating device being verified by the verification service client application, that the identity of the user using the initiating device is verified, wherein the verification service is caused to convey, to the receiving device over the verification channel, that the identity of the user using the initiating device is verified; and
   continuing, by the initiating device with the receiving device, the communication on the communication channel, wherein the receiving device is caused, in response to the identity of the user using the initiating device being attested and verified, to manage the communication from the initiating device according to the identity being verified.

2. The method as in claim 1, wherein the verification service client application has verified the identity of the user using the initiating device prior to initiating the communication, wherein the verification service client application initiates the communication, and wherein the verification service client application conveys that the identity of the user using the initiating device is verified to the verification service over the verification channel upon initiating the communication on the communication channel.

3. The method as in claim 1, wherein the communication is initiated prior to the verification service client application verifying the identity of the user using the initiating device, and wherein the verification service client application is caused to activate during the communication to perform verification of the identity of the user using the initiating device.

4. The method as in claim 3, further comprising:
   receiving an identity verification request from the receiving device over the verification channel during the communication; and
   invoking the verification service client application in response to the identity verification request to verify the identity of the user using the initiating device.

5. The method as in claim 1, wherein the communication is initiated without the verification service client application on the initiating device, the method further comprising:
   receiving a prompt from the receiving device over the verification channel during the communication to install the verification service client application; and
   installing the verification service client application in response to the prompt to then verify the identity of the user using the initiating device.

6. The method as in claim 5, wherein a time limit is associated with the prompt to install the verification service client application.

7. The method as in claim 1, wherein verifying the identity of the user using the initiating device through a verification service client application on the initiating device comprises:

receiving one or more authentication factors input at the initiating device, wherein conveying, to the verification service over the verification channel, that the identity of the user using the initiating device is verified, prevents access to the one or more authentication factors by at least the receiving device.

8. The method as in claim 7, wherein conveying, to the verification service over the verification channel, that the identity of the user using the initiating device is verified, further prevents access to the one or more authentication factors by the verification service.

9. The method as in claim 1, further comprising:
receiving, by the verification service client application on the initiating device, a prompt from the receiving device to initiate the communication, wherein the verification service client application initiates the communication in response to the prompt.

10. The method as in claim 1, further comprising, in response to the communication being managed by the receiving device according to the identity being verified, one or more of:
receiving secure information over the communication;
relaying transaction requests over the communication; and
requesting modification of information associated with the verified identity.

11. The method as in claim 1, wherein, in response to the communication being managed by the receiving device according to the identity being verified, the receiving device is caused to receive one or more identity attributes associated with the identity selected from a group consisting of: a name; an account number; an identification number, a verification level; a demographic; and a treatment level.

12. The method as in claim 1, further comprising:
conveying, from the initiating device to the verification service over the verification channel, and in response to the identity of the user using the initiating device being unverified by the verification service client application, that the identity of the user using the initiating device is unverified, wherein the verification service is caused to convey, to the receiving device over the verification channel, that the identity of the user using the initiating device is unverified; and
continuing, by the initiating device with the receiving device, the communication on the communication channel, wherein the receiving device is caused, in response to the identity of the user using the initiating device being unverified, to manage the communication from the initiating device according to the identity being unverified.

13. The method as in claim 12, wherein, in response to the communication being managed by the receiving device according to the identity being unverified, the receiving device is caused to perform one or more actions selected from: preventing sharing secure information over the communication; preventing transaction requests received over the communication; preventing sharing of information associated with the unverified identity; preventing requests for modification of information associated with the unverified identity; instructing against sharing secure information over the communication; instructing against performing transaction requests received over the communication; instructing against sharing of information associated with the unverified identity; instructing against modification of information associated with the unverified identity; treating the communication with an unverified identity; and discontinuing the communication.

14. The method as in claim 1, wherein the communication is selected from a group consisting of: a user-to-user communication; a user-to-enterprise communication; and an enterprise-to-user communication.

15. The method as in claim 1, wherein the identity of the user using the initiating device is verified without the receiving device accessing personally identifying information (PII) associated with the identity.

16. The method as in claim 1, wherein the communication is selected from a group consisting of: a voice communication; a video communication; a text communication; an email communication; and a data communication.

17. The method as in claim 1, wherein verifying the identity of the user using the initiating device is based on one or more authentication factors selected from a group consisting of: facial recognition; iris recognition, device location information, fingerprint recognition; social security number input; federal identification number input; password input; pin input; security question input; and credit card code input.

18. The method as in claim 1, wherein verifying the identity of the user using the initiating device is based on one or more authentication factors input at the initiating device, and wherein the receiving device has no access to the one or more authentication factors input at the initiating device.

19. The method as in claim 1, further comprising, in response to the identity being verified:
receiving a request for increased assurance of verification of the identity from the receiving device during the communication;
verifying the identity of the user using the initiating device through the verification service client application on the initiating device according to the increased assurance of verification request;
conveying, from the initiating device, in response to the increased assurance of verification, the increased assurance of verification to the verification service over the verification channel, wherein the verification service is caused to convey, to the receiving device over the verification channel, the increased assurance of verification of the identity of the user using the initiating device; and
continuing, by the initiating device with the receiving device, the communication on the communication channel, wherein the receiving device is caused to manage the communication from the initiating device according to whether an increased assurance is conveyed.

20. The method as in claim 1, further comprising:
receiving an identity verification level of the receiving device via the verification channel.

21. The method as in claim 1, further comprising:
sending an identity verification request from the initiating device to the receiving device during the communication; and
receiving a response to the identity verification request from the receiving device.

22. The method as in claim 21, wherein sending the identity verification request and receiving the response to the identity verification request occurs via the verification channel.

23. The method as in claim 1, further comprising:
displaying a verification level of the receiving device.

24. The method as in claim 1, further comprising:
generating a verification token in response to the identity of the user using the initiating device being verified; and wherein conveying that the identity of the user using the initiating device is verified comprises sending the verification token to the verification service, wherein the verification service is caused to convey the verification token to the receiving device over the verification channel.

25. The method as in claim 24, wherein the receiving device is configured to pass the verification token to a second device to cause the second device to determine that the identity of the user using the initiating device is verified based on receiving the verification token.

26. The method as in claim 24, wherein the verification token is unexchangeable.

27. An apparatus, comprising:
  one or more network interfaces to communicate on a communication channel;
  one or more network interfaces to communicate on a verification channel;
  a processor adapted to execute one or more processes; and
  a memory configured to store a process executable by the processor, the process when executed operable to perform a method comprising:
    initiating a communication to a receiving device on the communication channel, wherein the receiving device is configured to determine whether an identity of a user using the apparatus is verified by a verification service associated with the apparatus and whether the identity of the user using the apparatus is attested by an attestation service;
    verifying the identity of the user using the apparatus based on whether or not the user has logged into a verification service client application on the apparatus;
    conveying, to the verification service over the verification channel, and in response to the identity of the user using the apparatus being verified by the verification service client application, that the identity of the user using the apparatus is verified, wherein the verification service is caused to convey, to the receiving device over the verification channel, that the identity of the user using the apparatus is verified; and
    continuing, with the receiving device, the communication on the communication channel, wherein the receiving device is caused, in response to the identity of the user using the apparatus being attested and verified, to manage the communication from the apparatus according to the identity being verified.

28. A tangible, non-transitory, computer-readable medium storing program instructions that cause a computer to execute a process comprising:
  initiating a communication to a receiving device on a communication channel, wherein the receiving device is configured to determine whether an identity of a user using the computer is verified by a verification service associated with the computer and whether the identity of the user using the computer is attested by an attestation service;
  verifying the identity of the user using the computer based on whether or not the user has logged into a verification service client application on the computer;
  conveying, to the verification service over a verification channel, and in response to the identity of the user using the computer being verified by the verification service client application, that the identity of the user using the computer is verified, wherein the verification service is caused to convey, to the receiving device over the verification channel, that the identity of the user using the computer is verified; and
  continuing, with the receiving device, the communication on the communication channel, wherein the receiving device is caused, in response to the identity of the user using the computer being attested and verified, to manage the communication from the computer according to the identity being verified.

\* \* \* \* \*